United States Patent
Fujihara et al.

(10) Patent No.: US 6,687,688 B1
(45) Date of Patent: Feb. 3, 2004

(54) SYSTEM AND METHOD FOR DATA MANAGEMENT

(75) Inventors: Mutsumi Fujihara, Yokohama (JP); Shuichi Kamimura, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/267,165

(22) Filed: Mar. 12, 1999

(30) Foreign Application Priority Data

Mar. 13, 1998 (JP) .......................................... 10-063701
Feb. 5, 1999 (JP) .......................................... 11-029016

(51) Int. Cl.⁷ ............................................. G06F 17/30
(52) U.S. Cl. ............................ 707/3; 707/7; 707/102; 707/200; 707/104.1
(58) Field of Search ......................... 707/1–10, 101, 707/104; 345/441, 423, 565; 704/254

(56) References Cited

U.S. PATENT DOCUMENTS

| | | | | |
|---|---|---|---|---|
| 4,803,477 A | * | 2/1989 | Miyatake et al. | 345/565 |
| 5,202,986 A | * | 4/1993 | Nickel | 707/3 |
| 5,345,516 A | * | 9/1994 | Boyer et al. | 382/113 |
| 5,551,024 A | * | 8/1996 | Waters | 707/3 |
| 5,615,299 A | * | 3/1997 | Bahl et al. | 704/254 |
| 5,627,748 A | * | 5/1997 | Baker et al. | 707/6 |
| 5,701,467 A | * | 12/1997 | Freeston | 707/100 |
| 5,799,299 A | * | 8/1998 | Fujiwara | 707/3 |
| 5,819,286 A | * | 10/1998 | Yang et al. | 707/1 |
| 5,836,003 A | * | 11/1998 | Sadeh | 341/51 |
| 5,844,561 A | * | 12/1998 | Tanimoto et al. | 707/3 |
| 5,852,822 A | * | 12/1998 | Srinivasan et al. | 707/4 |
| 5,963,642 A | * | 10/1999 | Goldstein | 707/1 |
| 6,070,159 A | * | 5/2000 | Wilson et al. | 707/3 |
| 6,088,034 A | * | 7/2000 | Deering | 345/420 |
| 6,137,493 A | * | 10/2000 | Kamimura et al. | 345/423 |

OTHER PUBLICATIONS

Aho, et al., pps. 86–93, "The Design and Analysis of Computer Algorithms", 1974.
D.W. Jones, Communications of the ACM, vol. 29, No. 4, pps. 300–311, "An Empirical Comparison of Priority–Queue and Event–Set Implementations", Apr., 1986.
H. Samer, ACM Computing Survey, vol. 20, No. 4, pps. 271–309, "Hierarchical Representations of Collections of Small Rectangles", Dec.,1988.
V.Y. Lum, Communications of the ACM, vol. 13, No. 11, pps. 660–665, "Multi–Attribute Retrieval with Combined Indexes", Nov., 1970.
J. Nievergelt, et al., ACM Trsnctions on Database Systems, vol. 9, Nol. 1, pps. 38–71, "The Grid File: An Adaptable, Symmetric Multikey File Structure", Mar., 1984.
H. Samet, "The Design and Analysis of Spatial Data Structures", 1990.
V. Gaede, et al., ACM Computing Surveys, vol. 30, No. 2, pps. 170–231, "Multidimensional Access Methods", Jun., 1998.

\* cited by examiner

Primary Examiner—Shahid Al Alam
Assistant Examiner—Anh Ly
(74) Attorney, Agent, or Firm—Oblon, Spivak, McClelland, Maier & Neustadt, P.C.

(57) ABSTRACT

The present invention provides a data management system that efficiently uses data areas and significantly increases search efficiency. According to this invention, in the data management system coordinate data 1 is stored in an index 2. An index generating means 3 generates the index from the coordinate data. A range search means 4 finds all coordinate data included in a specified range in the n-dimensional space, that is, one or more pieces of coordinate data which exist in an outmost area and which is included in a specified range. A nearest data search means 5 finds coordinate data nearest to a specified coordinate data. The index contains area nests in the form of code strings representing coordinates of dimensions and sequences of terms representing divisions.

33 Claims, 57 Drawing Sheets

```
(T-1 1)
    (0001001   , 00000100  ) (223   , 332  ) 00000100100100

(T-1 2)
    (0001       , 000001    ) (22    , 33   ) 0000001001
    (00         , 000       ) (2     , 3    ) 00000

(T-1 3)
    (0001001   , 00000100  ) (22    , 33   ) 0000001001
    (0001001   , 00000100  ) (2     , 3    ) 00000

(T-1 4)
    (0001001   , 00000100  ) (      ,      )

(T-1 5)
    (223   , 332  ) is represented by (223   , 332  ) 3
    (22    , 33   ) is represented by (223   , 332  ) 2
    (2     , 3    ) is represented by (223   , 332  ) 1
    (      ,      ) is represented by (223   , 332  ) 0
```

FIG. 2

| ADDRESS n | x-COORDINATE | y-COORDINATE | FIRST TERM IN PREFIX OF x-DIVISION | FIRST TERM IN PREFIX OF y-DIVISION | SECOND TERM IN PREFIX OF x-DIVISION | SECOND TERM IN PREFIX OF y-DIVISION | ... | TWELFTH TERM IN PREFIX OF x-DIVISION | TWELFTH TERM IN PREFIX OF y-DIVISION |
|---|---|---|---|---|---|---|---|---|---|
| ADDRESS n+1 | | | | | | | | | |

| POINTER TO PARENT | POINTER TO LEFT CHILD | POINTER TO RIGHT CHILD | x- COORDINATE | y- COORDINATE | NUMBER OF TERMS OF DIVISION |
|---|---|---|---|---|---|

FIG. 13
(PRIOR ART)
(A)
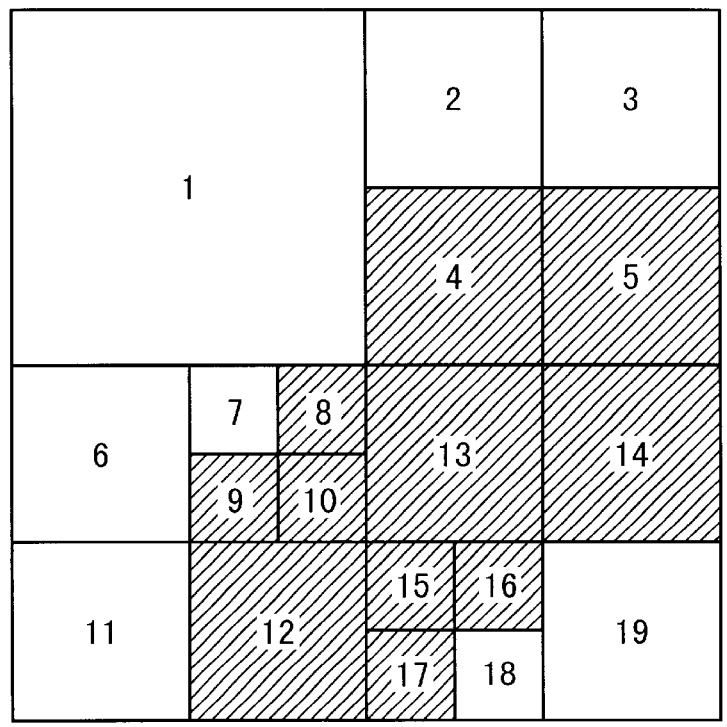
(B)
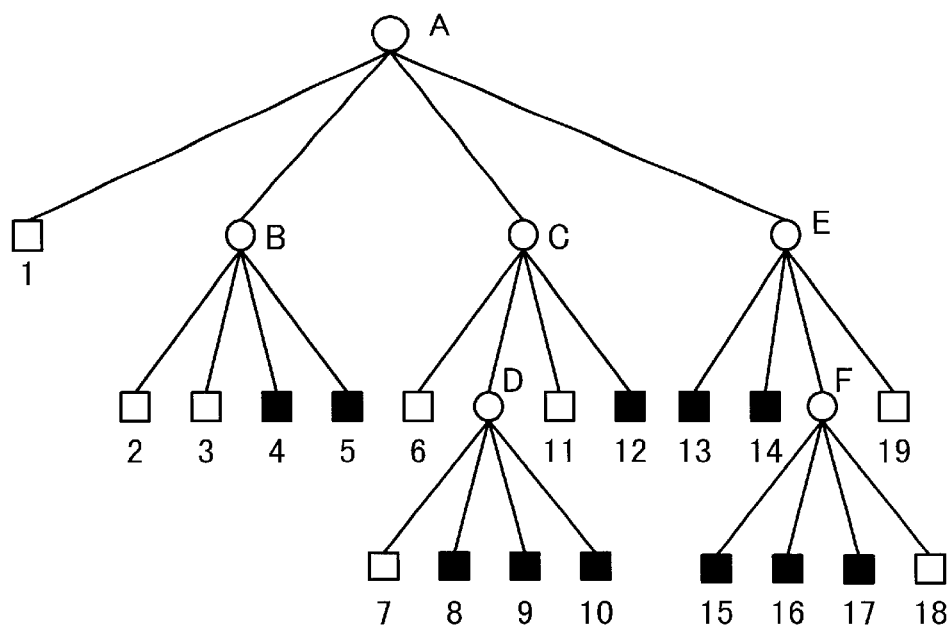

(T-2)
   x-coordinate is equal to or larger than 000100000000 and equal to or smaller than 000111111111 (smaller than 001000000000)
   y-coordinate is equal to or larger than 000001000000 and equal to or smaller than 000001111111 (smaller than 000010000000)

(T-3)
   (0001001    ,00000100   )

(T-4)
   x-coordinate is equal to or larger than 000100100000 and equal to or smaller than 000100111111 (smaller than 000101000000)
   y-coordinate is equal to or larger than 000001000000 and equal to or smaller than 000001001111 (smaller than 000001010000)

|  Coordinates | (Prefix of x-division, Prefix of y-division) | Area code |
|---|---|---|

| (0001 | , 000001 | ) | (4 | , 6 | ) | 0001000001 |
| (0001 | , 000001 | ) | (22 | , 60 | ) | 0000000101 |
| (0001 | , 000001 | ) | (40 | , 42 | ) | 0001000001 |
| (0001 | , 000001 | ) | (22 | , 33 | ) | 0000001001 |
| (0001 | , 000001 | ) | (11110 | , 11112 | ) | 0000001001 |
| (0001001 | , 00000100 | ) | (7 | , 8 | ) | 000100100000100 |
| (0001001 | , 00000100 | ) | (43 | , 62 | ) | 000100000100100 |
| (0001001 | , 00000100 | ) | (223 | , 332 | ) | 000000100100100 |
| (0001001 | , 00000100 | ) | (1111111, 2111111) | | 000000010010010 |
| (0001001 | , 00000100 | ) | (12121 | , 44000 | ) | 000000001001001 |

(T-1 5)
(223 , 332 ) is represented by (223 , 332 ) 3
(22 , 33 ) is represented by (223 , 332 ) 2
(2 , 3 ) is represented by (223 , 332 ) 1
( , ) is represented by (223 , 332 ) 0

| | | | | | | |
|---|---|---|---|---|---|---|
| (0001001 | , 00000100 | ) (223 | , 332 | ) 3 | 0000000100100100 |
| (0001001 | , 00000100 | ) (223 | , 332 | ) 2 | 0000001001 |
| (0001001 | , 00000100 | ) (223 | , 332 | ) 1 | 00000 |
| (0001001 | , 00000100 | ) (223 | , 332 | ) 0 | |

(T-17)

| x-coordinate | y-coordinate | Divisions | Number of terms | Area code |
|---|---|---|---|---|
| (000100110000, | 000001000100) | (43 , 62 ) | 2 | 000100000100100 |
| (000100110000, | 000001000100) | (43 , 62 ) | 1 | 0001000001 |
| (000100110000, | 000001000100) | (43 , 62 ) | 0 | (Outmost area) |

| Address | x-coordinate | y-coordinate | (Prefix of x-division, Prefix of y-division) | Area code |
|---|---|---|---|---|
| 0 | 000000010001 | 000001100000 | (432 , 613 ) | 00000000001000110000 |
| 1 | 000000010011 | 000001100100 | (432 , 613 ) | 00000000001000110001 |
| 2 | 000000011101 | 000001100100 | (432 , 613 ) | 00000000001000111001 |
| 3 | 000000101100 | 000001000000 | (434 , 612 ) | 00000000010010011000 |
| 4 | 000000101100 | 000001001100 | (434 , 612 ) | 00000000010010011001 |
| 5 | 000000101110 | 000001000100 | (434 , 612 ) | 00000000010010011100 |
| 6 | 000111010000 | 000000000111 | (4 , 6 ) | 0001000000 |
| 7 | 000100010000 | 000001001100 | (43 , 62 ) | 000100000100000 |
| 8 | 000100110000 | 000001000100 | (43 , 62 ) | 000100000100100 |
| 9 | 000100110000 | 000001011000 | (43 , 62 ) | 000100000100101 |

(T-19)

| 000 | 00000 | (3 , 5 ) | 00000000 |
|---|---|---|---|

(T-20)

| 0000 | 000001 | (4 , 6 ) | 0000000001 |
|---|---|---|---|

(T-26)
    x-coordinate is equal to or larger than 000100000000 and equal to or smaller than 000100111111 (smaller than 000101000000)
    y-coordinate is equal to or larger than 000001000000 and equal to or smaller than 000001011111 (smaller than 000001100000)

(T-27)
    x-coordinate is equal to or larger than 000100000000 and equal to or smaller than 000100011111 (smaller than 000100100000)
    y-coordinate is equal to or larger than 000001000000 and equal to or smaller than 000001001111 (smaller than 000001010000)

(T-28)
    x-coordinate is equal to or larger than 000100100000 and equal to or smaller than 000100111111 (smaller than 000101000000)
    y-coordinate is equal to or larger than 000001000000 and equal to or smaller than 000001001111 (smaller than 000001010000)

(T-29)
    x-coordinate is equal to or larger than 000100100000 and equal to or smaller than 000100111111 (smaller than 000101000000)
    y-coordinate is equal to or larger than 000001010000 and equal to or smaller than 000001011111 (smaller than 000001100000)

| Address | x-coordinate | y-coordinate | (Prefix of x-division, Prefix of y-division) | Area code |
|---|---|---|---|---|
| 0 | 000000010001 | 000001100000 | (432 , 613 ) | 00000000001000110000 |
| 1 | 000000010011 | 000001100100 | (432 , 613 ) | 00000000001000110001 |
| 2 | 000000011101 | 000001100100 | (432 , 613 ) | 00000000001000111001 |
| 3 | 000000101100 | 000001000000 | (434 , 612 ) | 00000000010010011000 |
| 4 | 000000101100 | 000001001100 | (434 , 612 ) | 00000000010010011001 |
| 5 | 000000101110 | 000001000100 | (434 , 612 ) | 00000000010010011100 |
| 6 | 000111010000 | 000000000111 | (4 , 6 ) | 0001000000 |
| 7 | 000100010000 | 000001001100 | (43 , 62 ) | 000100000100000 |
| 8 | 000100110000 | 000001000100 | (43 , 62 ) | 000100000100100 |
| 9 | 000100110000 | 000001011000 | (43 , 62 ) | 000100000100101 |

| Address | | x-coordinate | y-coordinate | (Prefix of x-division, Prefix of y-division) | Area code |
|---|---|---|---|---|---|
| 0 | a | 000000101100 | 000001001100 | ( , ) | |
| 1 | b | 000100010000 | 000001001100 | ( , ) | |
| 2 | c | 000111010000 | 000000000111 | ( , ) | |
| 3 | d | 000000010001 | 000001100000 | ( , ) | |
| 4 | e | 000000101100 | 000001000000 | ( , ) | |
| 5 | f | 000000011101 | 000001100100 | ( , ) | |
| 6 | g | 000100110000 | 000001011000 | ( , ) | |
| 7 | h | 000000101110 | 000001000100 | ( , ) | |
| 8 | i | 000000010011 | 000001100100 | ( , ) | |
| 9 | j | 000100110000 | 000001000100 | ( , ) | |

| | | | | | | | | |
|---|---|---|---|---|---|---|---|---|
| 0 | a | 000000101100 | 000001001100 | ( 4 | , 6 | ) | 0000000001 |
| 1 | b | 000100010000 | 000001001100 | ( 4 | , 6 | ) | 0001000001 |
| 2 | c | 000111010000 | 000000000111 | ( 4 | , 6 | ) | 0001000000 |
| 3 | d | 000000010001 | 000001100000 | ( 4 | , 6 | ) | 0000000001 |
| 4 | e | 000000101100 | 000001000000 | ( 4 | , 6 | ) | 0000000001 |
| 5 | f | 000000011101 | 000001100100 | ( 4 | , 6 | ) | 0000000001 |
| 6 | g | 000100110000 | 000001011000 | ( 4 | , 6 | ) | 0001000001 |
| 7 | h | 000000101110 | 000001000100 | ( 4 | , 6 | ) | 0000000001 |
| 8 | i | 000000010011 | 000001100100 | ( 4 | , 6 | ) | 0000000001 |
| 9 | j | 000100110000 | 000001000100 | ( 4 | , 6 | ) | 0001000001 |

| | | | | | | | | |
|---|---|---|---|---|---|---|---|---|
| 0 | a | 000000101100 | 000001001100 | ( 4 | , 6 | ) | 0000000001 |
| 1 | d | 000000010001 | 000001100000 | ( 4 | , 6 | ) | 0000000001 |
| 2 | e | 000000101100 | 000001000000 | ( 4 | , 6 | ) | 0000000001 |
| 3 | f | 000000011101 | 000001100100 | ( 4 | , 6 | ) | 0000000001 |
| 4 | h | 000000101110 | 000001000100 | ( 4 | , 6 | ) | 0000000001 |
| 5 | i | 000000010011 | 000001100100 | ( 4 | , 6 | ) | 0000000001 |
| 6 | c | 000111010000 | 000000000111 | ( 4 | , 6 | ) | 0001000000 |
| 7 | b | 000100010000 | 000001001100 | ( 4 | , 6 | ) | 0001000001 |
| 8 | g | 000100110000 | 000001011000 | ( 4 | , 6 | ) | 0001000001 |
| 9 | j | 000100110000 | 000001000100 | ( 4 | , 6 | ) | 0001000001 |

| | | | | | | | | |
|---|---|---|---|---|---|---|---|---|
| 0 | a | 000000101100 | 000001001100 | ( 43 | , 61 | ) | 00000000010010 |
| 1 | d | 000000010001 | 000001100000 | ( 43 | , 61 | ) | 00000000010001 |
| 2 | e | 000000101100 | 000001000000 | ( 43 | , 61 | ) | 00000000010010 |
| 3 | f | 000000011101 | 000001100100 | ( 43 | , 61 | ) | 00000000010001 |
| 4 | h | 000000101110 | 000001000100 | ( 43 | , 61 | ) | 00000000010010 |
| 5 | i | 000000010011 | 000001100100 | ( 43 | , 61 | ) | 00000000010001 |
| 6 | c | 000111010000 | 000000000111 | ( 4 | , 6 | ) | 0001000000 |
| 7 | b | 000100010000 | 000001001100 | ( 4 | , 6 | ) | 0001000001 |
| 8 | g | 000100110000 | 000001011000 | ( 4 | , 6 | ) | 0001000001 |
| 9 | j | 000100110000 | 000001000100 | ( 4 | , 6 | ) | 0001000001 |

| | | | | | | | | |
|---|---|---|---|---|---|---|---|---|
| 0 | d | 000000010001 | 000001100000 | ( 43 | , 61 | ) | 00000000010001 |
| 1 | f | 000000011101 | 000001100100 | ( 43 | , 61 | ) | 00000000010001 |
| 2 | i | 000000010011 | 000001100100 | ( 43 | , 61 | ) | 00000000010001 |
| 3 | a | 000000101100 | 000001001100 | ( 43 | , 61 | ) | 00000000010010 |
| 4 | e | 000000101100 | 000001000000 | ( 43 | , 61 | ) | 00000000010010 |
| 5 | h | 000000101110 | 000001000100 | ( 43 | , 61 | ) | 00000000010010 |
| 6 | c | 000111010000 | 000000000111 | ( 4 | , 6 | ) | 0001000000 |
| 7 | b | 000100010000 | 000001001100 | ( 4 | , 6 | ) | 0001000001 |
| 8 | g | 000100110000 | 000001011000 | ( 4 | , 6 | ) | 0001000001 |
| 9 | j | 000100110000 | 000001000100 | ( 4 | , 6 | ) | 0001000001 |

| | | | | | | | | |
|---|---|---|---|---|---|---|---|---|
| 0 | d | 000000010001 | 000001100000 | ( 43 | , 61 | ) | 00000000010001 |
| 1 | f | 000000011101 | 000001100100 | ( 43 | , 61 | ) | 00000000010001 |
| 2 | i | 000000010011 | 000001100100 | ( 43 | , 61 | ) | 00000000010001 |
| 3 | a | 000000101100 | 000001001100 | ( 43 | , 61 | ) | 00000000010010 |
| 4 | e | 000000101100 | 000001000000 | ( 43 | , 61 | ) | 00000000010010 |
| 5 | h | 000000101110 | 000001000100 | ( 43 | , 61 | ) | 00000000010010 |
| 6 | c | 000111010000 | 000000000111 | ( 4 | , 6 | ) | 0001000000 |
| 7 | b | 000100010000 | 000001001100 | ( 43 | , 62 | ) | 000100000100000 |
| 8 | g | 000100110000 | 000001011000 | ( 43 | , 62 | ) | 000100000100101 |
| 9 | j | 000100110000 | 000001000100 | ( 43 | , 62 | ) | 000100000100100 |

| | | | | | | | | |
|---|---|---|---|---|---|---|---|---|
| 0 | d | 000000010001 | 000001100000 | ( 43 | , 61 | ) | 00000000010001 |
| 1 | f | 000000011101 | 000001100100 | ( 43 | , 61 | ) | 00000000010001 |
| 2 | i | 000000010011 | 000001100100 | ( 43 | , 61 | ) | 00000000010001 |
| 3 | a | 000000101100 | 000001001100 | ( 43 | , 61 | ) | 00000000010010 |
| 4 | e | 000000101100 | 000001000000 | ( 43 | , 61 | ) | 00000000010010 |
| 5 | h | 000000101110 | 000001000100 | ( 43 | , 61 | ) | 00000000010010 |
| 6 | c | 000111010000 | 000000000111 | ( 4 | , 6 | ) | 0001000000 |
| 7 | b | 000100010000 | 000001001100 | ( 43 | , 62 | ) | 000100000100000 |
| 8 | j | 000100110000 | 000001000100 | ( 43 | , 62 | ) | 000100000100100 |
| 9 | g | 000100110000 | 000001011000 | ( 43 | , 62 | ) | 000100000100101 |

| | | | | | | | |
|---|---|---|---|---|---|---|---|
| 0 | d | 000000010001 | 000001100000 | ( 432 | , 613 | ) | 00000000001000110000 |
| 1 | f | 000000011101 | 000001100100 | ( 432 | , 613 | ) | 00000000001000111001 |
| 2 | i | 000000010011 | 000001100100 | ( 432 | , 613 | ) | 00000000001000110001 |
| 3 | a | 000000101100 | 000001001100 | ( 43 | , 61 | ) | 00000000010010 |
| 4 | e | 000000101100 | 000001000000 | ( 43 | , 61 | ) | 00000000010010 |
| 5 | h | 000000101110 | 000001000100 | ( 43 | , 61 | ) | 00000000010010 |
| 6 | c | 000111010000 | 000000000111 | ( 4 | , 6 | ) | 0001000000 |
| 7 | b | 000100010000 | 000001001100 | ( 43 | , 62 | ) | 000100000100000 |
| 8 | j | 000100110000 | 000001000100 | ( 43 | , 62 | ) | 000100000100100 |
| 9 | g | 000100110000 | 000001011000 | ( 43 | , 62 | ) | 000100000100101 |

| | | | | | | | |
|---|---|---|---|---|---|---|---|
| 0 | d | 000000010001 | 000001100000 | ( 432 | , 613 | ) | 00000000001000110000 |
| 1 | i | 000000010011 | 000001100100 | ( 432 | , 613 | ) | 00000000001000110001 |
| 2 | f | 000000011101 | 000001100100 | ( 432 | , 613 | ) | 00000000001000111001 |
| 3 | a | 000000101100 | 000001001100 | ( 43 | , 61 | ) | 00000000010010 |
| 4 | e | 000000101100 | 000001000000 | ( 43 | , 61 | ) | 00000000010010 |
| 5 | h | 000000101110 | 000001000100 | ( 43 | , 61 | ) | 00000000010010 |
| 6 | c | 000111010000 | 000000000111 | ( 4 | , 6 | ) | 0001000000 |
| 7 | b | 000100010000 | 000001001100 | ( 43 | , 62 | ) | 000100000100000 |
| 8 | j | 000100110000 | 000001000100 | ( 43 | , 62 | ) | 000100000100100 |
| 9 | g | 000100110000 | 000001011000 | ( 43 | , 62 | ) | 000100000100101 |

| | | | | | | |
|---|---|---|---|---|---|---|
| 0 | d | 000000010001 | 000001100000 | ( 432 , 613 ) | 00000000001000110000 |
| 1 | i | 000000010011 | 000001100100 | ( 432 , 613 ) | 00000000001000110001 |
| 2 | f | 000000011101 | 000001100100 | ( 432 , 613 ) | 00000000001000111001 |
| 3 | a | 000000101100 | 000001001100 | ( 434 , 612 ) | 00000000010010011001 |
| 4 | e | 000000101100 | 000001000000 | ( 434 , 612 ) | 00000000010010011000 |
| 5 | h | 000000101110 | 000001000100 | ( 434 , 612 ) | 00000000010010011100 |
| 6 | c | 000111010000 | 000000000111 | ( 4 , 6 ) | 0001000000 |
| 7 | b | 000100010000 | 000001001100 | ( 43 , 62 ) | 000100000100000 |
| 8 | j | 000100110000 | 000001000100 | ( 43 , 62 ) | 000100000100100 |
| 9 | g | 000100110000 | 000001011000 | ( 43 , 62 ) | 000100000100101 |

| | | | | | | | |
|---|---|---|---|---|---|---|---|
| 0 | d | 000000010001 | 000001100000 | ( 432 | , 613 ) | 00000000001000110000 |
| 1 | i | 000000010011 | 000001100100 | ( 432 | , 613 ) | 00000000001000110001 |
| 2 | f | 000000011101 | 000001100100 | ( 432 | , 613 ) | 00000000001000111001 |
| 3 | e | 000000101100 | 000001000000 | ( 434 | , 612 ) | 00000000010010011000 |
| 4 | a | 000000101100 | 000001001100 | ( 434 | , 612 ) | 00000000010010011001 |
| 5 | h | 000000101110 | 000001000100 | ( 434 | , 612 ) | 00000000010010011100 |
| 6 | c | 000111010000 | 000000000111 | ( 4 | , 6 ) | 0001000000 |
| 7 | b | 000100010000 | 000001001100 | ( 43 | , 62 ) | 000100000100000 |
| 8 | j | 000100110000 | 000001000100 | ( 43 | , 62 ) | 000100000100100 |
| 9 | g | 000100110000 | 000001011000 | ( 43 | , 62 ) | 000100000100101 |

(T-58)
    (000000010000, 000001001000) and (000100100000, 000001111000)

(T-67)
  [4, 2] [7, 2] (The leftmost element is the first element)

(T-74)
   [7, 2] [4, 3]    and    0, 1, 2

(T-78)
   [4, 3]   and   0, 1, 2, 7

(T-79)

| | | | | |
|---|---|---|---|---|
| #13 | 00000010110 | 000001000 | (434 , 612 ) | 00000000010010011000 |
| #14 | 00000010110 | 000001001 | (434 , 612 ) | 00000000010010011001 |
| #15 | 00000010111 | 000001000 | (434 , 612 ) | 00000000010010011100 |
| #16 | 00000010111 | 000001001 | (434 , 612 ) | 00000000010010011101 |

(T-80)

| | | | | |
|---|---|---|---|---|
| #16 | 00000010111 | 000001001 | (434 , 612 ) | 00000000010010011101 |

(T-81)

| | | | | |
|---|---|---|---|---|
| #13 | 00000010110 | 000001000 | (434 , 612 ) | 00000000010010011000 |
| #14 | 00000010110 | 000001001 | (434 , 612 ) | 00000000010010011001 |
| #15 | 00000010111 | 000001000 | (434 , 612 ) | 00000000010010011100 |

(T-83)
    (000001100100,000000110010)    ((100,50) in decimal)

(T-92)
[4, 2]
p=0
r=sqrt(9005)

(T-99)
[1, 3][4, 3]
p=4
r=sqrt(3812)

(T-100)

| | | | | |
|---|---|---|---|---|
| #9 | 00000010110 | 000001000 | (434 , 612 ) | 00000000010010011000 |
| #10 | 00000010110 | 000001001 | (434 , 612 ) | 00000000010010011001 |
| #11 | 00000010111 | 000001000 | (434 , 612 ) | 00000000010010011100 |
| #12 | 00000010111 | 000001001 | (434 , 612 ) | 00000000010010011101 |

(T-103)
[1, 3]
p=5
r=sqrt(3240)

(T-104)
  p=5
  r=sqrt(3240)

| Address | x-coordinate | y-coordinate | (Prefix of x-division, Prefix of y-division) | Area code |
|---|---|---|---|---|
| 0 | 00010001 | 01011000 | ( 432, 613 ) | 00000000010001 10000 |
| 1 | 00010011 | 01011001 | ( 432, 613 ) | 00000000010001 10001 |
| 2 | 00011101 | 01011001 | ( 432, 613 ) | 00000000010001 11001 |
| 3 | 00110110 | 01010000 | ( 434, 612 ) | 00000000010010011000 |
| 4 | 00110110 | 01010011 | ( 434, 612 ) | 00000000010010011001 |
| 5 | 00110111 | 01010001 | ( 434, 612 ) | 00000000010010011100 |
| 6 | 10011101 | 00000111 | ( 4 , 6 ) | 0001000000 |
| 7 | 10010001 | 01010011 | ( 43 , 62 ) | 000100000100000 |
| 8 | 10010011 | 01010001 | ( 43 , 62 ) | 000100000100100 |
| 9 | 10010011 | 01010110 | ( 43 , 62 ) | 000100000100101 |

| Address | x-coordinate | y-coordinate | (Prefix of x-division, Prefix of y-division) | Area code |
|---|---|---|---|---|
| 0 | 000000010001 | 000001100000 | ([3],[8]) | 00000000001000110000 |
| 1 | 000000010011 | 000001100100 | ([3],[8]) | 00000000001000110001 |
| 2 | 000000011101 | 000001100100 | ([3],[8]) | 00000000001000111001 |
| 3 | 000000101100 | 000001000000 | ([4],[7]) | 00000000010010011000 |
| 4 | 000000101100 | 000001001100 | ([4],[7]) | 00000000010010011001 |
| 5 | 000000101110 | 000001000100 | ([4],[7]) | 00000000010010011100 |
| 6 | 000111010000 | 000000000111 | ([1],[5]) | 0001000000 |
| 7 | 000100010000 | 000001001100 | ([2],[9]) | 000100000100000 |
| 8 | 000100110000 | 000001000100 | ([2],[9]) | 000100000100100 |
| 9 | 000100110000 | 000001011000 | ([2],[9]) | 000100000100101 |

Sequence table

| [] | Sequence |
|---|---|
| 1 | 4 |
| 2 | 43 |
| 3 | [2]2 |
| 4 | [2]4 |
| 5 | 6 |
| 6 | 61 |
| 7 | [6]2 |
| 8 | [6]3 |
| 9 | 62 |

Sequence table

| [] | Sequence |
|---|---|
| 1 | 2 |
| 2 | 3 |
| 3 | 4 |
| 4 | 6 |
| 5 | 43 |
| 6 | 61 |
| 7 | 62 |
| 8 | [5][1] |
| 9 | [5][3] |
| 10 | [6][1] |

| Address | x-coordinate | y-coordinate | (Prefix of x-division, Prefix of y-division) | Area code |
|---|---|---|---|---|
| 0 | 000000010001 | 000001100000 | (432, 613) | 010100 |
| 1 | 000000010011 | 000001100100 | (432, 613) | 010101 |
| 2 | 000000011101 | 000001100110 | (432, 613) | 010111 |
| 3 | 000000101100 | 000001000000 | (434, 612) | 011000 |
| 4 | 000000101100 | 000001001100 | (434, 612) | 011001 |
| 5 | 000000101110 | 000001000100 | (434, 612) | 011010 |
| 6 | 000111010000 | 000000000111 | (4, 6) | 10 |
| 7 | 000100010000 | 000001001100 | (43, 62) | 1100 |
| 8 | 000100110000 | 000001000100 | (43, 62) | 1110 |
| 9 | 000100110000 | 000001011000 | (43, 62) | 1111 |

| | x-coordinate | y-coordinate | Number of terms in each division | Area code |
|---|---|---|---|---|
| a | 000000010001 | 000001100000 | 10 | 000000000000101100000 |
| b | 000000010011 | 000001100100 | 10 | 000000000000101100001 |
| c | 000000011101 | 000001100100 | 9 | 00000000001011010 |
| d | 000000101100 | 000001000000 | 10 | 000000000000110001010 |
| e | 000000101110 | 000001000100 | 10 | 000000000000110001011 |
| f | 000000101100 | 000001001100 | 9 | 00000000001100011 |
| g | 000100010000 | 000001001100 | 7 | 00000010000100 |
| h | 000100110000 | 000001000100 | 8 | 0000001000011010 |
| i | 000100110000 | 000001011000 | 8 | 0000001000011011 |
| j | 000111010000 | 000000000111 | 5 | 0000001010 |

| | x-coordinate | y-coordinate | Number of terms in each division | Area code |
|---|---|---|---|---|
| | 000000010001 | 000001100000 | 10 | 000000000000101100000 |
| | 000000010011 | 000001100100 | 10 | 000000000000101100001 |
| | 000000011101 | 000001100100 | 9 | 00000000000101 1010 |
| | 000000101100 | 000001000000 | 10 | 00000000000110001010 |
| | 000000101110 | 000001000100 | 10 | 00000000000110001011 |
| C → | 000000101100 | 000001001100 | 9 | 0000000000001100011 |
| A → | 000100010000 | 000001001100 | 7 | 00000010000100 |
| B → | 000100110000 | 000001011000 | 8 | 0000001000011011 |
| D → | 000111010000 | 000000000111 | 5 | 0000001010 |

| | x-coordinate | y-coordinate | Number of terms in each division | Area code |
|---|---|---|---|---|
| | 000000010001 | 000001100000 | 10 | 000000000000101100000 |
| | 000000010011 | 000001100100 | 10 | 000000000000101100001 |
| | 000000011101 | 000001100100 | 9 | 00000000000001011010 |
| | 000000101100 | 000001000000 | 10 | 000000000000110001010 |
| | 000000101110 | 000001000100 | 10 | 000000000000110001011 |
| | 000000101100 | 000001001100 | 9 | 00000000000001100011 |
| A →  | 000100010000 | 000001001100 | 7 | 00000010000100 |
| X → | 000100110000 | 000001000100 | 12 | 000000010000110100001000 |
| B → | 000100110000 | 000001011000 | 7 | 00000010000110 |
| | 000111010000 | 000000000111 | 5 | 0000001010 |

| x-coordinate | y-coordinate | Number of terms in each division | Area code |
|---|---|---|---|
| 000000010001 | 000001100000 | 10 | 00000000000101100000 |
| 000000010011 | 000001100100 | 10 | 00000000000101100001 |
| 000000011101 | 000001100100 | 9 | 000000000001011010 |
| 000000101100 | 000001000000 | 10 | 00000000000110001010 |
| 000000101110 | 000001000100 | 10 | 00000000000110001011 |
| 000000101100 | 000001001100 | 9 | 000000000001100011 |
| 000100010000 | 000001001100 | 7 | 00000010000100 |
| X→000100110000 | 000001000100 | 8 | 0000001000011010 |
| B→000100110000 | 000001011000 | 8 | 0000001000011011 |
| 000111010000 | 000000000111 | 5 | 0000001010 |

| | x-coordinate | | y-coordinate | | Exponent area code | Mantissa area code | |
|---|---|---|---|---|---|---|---|
| | Exponent | Mantissa | Exponent | Mantissa | | | |
| a | 000 | 10001 | 010 | 11000 | (3) 000100 | (4) 1101000010 | (7) |
| b | 000 | 10011 | 010 | 11001 | (3) 000100 | (4) 1101001011 | (7) |
| c | 000 | 11101 | 010 | 11001 | (3) 000100 | (2) 1111100011 | (5) |
| d | 001 | 10110 | 010 | 10000 | (3) 000110 | (5) 1100101000 | (8) |
| e | 001 | 10111 | 010 | 10001 | (3) 000110 | (5) 1100101011 | (8) |
| f | 001 | 10110 | 010 | 10011 | (3) 000110 | (4) 1100101101 | (7) |
| j | 100 | 11101 | 000 | 00111 | (2) 100000 | 1010110111 | (2) |
| g | 100 | 10001 | 010 | 10011 | (3) 100100 | (4) 1100000111 | (7) |
| h | 100 | 10011 | 010 | 10001 | (3) 100100 | (4) 1100001011 | (7) |
| i | 100 | 10011 | 010 | 10110 | (3) 100100 | (3) 1100011110 | (6) |

SYSTEM AND METHOD FOR DATA MANAGEMENT

CROSS REFERENCE TO RELATED APPLICATIONS

This Application claims the benefit of the earlier filing date of Japanese Patent No. 10-063701, filed Mar. 13, 1998 and Japanese Patent No. 11-029016, filed Feb. 5, 1999, the entire contents of which are hereby incorporated herein by reference.

BACKGROUND OF THE INVENTION

1. Field of the Invention

This invention relates to a data management system, a data management method, and a computer-readable medium having stored therein a data management program suitable for managing data such as coordinate data representing points in two-or-more-dimensional spaces.

More particularly, this invention relates to a data management system, a data management method, and a computer-readable medium having stored therein a data management program capable of performing one or more of operations, such as registration, deletion, change, and search (range search, nearest data search, and so forth), on coordinate data on a plane or in a space.

2. Description of the Related art

Many methods for managing multiple-attribute data with the use of computers have been proposed. For example, image processing, computer vision, or drawing management requires computers to manage a huge amount of drawings represented by a large volume of vectors, points, symbols, and so forth. Computers are used to add or delete data, search for desired drawings, and change data.

One of known data management methods is a quad-tree method.

The quad-tree method divides an area into four with the planes each parallel to the two-dimensional plane axes. The method repeats the division recursively until the number of data pieces included in one subarea has become P or less. It then stores the data as a quad-tree. This quad-tree is described, for example, in ACM Computing Surveys, Vol. 20, No. 4, of December, 1988.

A tree generated by this division method is easy to manage because its operation is simple, that is, it only generates child nodes each time it divided a leaf Another advantage of this method is that, because the area is divided into equal-sized sub-areas, the user can identify each sub-area easily. This eliminates the need for the user to memorize each division axis.

On the other hand, this method does not take into account the distribution of data while dividing the area into equal-sized sub-areas. This means that, when data is distributed unevenly, this method generates an unbalanced tree and wastes memory.

The following describes how the quad-tree method stores data. Each sub-area shown in FIG. 13(A) corresponds to a node with the corresponding number shown in FIG. 13(B). Thus, the shaded sub-areas in FIG. 13(A) correspond to the black nodes in FIG. 13(B). FIG. 13 was reproduced from FIG. 3 on page 274 of the above-described document.

However, the enumeration of all the shaded areas (or data included in those areas) represented by a data structure, such as that shown in FIG. 13(A), requires the user to traverse all the sub-trees.

A tree-structured index, used to store data in a conventional data management method, such as the quad-tree method, allows the user to identify point data in a sub-area as an internal node and/or an external node in a sub-tree whose root is a node. However, enumeration of point data in a node requires the user to traverse all sub-trees.

In this type of tree structured index, a sub-area containing many point data pieces usually corresponds to a large sub-tree. Therefore, even if a large sub-tree containing many point data pieces, it is difficult to reduce the time required for traversing to enumerate one point data piece. Rather, efficient traverse of a large sub-tree requires more memory areas for stacks and flags (provided for each node to represent the status of the traverse operation on that node).

As described above, the conventional data structures require extra memory areas and besides an amount of memory occupied by the coordinate data to be retrieved. In addition, enumeration of data found as that included in a sub-range requires the user to traverse sub-trees until all the desired data are reached. This is inefficient.

Although the conventional data structures are generally efficient for processing such data as to be changed frequently, they are inefficient for processing such data as not to be changed or as to be changed rarely. In addition, although the conventional data structures are generally suitable for processing data limited in range and distribution, they cannot cope non-limited, dynamic range (with distributed precision) data. For example, when the x-axis scale unit differs from the y-axis scale unit, normalization is required. However, the conventional data structure has no specific normalization rule.

From the viewpoint described above, the conventional data management methods disclose neither any efficient access means for accessing data determined to be in a specific range, nor any efficient nearest-coordinate search means.

SUMMARY OF THE INVENTION

This invention seeks to solve the problems associated with the conventional data management methods described above. It is an object of this invention to provide a data management system, a data management method, and a computer-readable medium having stored therein a data management program which efficiently use memory areas and significantly increase search efficiency.

The above object has been achieved by the present invention. One aspect of the present invention is a data management system. The system comprises an index containing n-dimensional coordinate data and a search means for searching the index for the coordinate data. The coordinate data in the index is sorted into lexicographic order of area codes, each code generated by taking a prefix of a predetermined length from a coordinate of each dimension in turn and by concatenating the resulting prefixes in a predetermined order of dimensions.

Another aspect of the present invention is a data management method corresponding to the data management system described above. The method comprises the step of searching an index for n-dimensional coordinate data. The coordinate data in the index is the same as that in the system described above.

Further, another aspect of the present invention is a computer-readable medium having stored therein a data management program for managing n-dimensional data stored in an index, the program searching the index for the n-dimensional coordinate data. The program comprises a means for causing a computer to search the index for the n-dimensional coordinate data. The coordinate data in the index is the same as that in the system described above.

Such a structure of the coordinate data results in that the coordinate data is easily searched based on the area codes. This improves substantially the search efficiency.

Other and further objects, features, and advantages of the invention will appear more fully from the following description.

BRIEF DESCRIPTION OF THE DRAWINGS

FIG. 2 is a diagram showing how area nests are stored in the index according to this invention.

FIG. 13 is a diagram showing an example of data management according to the quad-tree method. (A) is a diagram showing how a range is divided into many sub-ranges. (B) is a diagram showing a tree in which a range shown in (A) corresponds to a node.

FIG. 14 to FIG. 55 are diagrams showing (T-1)–(T-116) sequentially.

DESCRIPTION OF PREFERRED EMBODIMENTS

Figure 1:
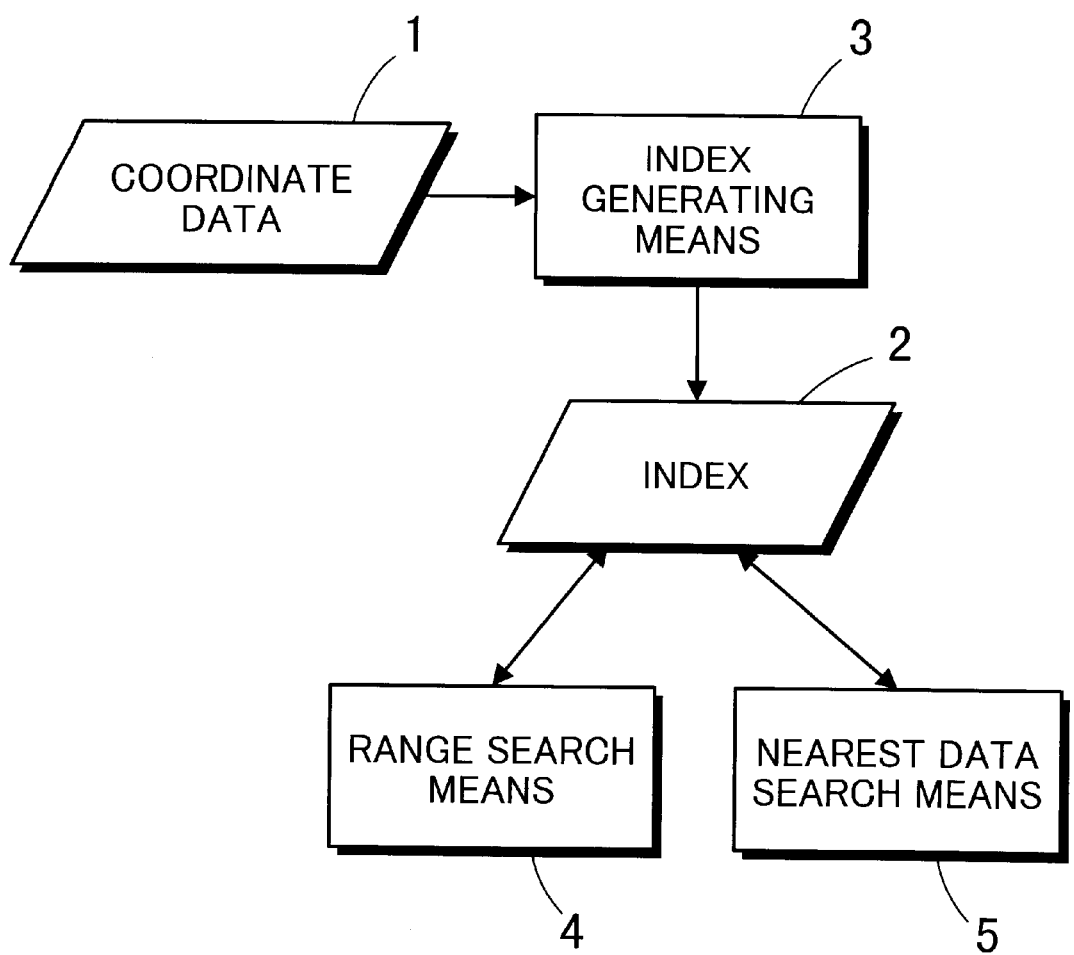
FIG. 1 is a functional block diagram showing the configuration of a first embodiment of this invention.

Some embodiments of this invention will be described more in detail with reference to the drawings.

1. Technical Terms

Before going into the detailed description of each embodiment, the following is what is represented by each of the technical terms used in this specification.
(a) Coordinate Data Management
"Coordinate data management" refers to one or more procedures for processing coordinate data. The one or more procedures include the registration, deletion, change and search (range search, nearest data search, and so on) of coordinate data.
(b) Coordinate Data
In the following embodiments, coordinate data representing a point or an area in a limited, discrete two-dimensional subspace (on a sub-plane) is represented by an x coordinate and a y coordinate, each in a fixed-length bit string in the fixed-point binary representation format.
(c) Representation of an Area With the Prefixes (High-order Digits) of Coordinates in the Fixed-point Binary Representation Format When a fixed number of digits is used for the fixed-point binary representation of coordinate data, the numeric strings, each consisting of the high-order digits (prefix) of the coordinate in each dimension, are made to correspond to a subset of coordinate data in a multi-dimensional subspace. This subset includes all multi-dimensional coordinate data with the same string in the high-order digits but does not include coordinate data with a different string in the high-order digits.

This subset and its representation are called an "area." The numeric string of digits for each dimension is called an "area coordinate." In the following description, "each (area) coordinate" refers to "the (area) coordinate of each dimension."

When two-dimensional data is represented by an x coordinate and a y coordinate, each consisting of 12 bits in fixed-point binary representation, an area (T-1) represents a set of coordinate data (T-2) as shown in FIG. 14. These coordinates represent an area whose x-coordinate is decimally from 256 to 511 and whose y-coordinate is decimally from 64 to 127.

FIG. 14 also shows that an area (T-3) is a set of coordinate data (T-4). These coordinates represent an area whose x-coordinate is decimally from 288 to 319 and whose y-coordinate is decimally from 64 to 79.

Each area coordinate of (T3) is longer than the corresponding one of (T1), and the fact that all of the latter coordinate data is included in the former coordinate data corresponds to the fact that the bit strings "0001" and "000001" of the former coordinates are the high-order digits (prefix) of the bit strings "0001001" and "00000100" of the latter coordinates.

Coordinate data by itself consisting of a predetermined number of bits can be also regarded as an area containing only that coordinate data. In essence, it is not different from an area coordinate consisting of its high-order digits (prefix). Therefore, in the following description, the area coordinates including the coordinates of coordinate data are referred to as "coordinates" unless otherwise stated.

Whether coordinate data (coordinate) represents a point or an area depends on a specific application of this invention; it does not affect the subject matter of this invention.
(d) Outmost Area The set of all coordinates (data) that can be represented in a coordinate data representation format (method) is called an outmost area. The outmost area corresponds to a subset of n-dimensional space that includes all the points and areas that can be represented as coordinate data. The outmost area is represented by the coordinates consisting of null (zero length) bit strings where each coordinate is represented by a bit string shorter than a specific length. For example, for two-dimensional coordinate data, such an outmost area is represented as (,).
(e) Prefixes of Divisions and Area Codes When a numeric string is generated by concatenating the area coordinates or their substrings by turns according to a predetermined dimensional sequence, the numeric string is called an "area code". To generate an area code, for coordinates of multi-dimensions, a set of sequences is defined or specified. Each sequence arranges the lengths (integers of zero or more) of substrings to be taken from the coordinate of each dimension from high-order (leading) digits substring to low-order digits substring. For given coordinates of multi-dimensions, specifying of such a set of sequences generates a unique "area code". This set of sequences is called "prefixes of divisions". The term "prefix of division" is also used to refer to the sequence of each dimension. The terms "prefix of x-division" and "prefix of y-division" are also used in the same manner as "x-coordinate" and "y-coordinate".

The sum of all terms in each prefix of division is equal to or smaller than the length (number of digits) of each coordinate. All the sequences of prefixes of divisions are equal in the number of terms. Since a term in the sequence may be zero, the above condition does not prevent us from representing an arbitrary way of dividing coordinate strings into substrings of prefixes of divisions.

As described above, an "area code" is generated. Substrings are taken from each coordinate so that each substring has the length indicated by each term of the prefix of division of corresponding dimension, that is, the highest-order substring has the length of the first term of the prefix of division, the second highest-order substring has the length of the second term of the prefix of division, and so forth. Then, the substrings are concatenated by turns according to a predetermined sequence of dimensions (for example, in sequence of xy), and for each dimensions in such order that higher-order digits substring precedes, resulting in an area code.

The following describes this procedure, in a general form, for two-dimensional coordinates. That is, from coordinate data(x, y) where $x=x_1 \ldots x_{1x}$ and $y=y_1 \ldots y_{1y}$ and the prefixes of divisions (i, j) where $i=i_1 \ldots i_m, j=j_1 \ldots j_m, i_1 + \ldots + i_m = 1_i, j_1 + \ldots + j_m = 1_j$, an area code $c=c_1 c_2 \ldots c_{1j+1j}$ is generated as follows (that will work in the m=0 case resulting in the null area code):

(1) Let p=0, q=0, k=1, and c be a numeric string with a value null (zero length).
(2) If k>m, then processing ends.
(3) If k≦m, then
(3-1) let $x_{p+1} \ldots x_{p+ik}$ be $c_{p+q+1} \ldots c_{p+q+ik}$ and $p=p+i_k$.
(3-2) let $y_{q+1} \ldots y_{q+jk}$ be $c_{p+q+1} \ldots c_{p+q+jk}$ and $q=q+j_k$.
(4) Let k=k+1 and go back to (2).

This procedure indicates that, once the prefixes of divisions (i, j) are given, a unique area code c is generated from the coordinates (x, y). The following shows an example indicating how this procedure generates an area code. In this example, the coordinates (0001001, 00000100) are used with(prefix of x-division, prefix of y-division) of (43, 62). First, according to "4" in the prefix of x-division, the leading four bits (0001) are taken from the x-coordinate. According to "6" in the prefix of y-division, the leading six bits (000001) are taken from the y-coordinate and concatenated after the former four bits. At this stage, an area code is (0001000001).

Then, according to "3" in the prefix of x-division, the next three bits (001) are taken from the x-coordinate and concatenated after the already-generated 10-bit area code. Then, "2" in the prefix of y-division, the next two bits (00) are taken from the y-coordinate and concatenated after the already-generated 13-bit area code. This results in completion of the area code (T-5) as shown in FIG. 15.

(T-6) in FIG. 15 shows some examples of area codes generated from the coordinates (0001, 000001) and the coordinates (0001001, 00000100) with several prefixes of divisions (prefix of x-division, prefix of y-division).

"A predetermined sequence of dimensions" in which substrings are concatenated is not limited to the sequence of xy. For example, the substrings taken by the first terms in prefixes of divisions may be concatenated in sequence of xy and the substrings taken by the second terms in the prefixes of divisions may be concatenated in sequence of yx.

In addition to concatenating sequences as described above, any concatenating sequence may be used as long as it is not ambiguous how the sequence is determined. For example, a first set of substrings are taken by the first terms in the prefixes of divisions and concatenated in sequence of xy, and then a second set of substrings are taken by the second terms in the prefixes of divisions and concatenated. In this concatenation, the second set of substrings are concatenated in sequence of yx if the first set of substrings are "0000" and "000001" respectively, and in sequence of xy if the first set are "0001" and "000001" respectively.

It is possible to specify two sets of prefixes of divisions satisfying such condition that each prefix of division of one set is a prefix of the corresponding prefix of division of the other. In these cases, the area corresponding to the area code generated by the former prefixes of divisions from a coordinate is included in the area corresponding to the area code generated by the latter prefixes of divisions from another coordinate if and only if the former area code is a prefix of the latter area code.

That is, when two sets of prefixes of divisions satisfies the condition mentioned above, comparison between the area codes generated by them makes it possible to decide whether or not one area is included in the other, each of which corresponds to the area codes. The use of area codes eliminates the need for checking whether or not the former coordinates are prefixes of the latter one by one.

As shown in (T-7) of FIG. 15 and in (T-8) of FIG. 16, each coordinate of the former (top) coordinates is a prefix of that of the latter (bottom) coordinates. In (T-7) and (T-8), a portion where the former is a prefix of the latter is underlined.

Similarly, (T-9) in FIG. 16 includes (T-10). Also note that the outmost area (,)(,) includes all areas.

As described above, a unique area code may be generated from coordinates and prefixes of divisions. Nevertheless, in the following description, an area code is apposed to an area represented by coordinates and prefixes of divisions for convenience.

(f) Representation of a Series of Areas (Area Nest) With Coordinates and Prefixes of Divisions An "area code" is generated from substrings taken by turns from the beginning (higher-order digits) of coordinates according to the "prefixes of divisions". Therefore, even if the length of each coordinate is larger than the sum of the terms in the corresponding prefix of division, the area code may be generated without any trouble. It should also be noted that the length of each coordinate of an area to be represented can be acquired as the sum of the terms in corresponding prefix of division. Therefore, in combination with a set of prefixes of divisions, all the coordinates having the same prefix in each coordinate up to the length calculated from the prefix of division as mentioned above, can be regarded to represent the same area. Besides, they yields the same area code.

For example, as shown in FIG. 17, since the coordinates of (T-11) have the coordinates of (T-12) as their prefixes, (T-12) may be represented as (T-13) in which the same coordinates as those shown in (T-11) are used. Similarly, the outmost area may be represented as (T-14).

Thus, specific coordinates may be combined with each set in a plurality of sets of prefixes of divisions in which each prefix of divisions of one set (former) is a prefix of that of the other set (latter). Such a combination represents a plurality of areas, one area corresponding to the latter set includes the other area corresponding to the former set. Each of such prefixes of divisions may be represented by combining the one having the longest prefix of division (divisions) with the length of its prefix (the number of terms).

(T-15) in FIG. 17 shows an example of such a combination. (T-16) in FIG. 18 shows four areas represented by combining the prefixes of divisions with the same coordinates.

As described above, it is possible to generate divisions consisting of n terms so that the sum of terms in each prefix of division is not larger than the length of the coordinate. When prefixes of divisions represented by such divisions and the number of terms are combined with specific coordinates, variation of the number of terms allows n+1 areas including the outmost area to be represented.

Such a combination of coordinates and divisions is called an "area nest." Specifying of the number of terms m (0 to n) for this area nest one of n+1 areas to be represented. This is called a "m-prefix area."

An area includes another area represented by a larger number of terms. When the length of each coordinate is larger than the sum of terms in the divisions, the area represented by the coordinates themselves is a smaller area included in every area of the n+1 areas.

Each of the coordinates of the above-described "m-prefix area" may be replaced by a prefix which is one digit shorter than the coordinate itself for a dimension whose m-th term in the prefix of divisions is not zero. The resulting coordinates represent an area and it is called an "m-prefix super area". When the coordinates are k-dimensional data represented in the binary format and m-th prefix of each division is not zero, the "m-prefix area" is one of 2 to the k-th power areas represented by adding one bit to each coordinate of the "m-prefix super area." In the following description, the "prefixes of divisions" are specified and represented by combination of a set of divisions and a number of terms.

(g) Representation of Area Nests to Which Coordinate Data Belong

As described above, a combination of coordinate data with divisions each consisting of n terms, represents n+1 areas including the coordinate data and an area certainly includes another area represented by a larger number of terms.

For example, (T-17) in FIG. 18 shows three areas represented by a combination of coordinate data with divisions each consisting of two terms, with the number of terms specified. The bottom of the three areas is the outmost area.

As will be described later, an index according to the present invention contains combinations of coordinate data and divisions as an area nest to which the coordinate data belongs.

(h) Representation of Areas by the Storage Addresses of Area Nests and the Number of Terms The search means described below deals with various areas during search operation. These areas are represented as "m-prefix areas" and "super areas" of an area nest in the index. Therefore, storage and reference of such areas are carried out using the storage address of an area nest and the number of terms.

That is, [address, number of terms] is used for representing the area and the super area which are stored at the specified address and which correspond to the specified number of terms. For example, "area [address, number of terms]" refers to the area, and "super area [address, number of terms]" refers to the super area.

Each search means uses queues or stacks that have an area as their element so as to temporarily store a plurality of areas to be processed. As an element in these queues or stacks, the above-described [address, number of terms] will be used.

The search result of the search means, which is also coordinate data in the index, is represented by its storage address. The index, which contains from beginning with address 0, contains at least one area nest in each address.

For the sake of convenience, coordinates described in the following embodiments will be dealt with as those in the two-dimensional space (on the sub-plane) as referred to in the above description.

2. Embodiments and a Computer

The embodiments of this invention are executed on a computer and their functions are implemented by controlling the computer using predetermined procedures programs).

"Means" described in this specification, which are conceptual entities corresponding to the functions of each embodiment, do not correspond to a specific hardware unit or a software routine on a one-to-one basis. One hardware unit may function as different means depending on the situations. For example, the computer may execute one instruction to function as one means while it may execute another instruction to function as another means. One means may be executed by only one instruction as well as by multiple instructions. For this reason, this specification uses virtual circuit blocks (means) each having a function of an embodiment so as to describe the embodiments. As long as a user follows the basic operation rule, he or she may change the execution order, execute multiple steps at a time, or change the execution order for each execution. These changes of the execution order are achieved by the menu-driven interface, which should be provided to allow a user to select whatever execution mode he or she wishes.

3. First Embodiment

[3-1. Overall Configuration of the First Embodiment]

FIG. 1 is a functional block diagram showing the configuration of the first embodiment.

As shown in FIG. 1, a data management system in this embodiment comprises an index 2 in which coordinate data 1 is stored, an index generating means 3 for generating the index from coordinate data, range search means 4 for searching coordinate data in the two-dimensional space (plane)for all coordinate data included in a specified rectangle range and for enumerating it, and nearest data search means 5 for determining one of the nearest data to a specified coordinate data.

The configuration of the index, the index generating means, the range search means, and the nearest data search means will be described below in detail. The index is commonly used to realize the above two search means.

[3-1-1. Configuration of an Index]

An index of this embodiment contains coordinate data combined with divisions, which are arranged in lexicographic order (ascending order) of area codes. The area codes are generated from the coordinate data and divisions, and stored in contiguous addresses of the storage unit. FIG. 2 shows an example of how the index stores areas in this embodiment.

As described in [1. Technical terms], a set of coordinates and divisions is called an "area nest." This area nest, when combined with numbers of terms, represents a plurality of "areas" including the coordinates.

(Divisions)

The following describes divisions.

Divisions to be given to coordinates in this embodiment are set up to satisfy the following condition. The condition is that "when there are a plurality of area nests including the same m-prefix area, they includes the same (m+1)-prefix super area and there are at least two different (m+1)-prefix areas in them."

These area nests all have the same prefix up to the (m+1)-th term of divisions. For all area nests, since (m=0)-prefix is the same the outmost area, divisions include the same (m+1=1)-th term. In addition, all area nests include the same "1-prefix super areas".

(T-18) in FIG. 19 shows an example of an index. It contains 10 sets of coordinates and divisions. A pair of coordinates in each set consists of x-coordinate and y-coordinate both in 12-bits fixed-point representation. At the right end are shown "area codes" generated from the coordinate data and divisions. These area codes may be calculated from the area nests (coordinates and divisions).

As described above, the area nests are sorted in lexicographic order (ascending order) of area codes generated from coordinate data and divisions.

As described in (f) of [1. Technical terms], "1-prefix super area" of each area nest is represented by coordinates generated by replacing each of coordinates of "1-prefix area" with a prefix which is one digit shorter than the coordinate itself. Thus, for the "1-prefix super area", the prefix of x-division is (4−1=) 3 and the prefix of y-division is (6−1=) 5.

Therefore, the "1-prefix super area", as shown in (T-19) of FIG. 19, is common to all area nests. And, the 1-prefix areas are divided into three different areas: areas of addresses 0 to 5 corresponding to (T-20) in FIG. 19, area of address 6 corresponding to (T-21) in FIG. 20, and areas of addresses 7 to 9 corresponding to (T-22) in FIG. 20.

Another example is shown. Three area nests of addresses 7 to 9, which include the same "1-prefix area", also include the same "2-prefix super area" since the prefix of x-division and the prefix of y-division of the "2-prefix super area" are (43−1=) 42 and (62−1=) 61, respectively and their prefix of x-coordinates up to 6(=4+2) bits and prefix of y-coordinates up to 7(=6+1) bits coincide each other. This is shown in (T-23) of FIG. 20. However, the "2-prefix areas" shown in (T-24) of FIG. 20 are different with each other.

Figure 3:
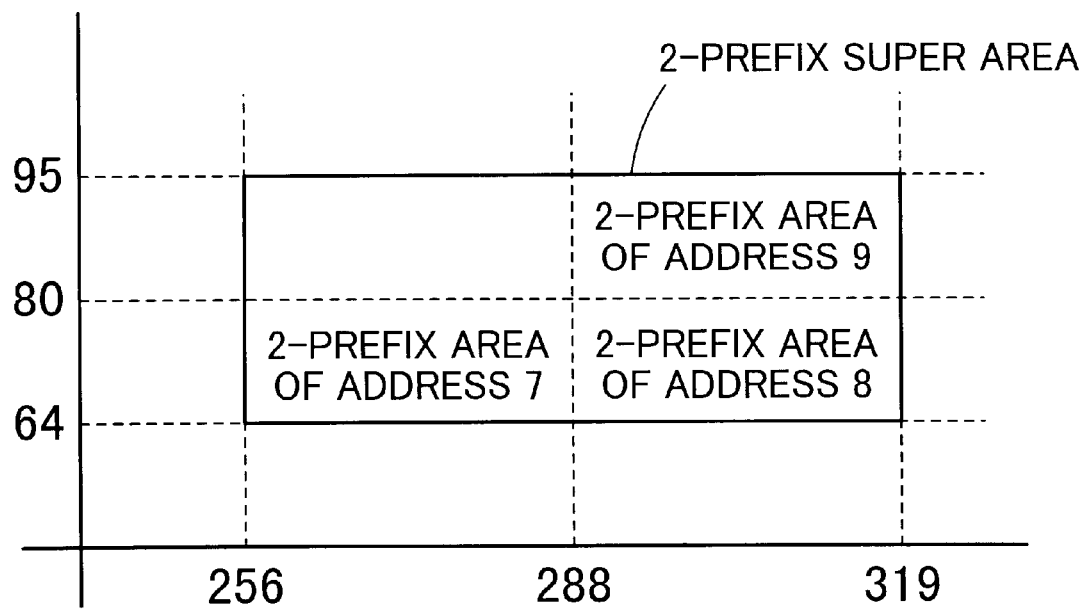
FIG. 3 is a diagram showing a "2-prefix super area" and "2-prefix areas" used in the first embodiment.

This is shown in FIG. 3. That is, as described in (c) of [1. Technical terms], a prefix (high-order digits) of coordinate data in fixed-point binary representation represents an area. For example, when the "2-prefix super area" is shown in (T-25) of FIG. 21, the x-coordinate and the y-coordinate represent a set of coordinate data shown in (T-26) of FIG. 21.

The area represented by these coordinates is an area with the x-coordinate between 256 and 319 decimally and with the y-coordinate between 64 and 95 decimally.

The area represented by the coordinates of address 7 is a set of coordinate data (T-27) in FIG. 21. The area represented by these coordinates is an area with the x-coordinate between 256 and 287 decimally and with the y-coordinate between 64 and 79 decimally.

The area represented by the coordinates of address 8 is a set of coordinate data (T-28) in FIG. 21. The area represented by these coordinates is an area with the x-coordinate between 288 and 319 decimally and with the y-coordinate between 64 and 79 decimally.

The area represented by the coordinates of address 9 is a set of coordinate data (T-29) in FIG. 21. The area represented by these coordinates is an area with the x-coordinate between 288 and 319 decimally and with the y-coordinate between 80 and 95 decimally.

As shown in this example, "when there are multiple area nests including the same 1-prefix area (three area nests of addresses 7 to 9), they include the same 2-prefix super area and there are at least two different 2-prefix areas." This satisfies the above-described condition "when there are multiple area nests including the same m-prefix area, they include the same (m+1)-prefix super area and there are at least two (m+1) areas in them."

[3-1-2. Configuration of the Index Generating Means]

The index generating means used in this embodiment sets up divisions to coordinate-data stored from address A to address B in an random access storage and, at the same time, sorts the area nests in ascending order of area codes to make them an index.

As described above, the means stores in a storage word specified by one address not only coordinate data but also its divisions or prefixes of divisions. Initially, the prefixes of divisions are (,). Also assume that B>A (at least two area nests).

The procedure described below uses a queue in which a variable number of address pairs {a, b} may be stored.

(1) Initialize the (empty) queue and add {A, B}.
(2) End the procedure if the queue is empty. If the queue is not empty, take out the first element as {a, b} and deletes that element from the queue.
(3) For coordinates stored between addresses a and b, find the maximum and minimum values and, for each dimension, find the number of high-order matching digits (the length of matching prefix) between the two.
(4) Go back to (2) if, for all dimensions, the length of matching prefix=coordinate length (number of digits of a coordinate).
(5) For coordinate data in each dimension of the same divisions stored between addresses a and b, calculate the difference between (each matching prefix length+1) and (sum of the terms in each prefix of division) and add the difference to the end of each prefix of division. For a dimension whose matching prefix length equals the coordinate length, add 0 to the end of the prefix of division.
(6) Sort the area nests stored between addresses a and b into ascending order of area codes generated according to the divisions updated in the above step (5).
(7) (7-1) Let p=a.
    (7-2) Find the largest address of the consecutive addresses with the same area code as that of address p and let it be "q".
    (7-3) If p<q, then add {p, q} to the queue.
    (7-4) Let p=q+1
    (7-5) Go back to (7-2) if p<b.
        Go back to (2) if p>=b.

The matching prefix length of each dimension found in step (3) is the matching prefix length of all coordinate data of each dimension stored in addresses between a and b. Finding the matching prefix length from the maximum and minimum is just one of the methods.

In step (7-2), no specific method is given to find the largest of the consecutive addresses that contain area nests include the same area code. There are many methods of doing so. For example, the address may be incremented until a different area code is found or the binary search method may be used.

(T-30) in FIG. 22 shows an example of an index generated according to the above procedure.

[3-1-3. Configuration of the Range Search Means]

The range search means used in this embodiment comprises the following steps:

(1) Initialize the result list.
(2) Initialize the area queue.
(3) Select any entry from the index, for example, address 0 and combine it with number of terms 0 to generate [0, 0] for processing.
   (3-1) When the super area [0, 1] cannot be calculated (the number of terms in the divisions is zero), add the coordinate data of address 0, if included in the specified range, to the result list.
   (3-2) When the super area [0, 1] is included in the specified range, add all data (addresses) contained in the index to the result list.
   (3-3) When the super area [0, 1] is not included in, but overlaps with, the specified range, add [0, 1] to the area queue.
(4) If the area queue is empty, the procedure ends. If the area queue is not empty, take out the first element as [a, m] and delete it from the queue.
(5) Perform step (6) for each of four ($2^2$) areas generated by adding numbers 0 and 1, respectively, to the end of the coordinates of the super area [a, m].
(6) Only when the index contains an area nest whose m-prefix area is the area, perform one of the following conditional steps with one of the addresses in which such an area nest is stored being "b":
   (6-1) When the super area [b, m+1] cannot be calculated (the number of terms in the divisions is m), add the coordinates of address b, if included in the specified range, to the result list.
   (6-2) When the super area [b, m+1] is included in the specified range, add all addresses in which area nests having the area [b, m] as m-prefix area are stored to the result list.
   (6-3) When the super area [b, m+1] is not included in, but overlaps with, the specified range, add [b, m+1] to the area queue.
   (6-4) When the super area [b, m+1] does not overlap with the specified range, there is no processing to be performed for the area.
(7) Go back to step (4).

[3-1-4. Configuration of the Nearest Data Search Means]

The nearest data search means used in this embodiment comprises the following steps:

(1) Let an entry in the index, for example coordinate data of address 0, be the nearest data candidate p. Let the distance between the coordinate data and the specified point be r.
(2) Initialize the (empty) area stack.
(3) Combine address 0 with number of terms 0 to generate [0, 0] for processing. When the super area [0, 1] can be calculated (the number of terms in the divisions is one or more), add [0, 1] to the area stack.
(4) If the area stack is empty, the procedure ends. If not, take out the top element as [a, m] for processing and delete it from the area stack.
(5) When the distance between the super area [a, m] and the specified coordinates is r or larger, go back to (4). If it is smaller than r, perform step
(6) for each of four ($2^2$) areas generated by adding numbers 0 and 1, respectively, to the end of the coordinates of the super area [a, m].
(6) Only when the index contains an area nest whose m-prefix area is the area, perform one of the following conditional steps with one of the addresses in which such an area nest is stored being "b":
   (6-1) When the super area [b, m+1] cannot be calculated (the number of terms in the divisions is m), let "b" be a new nearest data candidate p and let the distance be r if the distance between the coordinate data of address b and the specified coordinates is smaller than r. If r=0, the procedure ends.
   (6-2) When the super area [b, m+1] is included in the range which is within r from the specified coordinates, let "b" be a new nearest data candidate p and let the distance between the coordinate data of address b and the specified coordinates be r. Add the super area [b, m+1] to the area stack.
   (6-3) If the super area [b, m+1] is not included in the range shorter than (within) r from the specified coordinates but the distance from the specified coordinates is smaller than r, add the super area [b, m+1] to the area stack.
   (6-4) When the distance between the super area [b, m+1] and the specified coordinates is r or larger, there is no processing to be performed for the area.
(7) Go back to step (4).

[3-2. Operation and Effects of the First Embodiment]

[3-2-1. Operation and Effects of the Index Generating Means]

Figure 4:
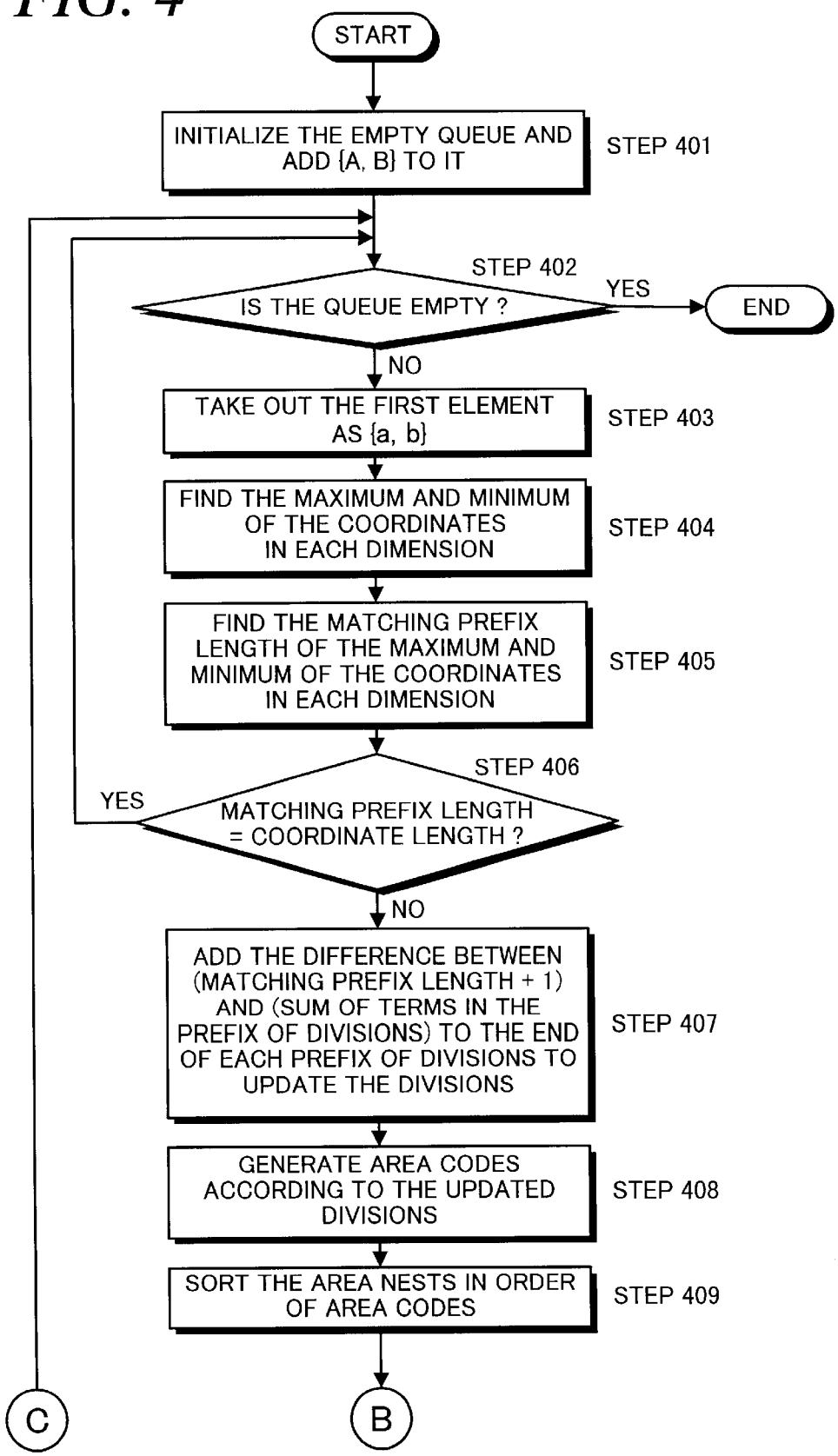
FIG. 4 is a flowchart showing the first-half processing of index generating means of the first embodiment.
Figure 5:
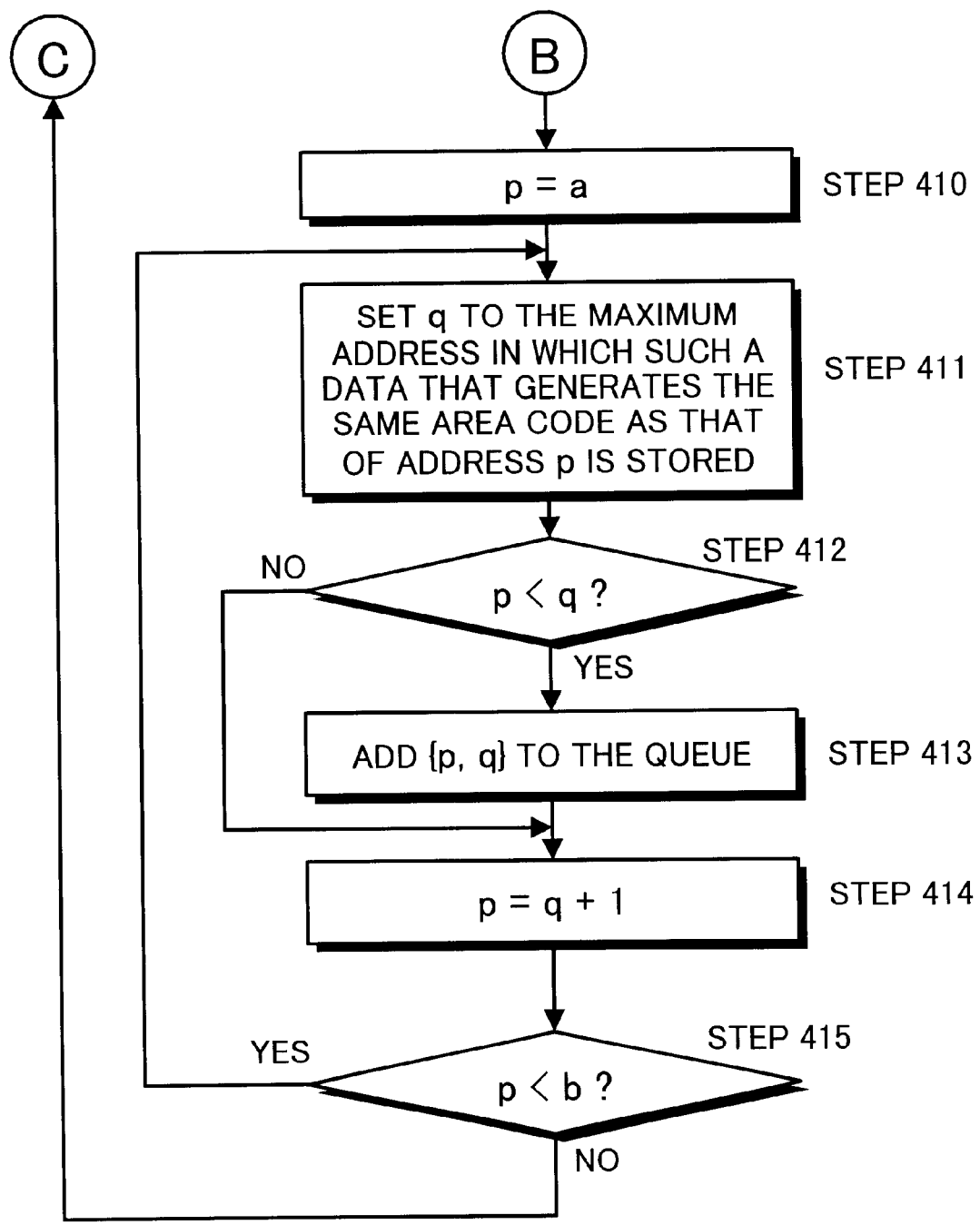
FIG. 5 is a flowchart showing the last-half processing of index generating means of the first embodiment.

Referring now to the flowcharts shown in FIGS. 4 and 5, the following describes how the index generating means generates an index. The index generating means processes two-dimensional coordinates and two-dimensional null-initialized prefixes of divisions stored in addresses 0 to 9 shown in (T-31) of FIG. 23.

For easy understanding, symbols a–j are given to the coordinates initially stored in addresses 0–9. This helps to keep track of how the coordinates are re-arranged.

First, in step 401, the queue is initialized and {0, 9} is added to the initialized queue. This element is taken out immediately as {a, b} in step 403 and is deleted from the queue.

Next, in step 404, for the coordinates stored in addresses 0 to 9, it is found the maximum and the minimum of the x-coordinate and y-coordinate. The maximum and the minimum of the x-coordinate are 000111010000 and 000000010001, respectively, and the matching prefix length is "3". The maximum and the minimum of the y-coordinate are 000001100110 and 000000000111, respectively, and the matching prefix length is "5" (step 405). Each of the matching prefix lengths is smaller than the coordinate length "12", and so control goes to step 407. Because each prefix of division is null and therefore the sum of terms in every prefix of division is 0, "matching prefix length+1" is set as a first term in each prefix of the division. In this example, the prefix of x-division is "4" and the prefix of y-division is "6".

In step 408, the area codes are generated according to the divisions (4, 6) as shown in (T-32) of FIG. 24.

Then, in step 409, these area nests are sorted in ascending order of area codes as shown in (T-33) of FIG. 25.

Control goes to step 410, and addresses p and a are set up as p=a=0. Then, in step 411, because the area code 0000000001, which is generated by the area nest stored in address 0, is also generated by the area nests stored in the contiguous addresses up to 5 (from 0), q is set to 5 (q=5). In step 412, it is checked whether p<q. Because p<q, {0, 5} is added to the queue (step 413). Then, p=5+1=6 (step 414). Because p<9, control goes back to step 411 (step 415).

Next, in step 411, for the area code of the area nest stored in address 6, it is not generated by any area nest stored in other addresses. So, addresses q and p are set up as q=p=6 and control goes to step 413, then to step 414. In step 414, address p is set up as p=6+1=7. Because p<9, control goes back to step 411 again (step 415).

Next, because the area code 0001000001, which is generated by the area nest stored in address 7, is also generated all the area nests stored in addresses 7–9, q is set to 9 (q=9) (step 411). It is checked whether p<q. Because p<q, {7, 9} is added to the queue (steps 412, 413). In step 414, p=9+1=10. Because p>b (10>9), control goes back to step 402 (step 415). As a result, the queue contains two elements as shown in (T-34) of FIG. 25 (with the leftmost as the first element).

Next, in step 403, the first element {0, 5} is taken out as {a, b} and is deleted from the queue. In step 404, it is found the maximum and the minimum of the x-coordinate and y-coordinate of the coordinates stored in addresses 0 to 5. The maximum and the minimum of the x-coordinate are 000000101110 and 000000010001, respectively, and the matching prefix length is "6". The maximum and the minimum of the y-coordinate are 000001100100 and 000001000000, respectively, and the matching prefix length is "6" (step 405). Each of the matching prefix lengths is smaller than the coordinate length "12", and control goes to step 407. In addition, for each (prefix of) division stored in addresses 0–5, (6+1)–4=3 is added as the second term of the prefix of x-division and (6+1)–6=1 is added as the second term of the prefix of y-division.

In step 408, area codes are generated according to the divisions (43, 61) as shown in (T-35) of FIG. 26.

Then, in step 409, the area nests of addresses 0 to 5 are sorted into ascending order of area codes. The result is shown in (T-36) of FIG. 27.

In steps 410 to 413, it is found that the area code 00000000010001, which is generated by the area nest stored in address 0, is also generated by all the area nests stored in the contiguous addresses from 0 to 2. It is also found out that the area code 00000000010010, generated by the area nest stored in address 3, is also generated by all the area nests stored in the contiguous addresses from 3 to 5. So, {0, 2} and {3, 5} are added to the queue. As a result, when control goes back to step 402 again, the queue contains the elements as shown in (T-37) of FIG. 27.

In step 403, the first element {7, 9} is taken out as {a, b} and is deleted from the queue. In step 404, it is found the maximum and the minimum of the x-coordinate and y-coordinate of the coordinates stored in addresses 7 to 9. This results in that the matching prefix length of the x-coordinate is "6" and the matching prefix length of the y-coordinate is "7" (step 405). These are smaller than the coordinate length "12" and therefore control goes to step 407. Then, for each of the prefixes of divisions stored in addresses 7 to 9, (6+1)–4=3 is added to the prefix of x-division as the second term, and (7+1)–6=2 is added to the prefix of y-division as the second term.

In step 408, area codes are generated for the coordinates stored in addresses 7 to 9 according to the divisions (43, 62). The result is shown in (T-38) of FIG. 28.

In step 409, the area nests stored in addresses 7 to 9 are sorted into ascending order of area codes. The result is shown in (T-39) of FIG. 29.

Because the area nests stored in addresses 7 to 9 differ in area code each other, no pair of addresses is added to the queue and control goes back to step 402. At this time, the queue contains the elements shown in (T-40) of FIG. 29.

Next, in step 403, the first element {0, 2} is taken out as {a, b} and is deleted from the queue. In step 404, it is found the maximum and the minimum of the x-coordinate and y-coordinate of the coordinates stored in addresses 0 to 2. This results in that the matching prefix length of the x-coordinate is "8" and that the matching prefix length of the y-coordinate is "9" (step 405). These are smaller than the coordinate length "12" and therefore control goes to step 407. Then, for each of the prefixes of divisions stored in addresses 0 to 2, (8+1)–(4+3)=2 is added to the prefix of x-division as the third term, and (9+1)–(6+1)=3 is added to the prefix of y-division as the third term.

In step 408, area codes are generated for the coordinates stored in addresses 0 to 2 according to the divisions (432, 613). The result is shown in (T-41) of FIG. 30.

In step 409, the area nests of addresses 0 to 2 are sorted into ascending order of area codes. The result is shown in (T-42) of FIG. 31.

Because the area nests stored in addresses 0, 1, and 2 differ in area code each other, no pair of addresses is added to the queue and control goes back to step 402. At this time, the queue contains the elements shown in (T-43) of FIG. 31.

Next, in step 403, the first element {3, 5} is taken out as {a, b} and is deleted from the queue. In step 404, it is found the maximum and the minimum of the x-coordinate and y-coordinate of the coordinates stored in addresses 3 to 5. This results in that the matching prefix length of the x-coordinate is "102 and that the matching prefix length of the y-coordinate is "8" (step 405). These are smaller than the coordinate length "12" and therefore control goes to step 407. Then, for each of the prefixes of divisions stored in addresses 3 to 5, (10+1)–(4+3)=4 is added to the prefix of x-division as the third term, and (8+1)–(6+1)=2 is added to the prefix of y-division as the third term.

In step 408, area codes are generated for the coordinates stored in addresses 3 to 5 according to the divisions (434, 612). The result is shown in (T-44) of FIG. 32.

In step 409, the area nests of addresses 3 to 5 are sorted into ascending order of area codes. The result is shown in (T-45) of FIG. 33.

Because the area nests stored in addresses 3, 4, and 5 differ in area code each other, no pair of addresses is added to the queue and control goes back to step 402. At this time, the queue contains no element. Then, the index generating means ends processing. The index is generated in this manner.

[3-2-2. Effects of the Index on the Search Means]

The search means use the index in one of the following three methods:

(1) Specify an address a and get the data (coordinate data and/or prefixes of divisions) of an area nest stored in the address a.
(2) Search the index for an area nest including a m-prefix area which is generated by adding a digit to the end of each coordinate of the m-prefix super area of the area nest stored in an specified address a. Get the address of such an area nest if it exists.
(3) Search the index for all the area nests including the same m-prefix area as that of the area nest stored in an specified address a. Get all addresses (including the address a) of such area nests.

The method of (1) may be executed on a usual storage device.

The method of (2) may be executed as follows. First, prefixes of divisions are generated by combination of the divisions stored in a specified address with a specified number as the number of terms. Then, a prefix is taken from each coordinate of coordinate data stored in the address so that the length of the prefix is equal to the sum of the terms in each prefix of division. The digit at the end of each prefix of coordinate is changed into a digit to be added. An area code is generated using the prefixes of coordinates modified as mentioned above and the prefixes divisions. After that, according to binary search method, the index is searched for an address that contains an area nest having an area code that includes the same code as prefix as that of the generated area code.

The area nests in the index are arranged as follows. For arbitrary m smaller than the number of terms in the divisions, there is one or more areas may include the matching (m−1)-prefix area (that is, areas including a matching prefix whose length equals the sum of leading (m−1) terms in the divisions). All of such one or more areas have the same m-prefix super area (that is, they include a matching prefix with the shorter length by 1 than the sum of leading m terms in the divisions). Also, they have two or more different m-prefix areas (that is, different sets of the last digits of the prefixes of the coordinates whose lengths are the sum of leading m terms in the divisions) in them. They are arranged in ascending order according to the predetermined precedence/significance order of dimensions (for example, in order of x-coordinate and y-coordinate).

This arrangement order matches the lexicographic order (ascending order) in which the area codes are compared as digit number (bit) strings, beginning with the leftmost position.

Therefore, two procedures are implemented by binary search of the index as follows. One procedure is that for searching the index for an area nest having the same m-prefix area as that represented by the length-m prefixes of divisions of another area nest and arbitrary coordinates in the index. The other procedure is that for selecting one area nest from such areas if they have been found. These two procedures are implemented by providing one area code generated from the prefixes of divisions and coordinates to make a key, and by searching for an area nest having an area code that includes the key as a prefix according to binary search method.

The following shows an example. In this example, the index is searched for an area nest having the area (T-47) (#1) shown in FIG. 33 as the 2-prefix area. (T-47) is one of the four areas shown in (T-46). The four areas are represented by each coordinate generated by adding "0" or "1" to the end of the coordinates of the super area [4, 2] and the length-2 prefix of divisions (43, 61) of the divisions (434, 612) stored in address 4.

The binary search procedure first compares the area code of (T-48) in FIG. 34 generated by the area nest stored in the address 4 with the area code of the above-described area #1 to be searched. This area code is called a "key area code." The area nest shown in (T-48) is an area nest placed approximately at the center of the index, that is, stored in address 4 found by (0+9)÷2.

The two numeric strings are compared, bit by bit, from the beginning and, when the first mismatch is found, the numeric string containing "0" in that position is determined to be smaller than the numeric string containing "1". As long as this comparison rule is observed, any comparison procedure may be used. If the end of one numeric string is reached before a mismatch is found, that numeric string is determined to be the prefix of another.

In this example, the key area code (00000000010000) is compared with the area code (00000000010010011001) of address 4. The first mismatch is found in bit 13, where the bit of the key area code is "0" and the bit of the area code generated by the area nest stored in address 4 is "1". Then, the search procedure compares the area code shown in (T-49) with the area code (00000000010000). The area nest shown in (T-49) is an area nest located approximately at the center of addresses 0 to 3 in the index, that is, the area nest of address 1 ((0+3)÷2).

In this case, the key area code is also smaller. Therefore, the area code of the area nest shown in (T-50), which is the only area nest of address 0 or lower, is compared with the key area code (00000000010000).

In this case, the key area code is also smaller and the binary search ends. This determines that, in the index, there is no area nest that has an area code including the key area code as a prefix (that is, an area nest having the above-described area #1 as 2-prefix area).

On the other hand, the index is searched according to binary search using the area code of the area #2 in (T-51) of FIG. 34 as a key area code. In this search, if the key area code is compared with the area code of address 4 in (T-52), like the above example, it is determined that the key area code (00000000010001) is smaller. However, if the key area code is compared with the area code in (T-53), it is found that the key area code (00000000010001) is a prefix of the area code of the area nest stored in address 1. Therefore, it is determined that the index contains an area nest having the same 2-prefix area as that of the above-described area and that one of them is stored in address 1.

The index used in this embodiment has the following advantages. That is, in comparison of an area code in an area nest in the index with an area code used as a key for binary search, it is necessary only to compare two area codes for a prefix of the length required to determine the relation (difference or equality) between the two. Prefixes of divisions or divisions don't have to be referenced.

That is, if the index contains an area code in each area nest beforehand, bit-string comparison is required only between the key area code and the area code stored in each address. Standard computers, which have the bit string comparison function, may execute this comparison efficiently.

Even if the index does not contain an area code in an area nest, the area code may be calculated up to the length necessary in comparison. This type of comparison also increases efficiency.

As to the method of (3), when one area nest stored in an address a includes an m-prefix area, there may be another area nest including the same m-prefix area as that of the area nest of address a. Such an area nest should be stored in an address contiguously located before or after address a.

Therefore, the method described in (3) may be executed as follows. The index is searched into the forward direction of address a, for an area nest having an area code that includes the key area code as a prefix, to enumerate the resulting addresses. The index is searched also into the backward direction of address a, for an area nest having an area code that includes the key area code as a prefix, to enumerate the resulting addresses. A combination of the resulting addresses and address "a" is the result of the method of (3).

For example, an area nest including area [1, 2] as a 2-prefix area is should be stored in addresses immediately before or after address 1. In the index of this example, it is stored in address 0 and address 2.

That is, the method first checks address 0 that precedes address 1 and finds that the area code of area [1, 2] is the prefix of the area code in (T-55). The matching prefix is underlined. The index has no more address before this. Therefore, enumeration of addresses before address 1 in which the matching area code is stored ends.

For address 2 which follows address 1, the method finds that the area code has the prefix matching the area code of area [1, 2] as shown in (T-56) of FIG. 35. For address 3, as shown in (T-57) of FIG. 35, the method finds that the area code does not have the prefix matching the area code of area [1, 2]. Therefore, enumeration of addresses after address 1 ends at address 2.

Combining the result of the enumeration with address 2, it is found that an area nest including area [1, 2] as a 2-prefix area is stored in addresses 0, 1, and 2.

As described above, the index used in this embodiment allows the search means to efficiently perform any of the operations described in (1), (2), and (3).

That is, when getting data as described in (1), area codes may be compared at a high speed as described in (2) and (3) if the area codes are stored. If the area codes are not stored but only the coordinates and divisions are stored, a large amount of memory for containing numeric (bit) strings may be saved.

In addition, by reversing the steps for generating an area code from the coordinates and divisions, the prefix of the coordinates may be restored from the area code using the divisions. Therefore, an extended area code generated by adding the trailing string of the coordinates to the area code in a predetermined order of dimensions, used in conjunction with the coordinates, enables the coordinates to be restored. In this case, the length of each coordinate (number of bits) is given.

Therefore, the index may contain only extended area codes and divisions; in this case, the coordinates are restored each time they are required. The amount of memory for containing the extended area codes and divisions is as small as the amount of memory for containing the coordinates and divisions.

[3-2-3. Operation and Effects of the Range Search Means]

Figure 6:
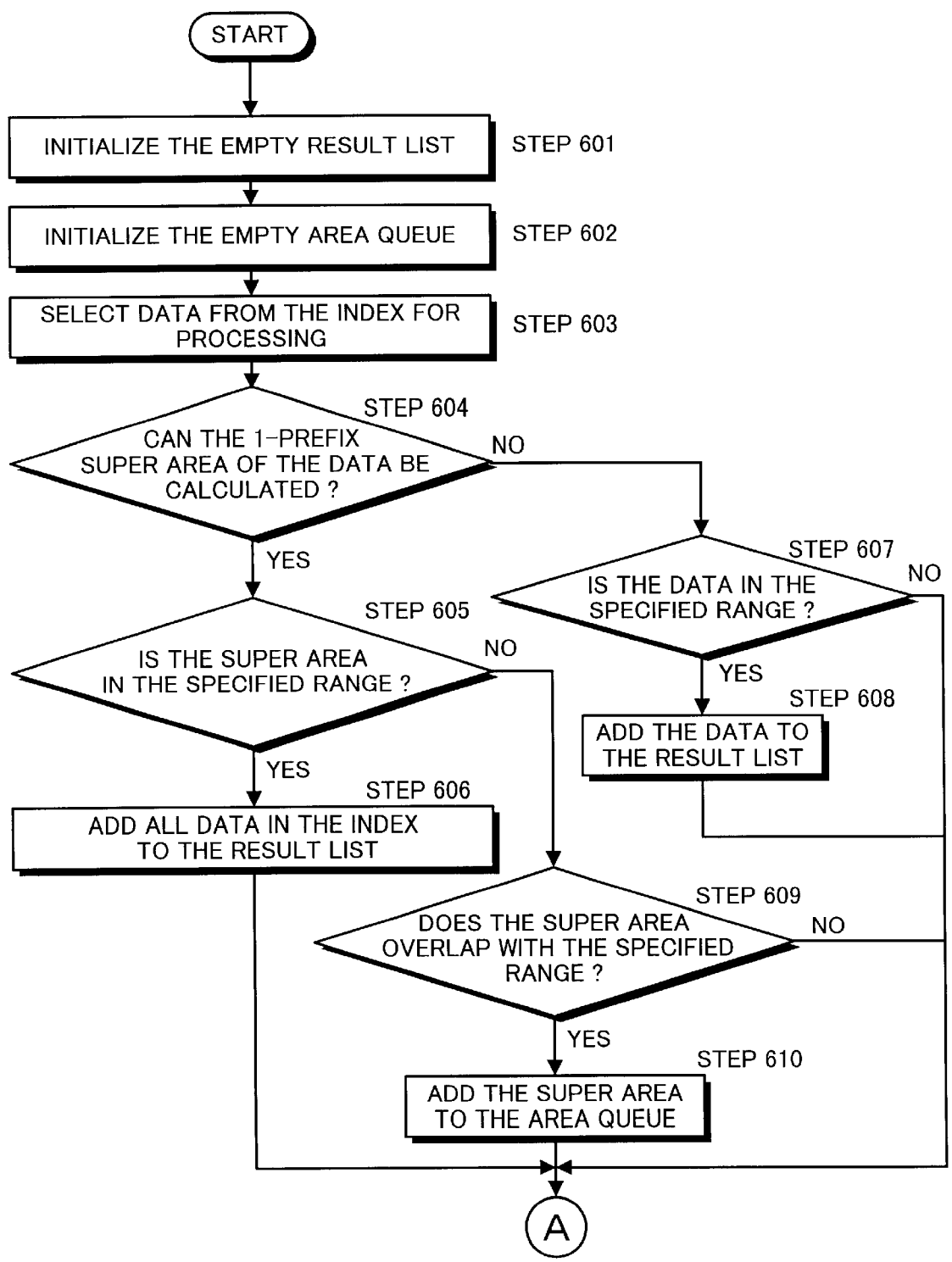
FIG. 6 is a flowchart showing the first-half processing of range search means of the first embodiment.
Figure 7:
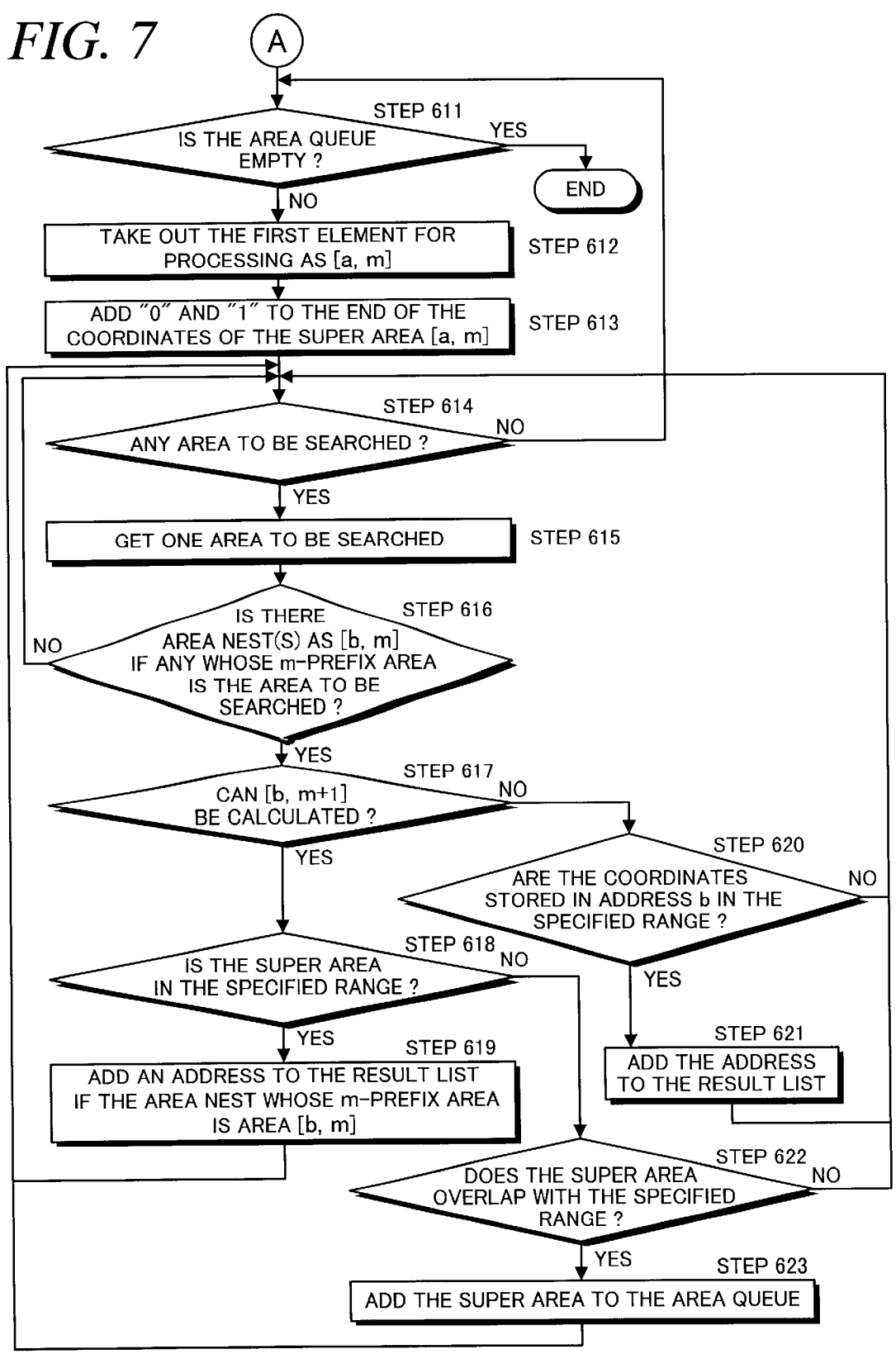
FIG. 7 is a flowchart showing the last-half processing of range search means of the first embodiment.

Referring now to the flowcharts shown in FIGS. 6 and 7, the following describes the operation of the range search means. In this example, the above-described index is used. The coordinates of the bottom-left corner and the top-right corner of the range shown in (T-58) of FIG. 36 are given.

In steps 603 and 604, the super area [0, 1] is calculated as that in (T-59). Then, in step 605, the range search means check if this super area is included in the above specified range. Because the super area is not included in, but overlaps with, the specified range (step 609), the super area [0, 1] is added to the empty area queue initialized in step 602 (step 610).

Then, it is checked whether the area queue is empty (step 611). The super area [0, 1] added in step 610 is taken out from the queue as the first element [a, m]=[0, 1]. (step 612)

Figure 36:
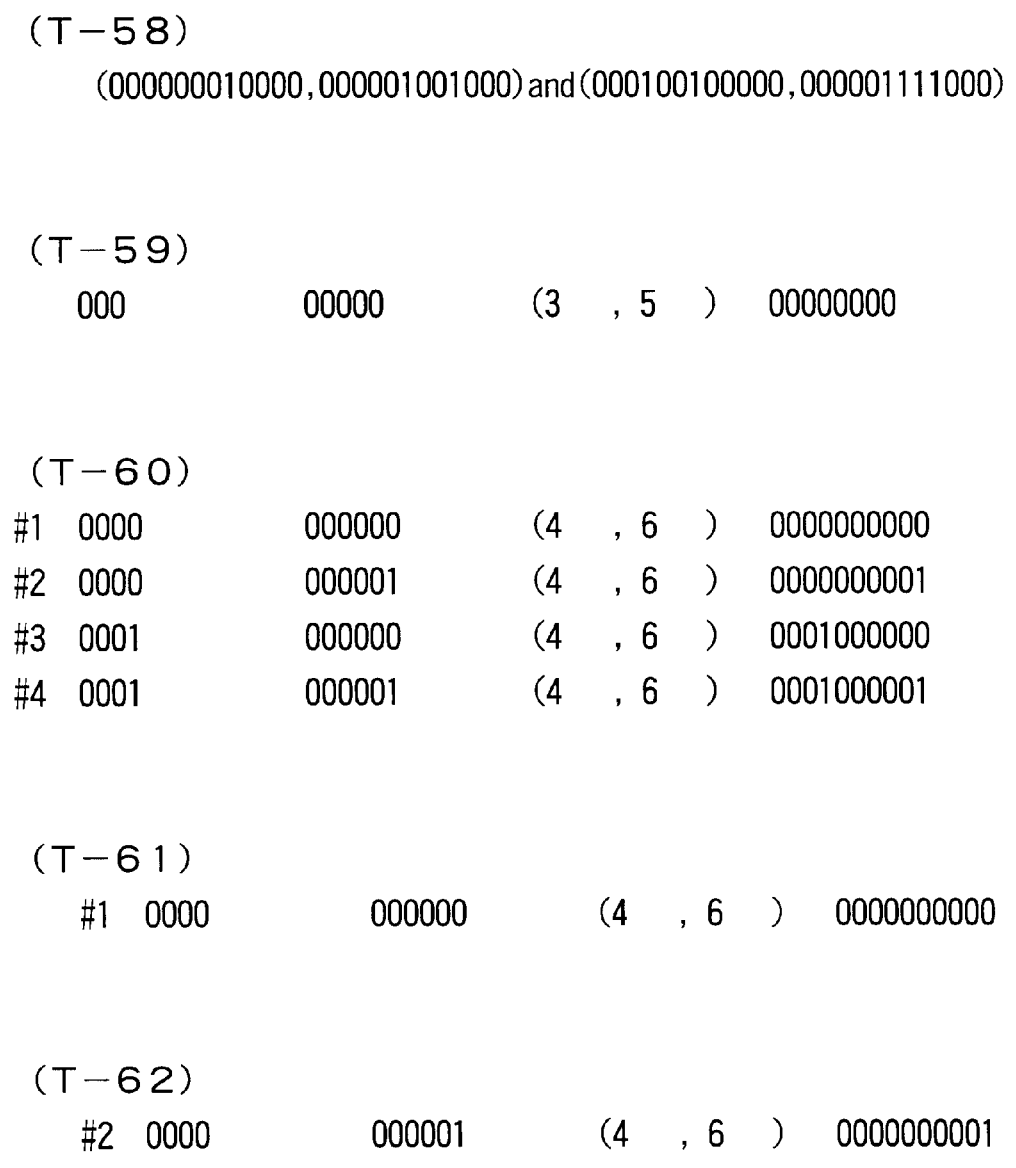

In step 613, "0" or "1" is added to the end of each coordinate of the super area [0, 1] to generate four areas shown in (T-60) of FIG. 36.

In step 615, area #1 (T-61), the first area of the four, is taken out and it is checked whether the index contains an area nest including area #1 as a 1-prefix area (step 616). Because the index does not contain such an area nest, the range search means do not process this area and passes control back to step 614.

Next, in step 615, area #2 (T-62), the second area of the four, is taken out and it is checked whether the index contains an area nest including area #2 as a 1-prefix area (step 616). Because area nests including area #2 as a 1-prefix area are stored in addresses 0, 1, 2, 3, 4, and 5, control goes to step 617. In that step, 4 is assigned to b (b=4) and the super area [4, 2] is calculated as shown in (T-63) of FIG. 37. In step 618, a check is made if this super area is in the specified range. Because the super area is not included in, but overlaps with, the specified range (step 622), the super area [4, 2] is added to the area queue (step 623) and control goes back to step 614.

Next, in step 615, area #3 (T-64), the third area of the four, is taken out and it is checked whether the index contains an area nest including area #3 as a 1-prefix area (step 616). An area nest including area #3 as a 1-prefix area is stored in address 6. 6 is assigned to b. Because the super area [6, 2] cannot be calculated, control goes to step 620. In that step, it is checked whether the coordinates of address 6 are included in the specified range. It is determined that the coordinates are not included in the specified range, and control goes back to step 614.

Next, in step 615, area #4 (T-65), the fourth area of the four, is taken out and it is checked whether the index contains an area nest including area #4 as a 1-prefix area (step 616). Because area nests including area #4 as a 1-prefix area are stored in addresses 7, 8, and 9, 7 is assigned to b and the super area [7, 2] is calculated as shown in (T-66). In step 618, a check is made if this super area is in the specified range. Because the super area is not included in, but overlaps with, the specified range (step 622), the super area [7, 2] is added to the area queue (step 623) and control goes back to step 614. In step 614, control goes back to step 611 because all four areas to be searched have been processed.

In step 612, the first element [4, 2] is taken out as [a, m].

Figure 38:
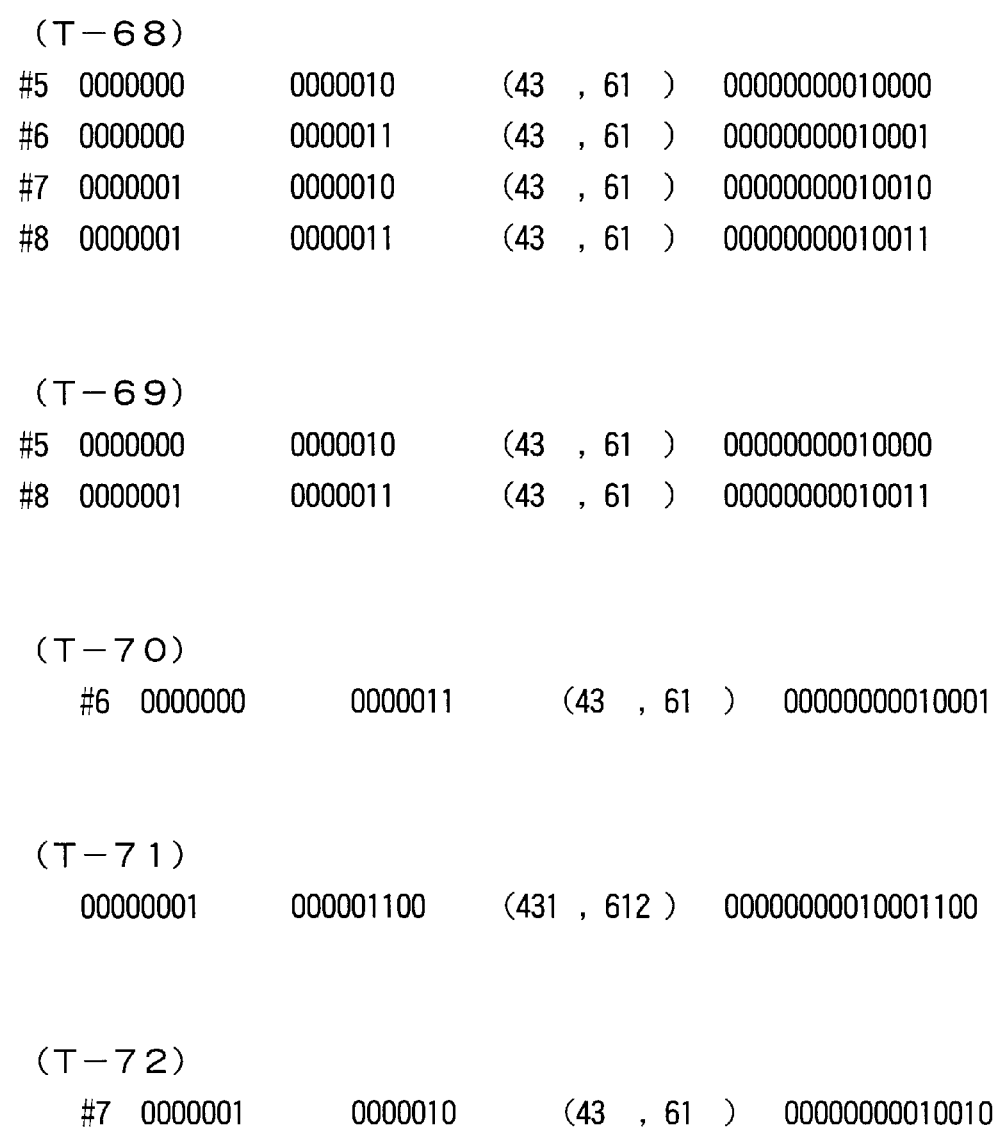

In step 613, "0" or "1" is added to the end of each coordinate of the super area [4, 2] to generate four areas shown in (T-68) of FIG. 38.

In step 615 and the following steps, area #5 (first area) and area #8 (fourth area) (T-69) are not processed because the index does not contain area nests including area #5 or area #8 as 2-prefix area. For these areas, control goes back to step 614.

Area nests whose 2-prefix area is the second area, area #6 (T-70), is stored in addresses 0, 1, and 2 (step 616). 1 is assigned to b and the super area [1, 3] is calculated as shown in (T-71). Because this is included in the specified range (step 618), control goes to step 619. In that step, addresses 0, 1, and 2 where area nests including area [1, 2] as a 2-prefix area are added to the result list.

Figure 39:
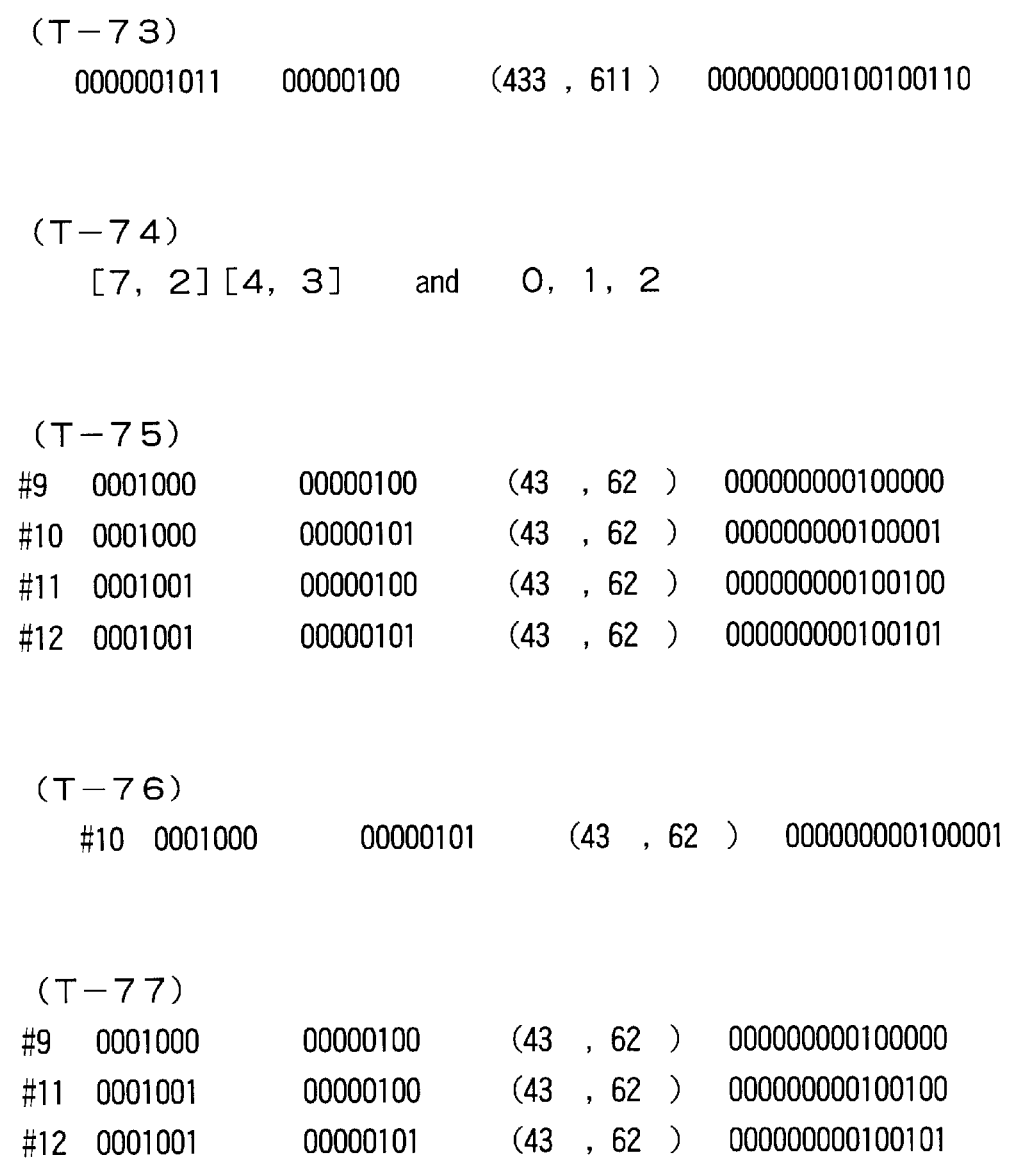

Area nests whose 2-prefix area is the third area, area #7 (T-72), is stored in addresses 3, 4, and 5 (step 616). 4 is assigned to b, and the super area [4, 3] is calculated as shown in (T-73) of FIG. 39. This is not included in, but overlaps with, the specified range (step 622). Therefore, the super area [4, 3] is added to the area queue (step 623) and control goes back to step 614. In step 614, control goes to step 611 because all four areas to be searched have been processed.

As a result, the area queue and the result list are as shown in (T-74). The leftmost element is the first element.

In step 612, the first element [7, 2] is taken out as the first element [a, m].

In step 613, "0" or "1" is added to the end of each coordinate of the super area [7, 2] to generate four areas shown in (T-75) of FIG. 39.

In step 615 and the following steps, area #10 (T-76), which is the second area of the four, is not processed because the index does not contain area nests whose 2-prefix area is area #10. For this area, control goes back to step 614.

Area nests whose 2-prefix area is area #9 (first area), area #11 (third area), and area #12 (fourth area) (T-77) are stored in addresses 7, 8, and 9, respectively (step 616). However, because super area [7, 3], super area [8, 3], and super area [9, 3] cannot be calculated, it is checked whether the coordinates of these addresses are in the specified range (step 620).

As a result, it is determined that the coordinates stored in address 7 are included in the specified range but that the coordinates stored in addresses 8 and 9 are not. Thus, address 7 is added to the result list (step 621) and control goes back to step 614. It is determined, in step 614, that all four areas to be searched have been processed. Control goes back to step 611.

As a result, the area queue and the result list are as shown in (T-78) of FIG. 40 (with the leftmost as the first element).

Then, in step 612, the first element [4, 3] is taken out as [a, m].

In step 613, "0" or "1" is added to the end of each coordinate of the super area [4, 3] to generate four areas shown in (T-79) of FIG. 40.

In step 615 and the following steps, area #16 (fourth area) is not processed because the index does not contain area nests whose 3-prefix area is area #16 (T-80). For this area, control goes back to step 614.

Area nests whose 3-prefix area is area #13 (first area), area #14 (second area), and area #15 (third area) (T-81) are stored in addresses 3, 4, and 5, respectively (step 616). However, because super area [3, 4], super area [4, 4], and super area [5, 4] cannot be calculated, it is checked whether the coordinates of these addresses are in the specified range (step 620).

As a result, it is determined that the coordinates of addresses 3 and 4 are included in the specified range but that the coordinates of address 5 are not. Therefore, addresses 3 and 4 are added to the result list (step 621) and control goes back to step 614. In step 614, it is found that all four areas to be searched have been processed. Control goes back to step 611.

In step 611, a check is made if the area queue is empty. Since it is the case, the range search means end processing.

The result list is as shown in (T-82). As shown in the list, the coordinates of addresses 0, 1, 2, 3, 4, and 7 out of those of addresses 0 to 9 are included in the specified range.

The range search means used in this embodiment enumerates all points included in a specified range according to the above procedure. The index used in this embodiment, in which the coordinates are stored consecutively in random access storage in order of area codes, does not use extra pointer areas as with the conventional structure such as the tree structure. It also gives you all coordinate data included in a specified range quickly.

In the above description, the range search means searches a rectangle, specified by the bottom-left and top-right corners, for the coordinates. As long as the inclusion and overlap of the ranges, coordinates, and areas are identified, the search range is not limited to a rectangle.

[3-2-4. Operation of the Nearest Data Search Means]

Figure 8:
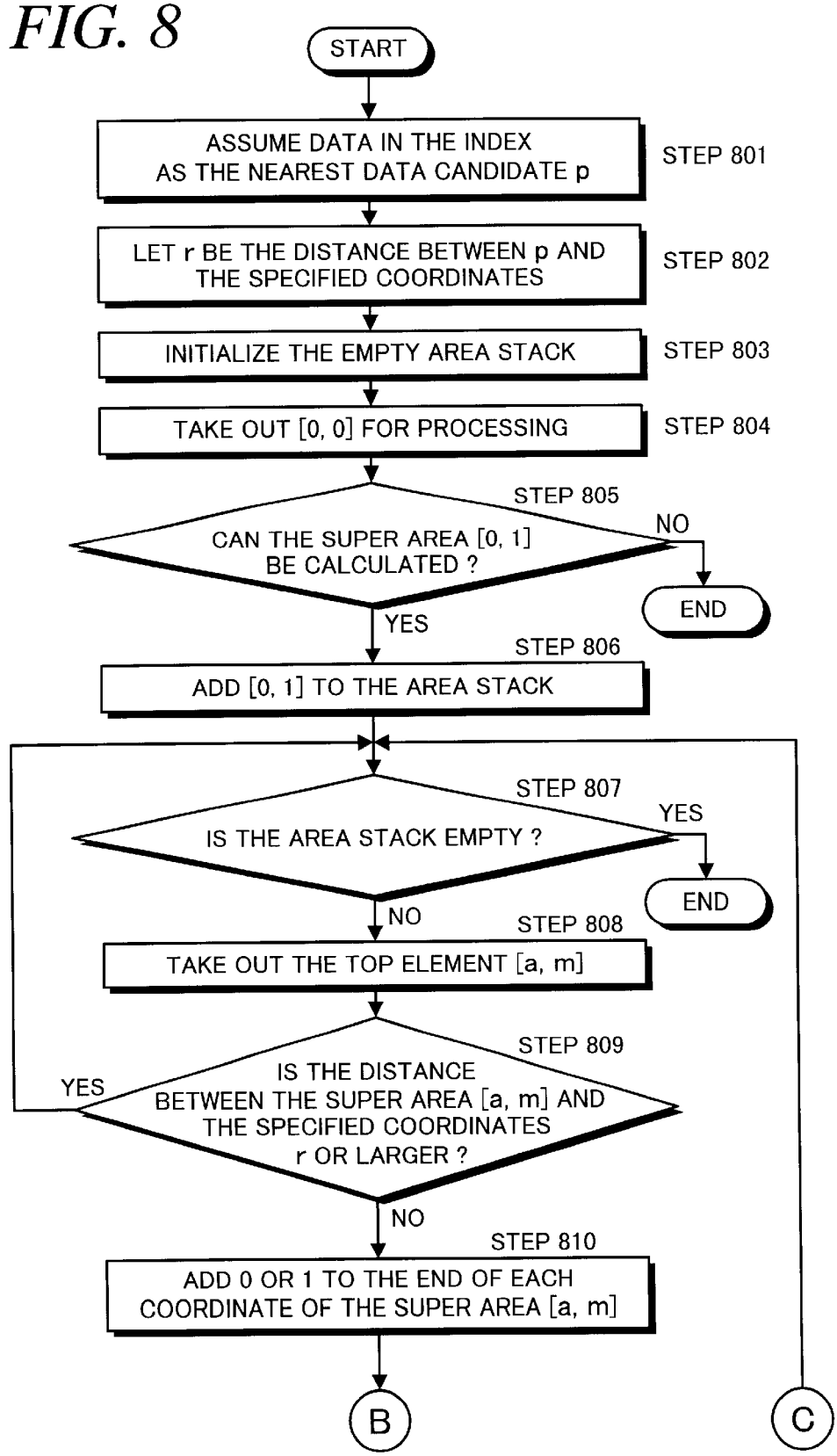
FIG. 8 is a flowchart showing the first-half processing of nearest data search means of the first embodiment.
Figure 9:
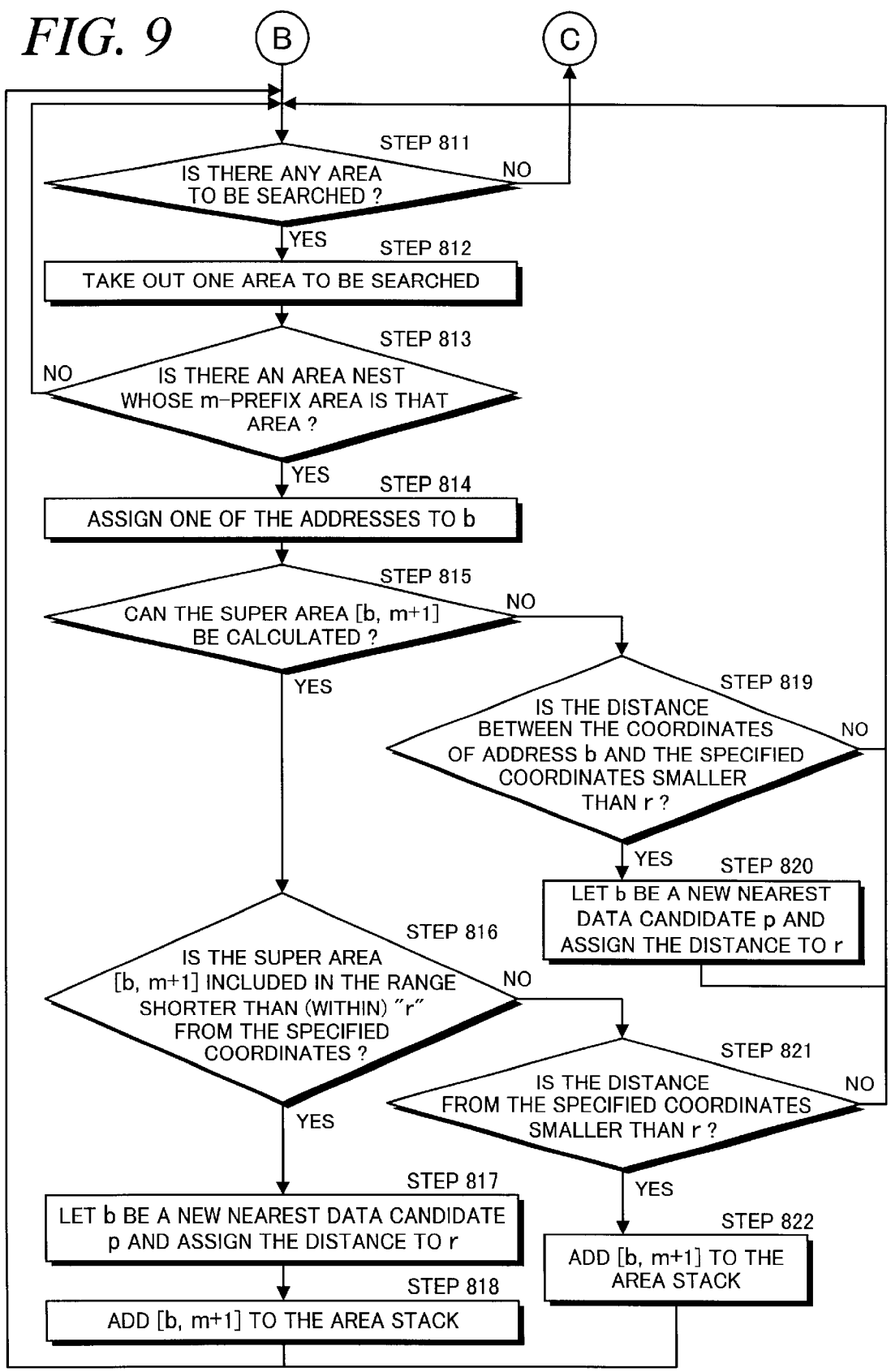
FIG. 9 is a flowchart showing the last-half processing of nearest data search means of the first embodiment.

Referring now to the flowcharts shown in FIGS. 8 and 9, the following describes the operation of the nearest data search means. The specified coordinates are shown in (T-83) of FIG. 41.

In step 801, the coordinates stored in address 0 are assumed as the nearest data candidate p. Address 0, not the coordinate data, is set in p. The distance between the coordinates p=(17, 96) and the specified coordinates (100, 50) is set to r=sqrt((100−17)$^2$+(50−96)$^2$)=sqrt(9005). (step 802)

In the following, sqrt( ) means the square root calculation.

Figure 41:
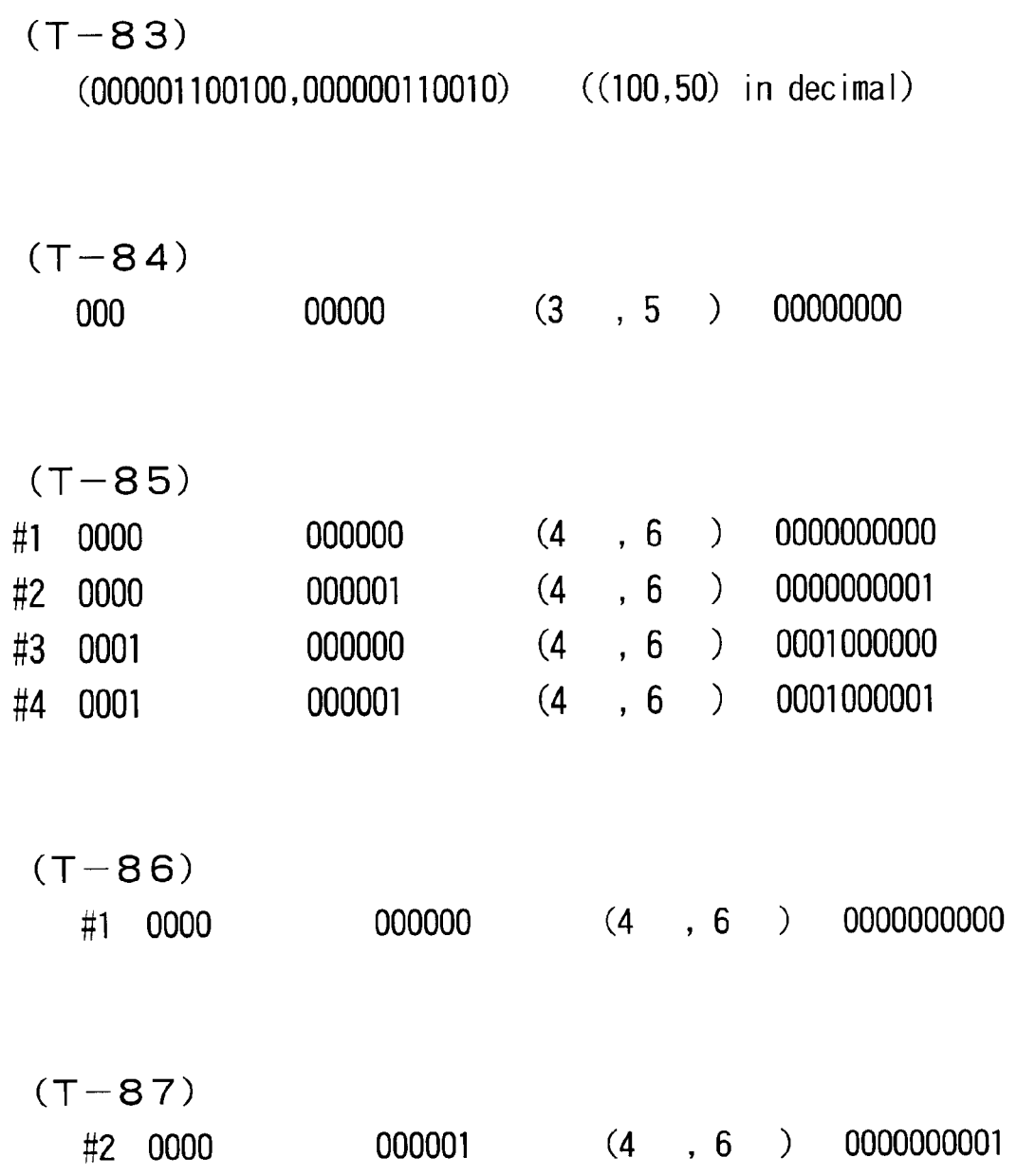

In step 805, the super area [0, 1] is calculated as shown in (T-84) of FIG. 41. [0, 1] is added to the empty area stack initialized in step 803. (step 806).

Then, a check is made if the area stack is empty (step 807). The super area [0, 1] added in step 806 is taken out immediately from the area stack as the top element [a, m]=[0, 1] (step 808).

In step 809, a check is made if the distance between the super area [0, 1] and the specified coordinates is equal to or larger than "r". In this example, because the specified coordinates are included in the super area [0, 1], the distance between them, which is 0 is smaller than "r".

Therefore, control goes to step 810, and "0" or "1" is added to the end of each coordinate of the super area [0, 1] to generate four areas shown in (T-85) of FIG. 41.

In step 812, area #1 (T-86) (first area of the four) is taken out and it is checked whether the index contains an area nest including area #1 as a 1-prefix area (step 813). Because the index does not contain an area nest including area #1 as the 1-prefix area, the search means do not concern about this area any more and returns control to step 811.

Next, in step 812, area #2 (second area) (T-87) is taken out and a check is made if the index contains an area nest including area #2 as the 1-prefix area (step 813). Because the 1-prefix area of the area nests stored in addressees 0 to 5 is area #2, control goes to step 814. In that step, 4 is assigned to b and the super area [4, 2] is calculated as shown in (T-88) of FIG. 42 (step 815)

Then, in step 816, it is checked whether this super area is in the range shorter than (within) "r" from the specified coordinates.

That is, out of distances between each coordinates in this super area [4, 2] and the specified coordinates, the distance between the bottom-right corner coordinates (63, 64), which is nearest to the specified coordinates, and the specified coordinates is sqrt((63−100)$^2$+(64−50)$^2$)=sqrt(1565). This is smaller than "r" given above. At the same time, the distance between the top-left corner coordinates (0, 127), which is the longest distance from the specified coordinates, and the specified coordinates is sqrt((0−100)$^2$+(127−50)$^2$)=sqrt (15929). This is larger than "r" given above. Therefore, it is determined that this area has its part within r from the specified coordinates but that this area is not included in the range shorter than (within) "r" from the specified coordinates (step 816, step 821).

Control goes to step 822, the super area [4, 2] is added to the area stack, and then control goes back to step 811.

Next, in step 812, area #3 (T-89) which is the third area of the four is taken out, and it is checked whether the index contains an area nest including area #3 as the 1-prefix area (step 813). Because the 1-prefix area of the area nest stored in address 6 is area #3, control goes to step 814.

6 is assigned to b. The super area [6, 2] cannot be calculated and, therefore, control goes to step 819 to calculate the distance between the coordinates (464, 7) stored in address 6 and the specified coordinates. The distance is sqrt((464−100)$^2$+(7−50)$^2$)=sqrt(134345) which is larger than "r". The nearest data candidate p is not updated, and control goes back to step 811.

Next, in step 812, area #4 (T-90) which is the fourth area of the four is taken out, and it is checked whether the index contains an area nest including area #4 as the 1-prefix area (step 813). Because the 1-prefix area of the area nests stored in addresses 7 to 9 is area #4, control goes to step 814. 7 is assigned to b. The super area [7, 2] is calculated as shown in (T-91) (step 815).

Then, in step 816, it is checked whether this super area is in the range shorter than (within) "r" from the specified coordinates.

That is, the distance between the super area and the specified coordinates is the distance between the bottom-left corner coordinates (256, 64) of the area, the point in the super area nearest to the coordinates, and the coordinates. The distance is calculated as sqrt($(256-100)^2+(64-50)^2$)= sqrt(24532). Because this is larger than "r", no processing is performed on this area and control goes to step 821, and then to step 811. In step 811, it is determined that all four areas to be searched have been processed. Control goes back to step 807.

As a result, the contents of the area stack (with the rightmost as the top element) and the values of p and r are as shown in (T-92) of FIG. 42.

Next, in step 808, the top element [4, 2] in the area stack is taken out as [a, m]. And, in step 809, it is checked whether the distance between the super area [4, 2] and the coordinates is smaller than "r".

Figure 43:
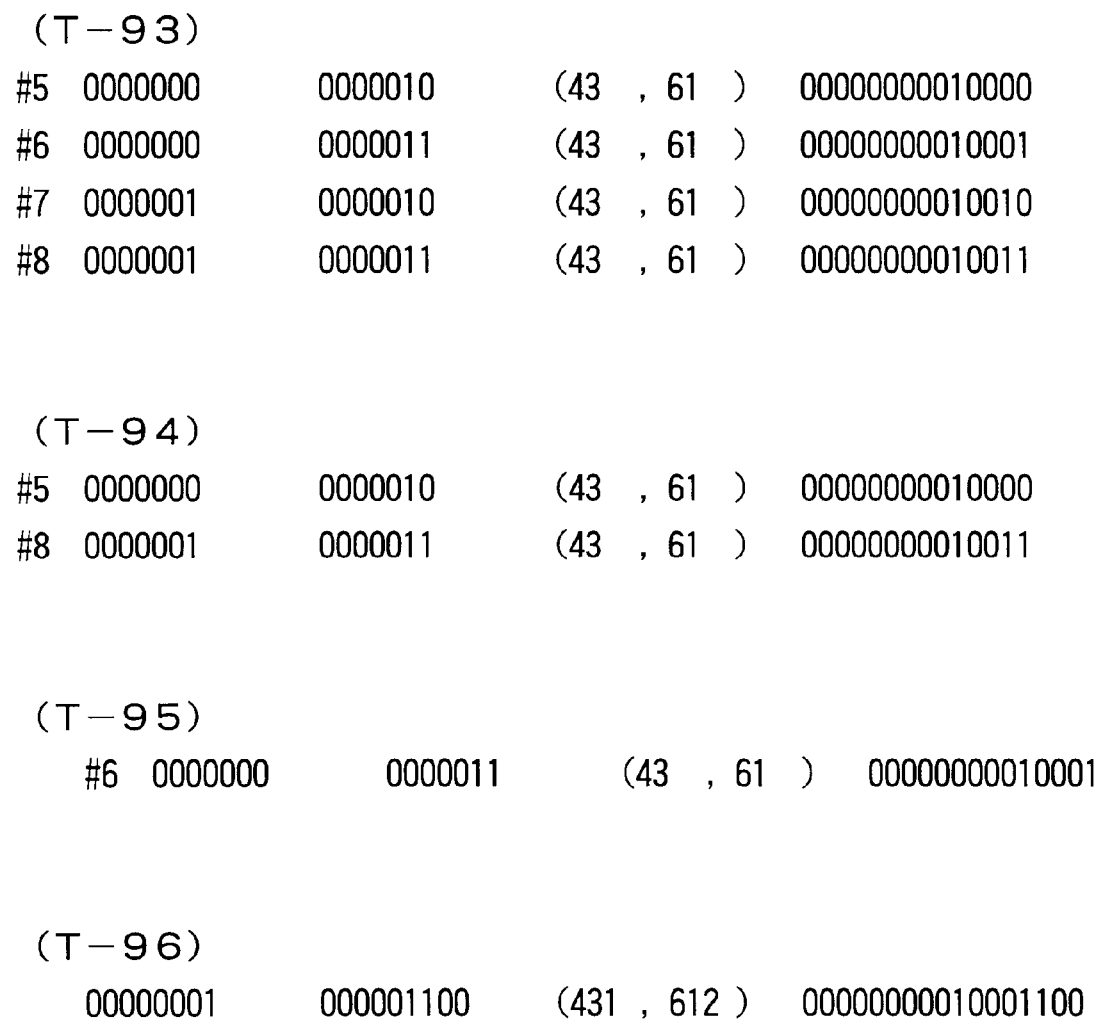

In this example, the distance between the super area [4, 2] and the specified coordinates is sqrt(1565), which is smaller than "r". Control goes to step 810, "0" or "1" is added to the end of each coordinate of the super area [4, 2] to generate four areas shown in (T-93) of FIG. 43.

In step 812 and the following steps, area #5 (first area) and area #8 (fourth area) (T-94) are not processed because the index does not contain area nests whose 2-prefix area is area #5 or area #8. For these areas, control goes back to step 811.

Next, it is found that the index contains area nests whose 2-prefix area is area #6 (second area) (T-95) in addresses 0, 1, and 2 (step 813). 1 is assigned to b. The super area [1, 3] is calculated as shown in (T-96) (step 815).

Then, in step 816, it is checked whether this super area is in the range shorter than (within) "r" from the specified coordinates.

The distance between the super area and the specified coordinates is calculated as follows. The distance between the bottom-right corner coordinates (31, 96) of the area, the point in the super area nearest to the coordinates, and the coordinates is calculated as sqrt($(31-100)^2+(96-50)^2$)=sqrt(6877). This is smaller than "r". And, the distance between the top-left corner coordinates (0, 127) of the area, the point in the super area most distant from the coordinates, and the coordinates is calculated as sqrt($(0-100)^2+(127-50)^2$)=sqrt(15929). This is larger than "r". Therefore, it is determined that the area overlaps with, but not included in, the range shorter than (within) r from the specified coordinates (step 816, step 821).

Then, control goes to step 822 to add the super area [1, 3] to the area stack, and control goes back to step 811.

Next, it is found that the index contains area nests whose 2-prefix area is area #7 (third area) (T-97) shown in FIG. 44 are stored in addresses 3, 4, and 5. 4 is assigned to b. The super area [4, 3] is calculated as shown in (T-98) (step 815).

Then, in step 816, it is checked whether this super area is in the range shorter than (within) "r" from the specified coordinates.

The distance between the top-left corner coordinates (32, 95) of the area, the point in the super area most distant from the coordinates, and the coordinates is calculated as sqrt($(32-100)^2+(95-50)^2$)=sqrt(6649). This is smaller than "r". Therefore, it is determined that the area is included in the range shorter than (within) r from the specified coordinates.

Control goes to step 817. Data of address 4 of the index (b=4) is assigned to "p", and the distance between the coordinates (44, 76) stored in address 4 and the specified coordinates, that is, sqrt($(44-100)^2+(76-50)^2$)=sqrt(3812), is assigned as to "r". [4, 3] is added to the area stack (step 818) and control goes back to step 811. In step 811, it is decided that the four areas have been processed. Then, control goes back to step 807.

As a result, the contents of the area stack (with the rightmost as the top element) and the values of p and r are as shown in (T-99) of FIG. 44.

Next, in step 808, the top element [4, 3] is taken out as [a, m]. Then, in step 809, it is checked whether the distance between the super area [4, 3] and the specified coordinates is equal to or larger than "r".

The distance between the super area [4, 3] and the specified coordinates is sqrt(1565). This is smaller than "r". Control goes to step 810, and "0" or "1" is added to the end of each coordinate of the super area [4, 3] to generate four areas shown in (T-100) of FIG. 44.

In step 812 and the following steps, area #12 (fourth area) shown in (T-101) of FIG. 45, one of the four areas, is not processed because the index does not contain area nests whose 3-prefix area is area #12. For this area, control goes back to step 811.

On the other hand, the area nests whose 3-prefix area is an area shown in (T-102) of FIG. 45 are stored in addresses 3, 4, and 5 (step 813). However, because super area [3, 4], super area [4, 4], and super area [5, 4] cannot be calculated (step 815), control goes to step 819. In that step, it is checked whether the distance between the coordinates in each address and the specified coordinates is smaller than "r".

First, the distance between the coordinates (44, 64) and the specified coordinates is sqrt($(44-100)^2+(64-50)^2$)=sqrt (3332). This is smaller than "r". Thus, control goes to step 820, the nearest data candidate is changed to this address. p is set to 3, with r=sqrt(3332).

Next, the distance between the coordinates (44, 76) of address 4 and the specified coordinates is sqrt($(44-100)^2+(76-50)^2$)=sqrt(3812). This is larger than "r", and therefore the nearest data candidate is not updated.

And, the distance between the coordinates (46, 68) of address 5 and the specified coordinates is sqrt($(46-100)^2+(68-50)^2$)=sqrt(3240). This is smaller than "r". The nearest data candidate is updated to this address. p is set to 5, with r=sqrt(3240), and control goes back to step 811. In step 811, it is determined that all four areas to be searched have been processed. Control goes to step 807.

As a result, the contents of the area stack (with the rightmost as the top element) and the values of p and r are as shown in (T-103) of FIG. 45.

Next, in step 808, the top element [1, 3] is taken out as [a, m]. Then, in step 809, it is checked whether the distance between the super area [1, 3] and the specified coordinates is "r" or larger.

The distance between the super area [1, 3] and the specified coordinates is sqrt(6877). Because this is larger than "r", no processing is performed on the area, and control goes back to step 807.

In step 807, the nearest data search means detects that the area stack is empty and ends its processing.

As a result, the distance r between the nearest data candidate p and the specified coordinates is as shown in (T-104) of FIG. 45. It is determined that, among the coordinates stored in address 0 to 9 in the index, the coordinates nearest to the specified coordinates is the coordinates (46, 68) of address 5. The distance r=sqrt(3240).

As described above, the nearest data search means used in this embodiment updates the nearest data candidate and the distance from the specified coordinates while recursively dividing the area including all the data represented by predetermined coordinate data. This means that simply executing the above-described procedure gives the user the coordinate data nearest to specified coordinates.

On the other hand, the conventional method first selects one of nearest data candidates and, according to the range searching method described above, enumerates coordinate data in the range within r from the specified coordinates. If one or more such data are found, the conventional method selects nearest one out of them: otherwise, it uses the candidate as the result.

One of the advantages of the nearest data search means used in this embodiment is that it stores areas to be examined in the stack and, at the same time, sets up the nearest data candidate from the beginning. And, when a new nearest data candidate is found, the nearest data search means updates the nearest data candidate, eliminating the need for the procedure for determining whether or not the coordinates are those of the nearest data candidate about those coordinates that cannot make themselves nearest data candidates any more.

Another advantage of the nearest data search means used in this embodiment is its index. This index contains at least one unit of coordinate data for a new nearest data candidate, thus eliminating the need to select or search for the coordinates.

The ability to reduce "r" quickly allows the user to process only a limited number of areas from the stack. This reduces wasteful searches and efficiently determines the nearest data.

[3-3. Variations of the First Embodiment]

[3-3-1. Floating-point Representation of Coordinate Data]

In the first embodiment, coordinate data is represented only in the fixed-point representation format. Floating-point coordinate data may also be processed by adding conversion means for converting floating-point data to fixed-point data.

For example, ten pairs of coordinates used in the index given above may also be stored in un-normalized floating-point representation format with the 5-bit mantissa part and the 3-bit exponent part. The index containing 8-bit coordinate data consisting of the exponent part (high-order three bits) and the mantissa part (low-order eight bits) is shown in (T-105) of FIG. 46.

The index generating means, the range search means, and the nearest data search means described above have need to get the following of coordinate data represented in the fixed-point representation format:

(1) High-order k digits (length-k prefix)

(2) k digits from high-order (p+1)th digit to (p+k)th digit (k-digit substring beginning with (p+1)th digit) Note that, when p=0, the high-order k digits in (1) are equivalent to k digits in (2). Thus, if the function to get k digits described in (2) is made available, the above means may be applied to coordinate data in the floating-point representation format.

As described above, to get k digits ($c_1\ c_2\ \ldots\ c_k$), beginning in the high-order (p+1)th digit and ending in the (p+k)th digit of fixed-point coordinate data, from floating-point coordinate data, the following steps are required (k>0):

(1) If h={7(maximum of exponent part)−exponent part} is equal to or smaller than p+k, then let all $c_1, c_2, \ldots, c_k$ be 0.

(2) If t={12(number of digits in fixed-point representation)−exponent part} is equal to or smaller than p, then let all $c_1, c_2, \ldots, c_k$ be 0.

(3) Otherwise:

If p<h, then let all $c_1, c_2, \ldots, c_{h-p}$ be 0.

If t<p+k, then let $c_{h-p+1}, \ldots, c_{h-p+5}$ be the bit string of the mantissa part and let all $c_{h-p+6}, c_{h-p+7}, \ldots, c_k$ be 0.

If p+k≦t, then let $c_{h-p+1}, \ldots, c_k$ be the first k-(h-p) bits of the mantissa part.

If p≧h and t<p+k, then let $c_1, \ldots, c_{t-p}$ be the last t-p bits of the mantissa and let all $c_{t-p+1}, \ldots, c_k$ be 0.

If p+k≦t, then let the last k bits of the mantissa be $c_1, \ldots, c_k$.

The above steps make it possible to compose the same devise as that described in the first embodiment for coordinate data represented in the floating-point format.

[3-3-2. Storage of Prefixes of Divisions]

Because a prefix of divisions consists of a series of the number of digits, the maximum of a prefix is the number of digits of a coordinate. The maximum of the number of terms is also the number of digits of a coordinate. Permanently allocating memory required for this representation to the coordinates in the index requires a large amount of memory. For example, each dimension of 12-bit fixed-point coordinate data requires 4 bits×12 prefixes=48 bits.

It should be noted, however, that many prefixes have a common part which may be represented by some specific symbol. Thus, combining this symbol with the suffix of each prefix of divisions reduces memory.

To do so, a table containing number-of-digits sequences is prepared. The index contains data on the position within the table where the number-of-digits sequence (pointer to the number-of-digits sequence) for each area nest is stored. This table is designed to efficiently contain many number-of-digits sequences for matching prefixes.

For example, the table containing number-of-digits sequences is configured as follows:

(1) For a sequence of 1 to 2 digits, store the sequence itself.

(2) For a sequence of 3 digits or more, store information on the position within the table where the prefix of the one-less-than prefix is stored (pointer to the prefix). (T-106) in FIG. 47 shows the index used in this embodiment as well as the number-of-digits sequences table, with the symbol □ indicating the position relative to the beginning of the table.

The number-of-digits sequences table in another configuration is shown in (T-107) of FIG. 48.

(1) For a sequence of 1 to 2 digits, store the sequence itself as well as the suffix used in (2).

(2) For a sequence of $2^K+1$ digits or more and $2^{k+1}$ or less, store information on the combination of the position at which the first $2^k$ digits are stored and the position the last digits except the first $2^k$ digits are stored.

Any number-of-digits sequences table may be used as long as it efficiently contains many sequences. Using a position within the table instead of the number-of-digits sequences reduces the amount of memory to be used for the index.

[3-3-3. Shortening the Area Code]

As described in [3-2-2. Effects of the index on the search means], an area code used in the index search is either an area code [a, m] or an area code generated, according to the prefixes of divisions (m), from the coordinates of an area [a, m] whose last digit is changed. Therefore, a code generated by concatenating only the last digit of a substring, instead of the substring itself, taken out from each coordinate according to the prefixes of divisions may be used as an area code. This type of area codes produce the same result as that of the area codes used in the embodiment in the sort operation of the area nests in the index or in the binary search operation.

That is, short area codes shown in (T-108) of FIG. 49 may be used as area codes to produce the same result.

This variation reduces the amount of memory for storing area codes which are stored with area nests and, at the same time, increases efficiency in comparing area codes during binary search or other operations.

As described above, the first embodiment may be changed in the representation of coordinates, prefix of divisions, and area codes.

4. Second Embodiment

[4-1. Overall Configuration of the Second Embodiment]

Figures 10, 11:
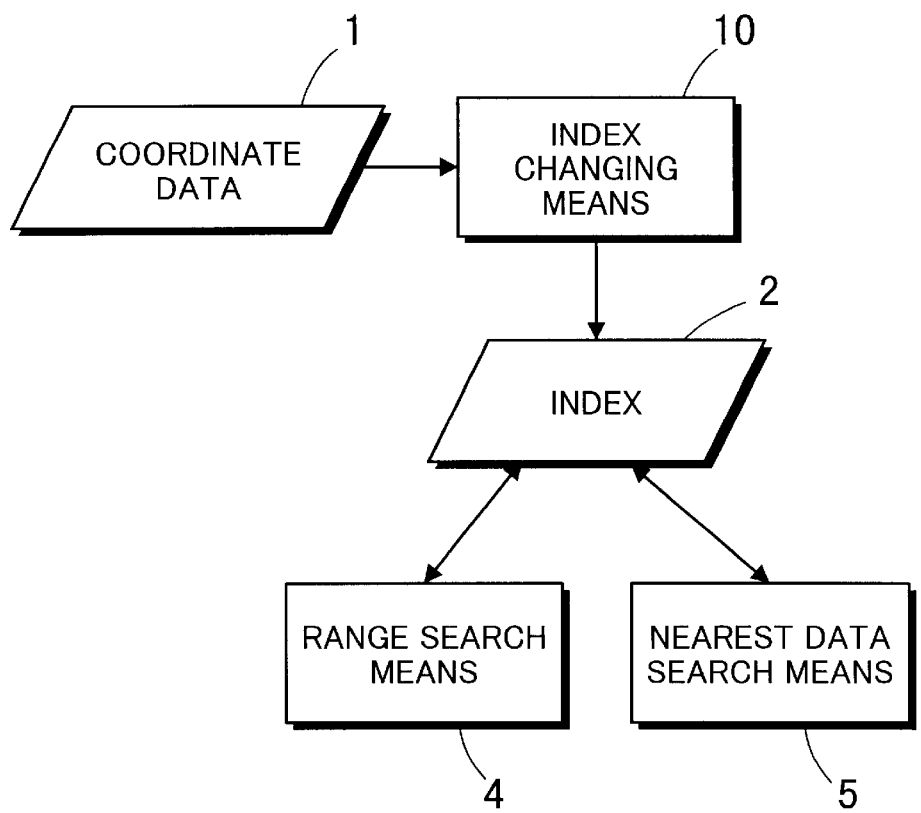
FIG. 10 is a functional block diagram showing the configuration of a second embodiment of this invention.
FIG. 11 is a diagram showing the configuration of a node area in which a set of area nests is stored in the second embodiment.

FIG. 10 is a functional block diagram showing the configuration of the second embodiment.

As with the first embodiment, a data management system used in the second embodiment comprises an index 2 in which coordinate data 1 is stored, range search means 4, and nearest data search means 5. In addition, instead of the index generating means used in the first embodiment, the unit further comprises an index changing means 10 for adding coordinates to, or deleting coordinates from, the index. It can be said that the second embodiment also has the index generation function in that the index changing means may be used to sequentially add coordinates to the empty index.

In the second embodiment, every term of a prefix of division assigned to each coordinate in the index is "1". Therefore, an area code is generated by taking one digit from the coordinate of each dimension beginning with the high-order digit and by concatenating them in a predetermined order of dimensions.

Because every term of a prefix of division is "1", the divisions used with the coordinates equal the number of terms.

Because of this limitation on divisions, the following condition on the index in the first embodiment is not always followed. The condition is that "when there are multiple area nests with the same m-prefix area, they have the same (m+1)-prefix super area and there are at least two (m+1) areas."

Because the "(m+1)-prefix super area" is always an "m-prefix area" in the second embodiment, the first condition of the two is satisfied. The second condition that "there are at least two (m+1) areas" is not guaranteed.

However, because the first condition is satisfied, the range search means and the nearest data search means of the first embodiment may be applied to the index of the second index. These means always give correct search results. The reason is that the first condition is required for the validity of the search procedure and that the second condition only affects search efficiency.

Because of this reason, the range search means and the nearest data search means of the first embodiment are used also in the second embodiment. Thus, the following describes only the index and index changing means which are specific to the second embodiment.

[4-1-1. Index Structure]

(T-109) in FIG. 50 shows an example of the index of this embodiment in which the 10 pairs of coordinates used in the description of the first embodiment are stored.

To allow the index changing means to add or delete data efficiently, coordinates and the number of terms of divisions, that is area nests, are not stored in consecutive addresses on the storage unit; instead, area nests and binary search tree pointers form a binary search tree in the index used in the second embodiment. To implement this, a node area, such as that shown in FIG. 11, is used to store one set of area nest.

The binary search tree is not limited to the one described above. It may be any tree with the area nests sorted into lexicographic order of area codes. What is required for the configuration of the tree is that the user can search the tree with "area codes" or "prefixes of area codes" and easily add or delete area nests (a node of tree).

To ensure high efficiency of search and updating, the tree may be a hight-balanced binary search tree or a self-adjusting binary search tree.

Figure 12:
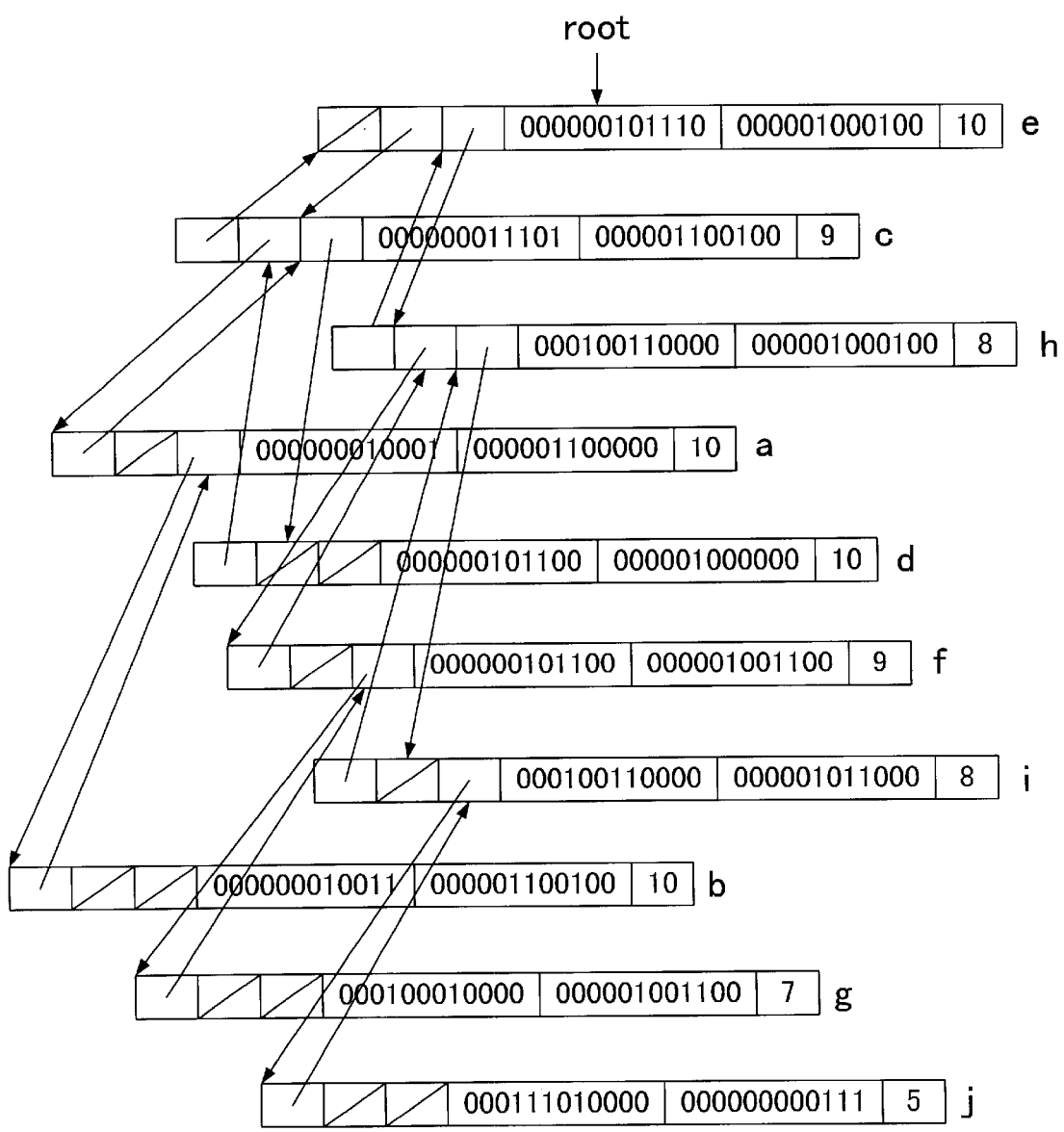
FIG. 12 is a diagram showing an example of an index configured as a binary search tree in the second embodiment.

FIG. 12 shows an example of a binary search tree used as the index in this embodiment.

The index implemented as a binary search tree with area nests sorted into ascending order of area codes has the following advantages. It functions just like the index of the first embodiment in which the area nests are stored in consecutive addresses on the storage area. It also enables the user to add or delete area nests to or from the index by adding or deleting the node, in which the area nests is stored, to or from the binary search tree.

[Deletion of Coordinates]

To modify an index, the index changing means used in this embodiment take advantage of the above-described feature of the index consisting of a binary search tree. It also sets or changes the number of terms of divisions of area nests. For example, to delete the area nest (coordinates) h that is the third area nest from the end of the index, that is, (T-110) in FIG. 50, the index changing means deletes the node containing this area nest from the binary search tree. The binary search tree containing the resulting index is shown in (T-111) of FIG. 51.

At this time, the index changing means performs the following check on area nests A and B which were immediately before and after the deleted area nest and modifies their numbers of terms of divisions if necessary, respectively.

Let $2n_{AB}$ be the number of matching bits of area codes of area nests A and B, in units of 2, from the beginning. Let $2n_{AC}$ be the number of matching bits of area codes of area nests A and C, which immediately precedes A. Let $2n_{BD}$ be the number of matching bits of area codes of area nests B and D, which immediately follows B.

Note that:

When there is not A, $n_{AB}=n_{AC}=0$

When there is not B, $n_{AB}=n_{BD}=0$

When there is not C, $n_{AC}=0$

When there is not D, $n_{BD}=0$

The modification of numbers of terms of divisions of A and B is performed as follows:

If $n_{AB}<n_{AC}$, then the number of terms of divisions of A is $n_{AC}+1$.

If $n_{AB} \geq n_{AC}$, then the number of terms of divisions of A is $n_{AB}+1$.

If $n_{AB} \geq n_{BD}$, then the number of terms of divisions of B is $n_{AB}+1$.

If $n_{AB}<n_{BD}$, then the number of terms of divisions of B is $n_{BD}+1$.

In the above example, because $n_{AB}=6$, $n_{AC}=3$, and $n_{BD}=4$, the number of terms of A and B is both set to 7. That is, the number of terms of A remains unchanged this case.

[Addition of Coordinates]

When adding coordinates (area nest) to the index, the index changing means binary-searches the index to find the position at which the coordinates will be added, assuming that the coordinates to be added correspond to the area nest with the maximum number of terms of divisions.

For example, to add the coordinates that have been deleted in the above example, the index changing means first adds the area nest (T-112) to the index. Binary-searching the index determines that the coordinates should be added between A and B.

(T-113) in FIG. 52 shows the index to which the area nest has been added. The added area nest is indicated by X.

When adding coordinates, the index changing means perform the following check to modify each number of terms of divisions of area nests X, A, and B.

Let $2n_{xA}$ be the number of matching bits of area codes of area nests X and A, in units of 2, from the beginning. Let $m_A$ be the number of terms of divisions of A.

Let $2n_{xB}$ be the number of matching bits of area codes of area nests X and B, in units of 2, from the beginning. Let $m_B$ be the number of terms of divisions of B.

When there is not A, $n_{XA}=0$. When there is not B, $n_{XB}=0$.

When $n_{XA}>n_{XB}$:

If $n_{XA}=m_A$, then let (the shorter of matching prefix lengths of x-coordinates of A and X and that of y-coordinates of A and X)+1 be the number of terms of divisions of A and X.

If $n_{XA}<m_A$, then let $n_{XA}+1$ be the number of terms of divisions of X.

When $n_{XA}=n_{XB}$:

Let the number of terms of divisions of X (always smaller than $m_A$, $m_B$) be $n_{XA}+1=n_{XB}+1$.

When $n_{XA}<n_{XB}$:

If $n_{XB}=m_B$, then let (the shorter of the matching prefix lengths of x-coordinates of B and X and that of y-coordinates of B and X)+1 be the number of terms of divisions of B and X.

If $n_{XB}<m_B$, then let $n_{XB}+1$ be the number of terms of divisions of X.

In this example, $n_{XA}=6$, $n_{XB}=7$, $m_A=7$, $m_B=7$, matching prefix length of x-coordinates of B and X is 12, and matching prefix length of y-coordinates of B and X is 7, therefore, the number of terms of divisions of B and X is set to 7+1=8. As a result, the index is as shown in (T-114) of FIG. 53.

[Omission of the Number of Terms of Divisions]

In the second embodiment, terms of divisions are always set to "1" and only the number of terms is stored for each area nest. The range search means and the nearest data search means use this number of terms only in step (6-1) described in [3-1-3. Configuration of the range search means] and
[3-1-4. Configuration of the Nearest Data Search Means].

In this step (6-1), the condition if "the number of terms of divisions is m" is checked in order to determine whether or not there exists any other area nest including the area [b, m] except that stored in (the node of) address b.

This determination may be made without having to store the number of terms of divisions in each area nest. Instead, this determination may be made by checking, for each dimension, the matching prefix length of an area nest (coordinates) and that of the area nest (coordinates) immediately preceding and with that of the area nest (coordinates) immediately following.

That is, this determination may be made by checking if the larger (=n) of the smallest of the matching prefix lengths of the coordinates of the area nest and that of the immediately preceding coordinates and the smallest of the matching prefix of the coordinates of the area nest and that of the immediately following area nest is smaller than m. As shown in the procedure of the index changing means described above, n+1 matches the number of terms of divisions of the area nest (coordinates).

[4-2. Effects of the Second Embodiment]

In the second embodiment, one bit or a predetermined number of bits is taken from each coordinate of coordinate data each time an area code is required. These bits are concatenated in a predetermined order to generate an area code. Thus, an index may be simply configured because a node in the index contains only coordinate data.

In this configuration, modification of the number of terms by the index changing means may be omitted. The index changing means simply performs addition, deletion, or search on the index which is a binary search tree with the area codes as the key.

Comparing one area code with another may be done by calculating (generating) only the required number of bits from the beginning. This means that omission of the number of terms of divisions does not degrade efficiency.

If a set of coordinate data to be processed is fixed, the index of the second embodiment may be generated for the data. After that, the generated index may be moved to the consecutive memory addresses used in the first embodiment. This makes the index compact at search time. Of course, the index may be sorted and generated initially at consecutive addresses as in the first embodiment.

5. Third Embodiment

[5-1. Configuration of the Third Embodiment]

[5-1-1. Configuration of the Index]

The configuration of the index of the third embodiment is similar to that of the index of the first embodiment so as to adopt the same index generating means. The index used in the third embodiment provides the following function efficiently to the search means.

(4) Count the number of area nests whose m-prefix area is an m-prefix area of address a.

This function may be implemented by counting the number of areas while executing function (3) of the index of the first embodiment. However, it is unlikely that this method increases the efficiency of the search means.

Thus, this embodiment provides the following method which perform the same function more efficiently:

First, find an address before address a before which an area nest whose m-prefix area is area [a, m] is not stored. Let the address be "p". As p, we can take any address before a in which an area nest whose m-prefix area is not area [a, m] (or having no m-prefix area). Then, find an address after address a after which an area nest whose the m-prefix area is area [a, m] is not stored. Let the address be "q". As q, we can take any address after a in which an area nest whose m-prefix area is not area [a, m] (or having no m-prefix area).

Next, binary-search for the smallest address "s" before address a in which the area nest whose m-prefix area is area [a, m] is stored according to the following steps:

(1) r←p, s←a.

(2) address t←(r+s)/2 (roundout).

(3) End processing if t=s.
If t<s and area[t,m]=area[a,m], then s←t.
If area[t,m]≠area[a,m], then r←t.

(4) Go back to (2).

Similarly, find the largest address "u" after address a in which the area nest whose m-prefix area is area [a, m] is stored according to the following steps:

(1) u←a, r←q.

(2) address t←(u+r)/2 (discard decimals).

(3) End processing if u=t.
If u<t and area[t,m]=area[a,m], then u←t.
If area[t,m]≠area[a,m], then r←t.

(4) Go back to (2).

The m-prefix area of all the area nests stored after "s" and before "u" (including s and u) is area [a,m]. Thus, the number of such area nests is calculated as u−s+1.

The above procedure efficiently finds the minimum and the maximum addresses through binary-search, thus eliminating the need to enumerate the addresses as in (3) of the operation of the index of the first embodiment.

Simply enumerating the area nests without comparison on area codes in the range from the minimum address "s" to the maximum address "u" based on this result performs the same function as (3) of the operation of the index of the first embodiment more efficiently.

As described above, the index allows the user to find the number of area nests whose m-prefix area is area [a,m], as well as the minimum and maximum addresses in which such an area nest is stored. With this in mind, the range search means and the nearest data search means of the third embodiment are configured as follows:

[5-1-2. Configuration of the Rrange Search Means]

The range search means of this embodiment is composed of the following steps:

(1) Initialize the result list.
(2) Initialize the area queue.
(3) Select data from the index (for example, address 0) and combine it with number of terms 0 to generate [0, 0] for processing.
   (3-1) When the super area [0, 1] cannot be calculated (no term in divisions), add the coordinates of address 0, if included in the specified range, to the result list.
   (3-2) When the super area [0, 1] is included in the specified range, add all data (addresses) in the index to the result list.
   (3-3) When the super area [0, 1] is not included in, but overlaps with, the specified range, add [0, 1] to the area queue.
(4) When the area queue is empty, the range search means ends processing. If not, take out the first element as [a, m] and delete it from the area queue.
(5) Perform step (6) for each of four (2) areas generated by adding 0 or 1 to the end of each coordinate of the super area [a, m].
(6) Only when the index contains an area nest whose m-prefix area is the area given above, assign the address to "b" and perform one of the conditional steps shown below. In determining "b" by way of binary search process, the addresses are set up as follows:

Let an address smaller than b and containing an area code with which the last comparison below address b was performed during the binary search of the index to get "b" be "p", and let an address larger than b and containing an area code with which the last comparison above address b was performed be "q".

The initial values of "p" and "q" before the start of binary search are set to (minimum address −1) and (maximum address +1), respectively.

In addition, if the area code of address (p+q)/2 has a prefix which is the area code of the area generated in step (5), the search ends and the address is assigned to "b". Otherwise, if the former is smaller than the latter, (p+q)/2 is assigned to "p"; if the former is larger than the latter, (p+q)/2 is assigned to "q".

(6-1) When the super area [b, m+1] cannot be calculated (only m terms in each division), add address b for the coordinates in it to the result list if the coordinates are included in the specified range.
(6-4) When super area [b, m+1] does not overlap with the specified range, there is no processing to be performed for the area. When the super area [b, m+1] does not satisfy (6-1) or (6-4), perform the above procedure with the use of p and q to find the minimum address "s" and maximum address "u" where an area nest whose m-prefix area is area [b, m] is stored. Then, make the following check:
(6-2) When the super area [b, m+1] is included in the specified range, add all addresses, where the area nest whose m-prefix area is area [b, m] is stored, to the result list as for address b. To do so, add all addresses, from s to u, to the result list.
(6-3) When the super area [b, m+1] is not included in, but overlaps with, the specified range, check all coordinates if u−s<k, that is, if the number of area nests whose m-prefix area is area [b, m] is less than k, and add those coordinate data (area nests) included in the specified range to the result list (actually add addresses for data).

On the other hand, if u−s≧k, that is, if the number of area nests whose m-prefix area is area [b, m] is equal to or larger than k, add [b, m+1] to the area queue.

k, which is a control parameter of this procedure, may either be given beforehand or be changed according to an algorithm.

(7) Go back to (4).

[5-1-3. Configuration of the Nearest Data Search Means]

The nearest data search means of this embodiment is composed of the following steps:

(1) Let data in the index (for example, address 0 for the data in it) be the nearest data candidate "p" and let the distance from the specified coordinates be "r".
(2) Initialize the empty area stack.
(3) Combine address 0 with number of terms 0 to generate [0, 0] for processing. When the super area [0, 1] can be calculated (one or more terms in divisions), add [0, 1] to the area stack.
(4) When the area stack is empty, the nearest data search means ends processing. If not, take out the first element as [a, m] and delete it from the area stack.
(5) If the distance between the super area [a, m] and the specified coordinates is r or larger, go back to (4). On the other hand, if the distance is smaller than r, perform step (6) for each of four ($2^2$) areas generated by adding 0 or 1 to the end of each coordinate of the super area [a, m].
(6) Only when the index contains an area nest whose m-prefix area is the area given above, assign the address in which the area nest is stored to "b" and perform one of the conditional steps shown below. In determining "b" by way of binary search process, the addresses are set up as follows:

Let an address smaller than b and containing an area code with which the last comparison below address b was performed during the binary search of the index to get "b" be "p", and let an address larger than b and containing an area code with which the last comparison above address b was performed be "q".

The initial values of "p" and "q" before the start of binary search are set to (minimum address −1) and (maximum address +1), respectively.

In addition, if the area code of address (p+q)/2 has a prefix which is the area code of the area generated in step (5), the search ends and the address is assigned to "b". Otherwise, if the former is smaller than the latter, (p+q)/2 is assigned to "p"; if the former is larger than the latter, (p+q)/2 is assigned to "q".

(6-1) When the super area [b, m+1] cannot be calculated (only m terms in each division) and when the distance between the data of address b and the specified coordinates is smaller than r, set b to the nearest data candidate "p" and set the distance to "r". At this time, if r=0, the nearest data search means end processing.
(6-4) When the distance between the super area [b, m+1] and the specified coordinates is r or larger, there is no processing to be performed for the area. When the super area [b, m+1] does not satisfy (6-1) or (6-4), perform the above procedure with the use of p and q to find the minimum address "s" and maximum address "u" where an area nest whose m-prefix area is area [b, m] is stored.
(6-5) If u−s<k, that is, if the number of area nests whose m-prefix area is area [b, m] is k or smaller, check the coordinates of all such area nests to select the area nest nearest to the specified coordinates p. If the distance is smaller than r, let the coordinates be the nearest data candidate "p" and let the distance be "r". At this time, if r=0, the nearest data search means end processing.

k, which is a control parameter of this procedure, may either be given beforehand or be changed according to an algorithm.

If (6-5) is not satisfied, make the following checks. Note that either one of (6-2) and (6-3) is satisfied.

(6-2) If the super area [b, m+1] is included in the range shorter than (within) r from the specified coordinates, let b be the nearest data candidate "p" and let the distance between the data of address b and the specified coordinates be "r". Add [b, m+1] to the area stack. At this time, if r=0, the nearest data search means end processing.

(6-3) If the super area [b, m+1] is not included in the range shorter than (within) r from the specified coordinates but the distance from the specified coordinates is smaller than r, add [b, m+1] to the area stack.

(7) Go back to (4).

[5-2. Effects of the Search Means Using the New Index Operation]

The search means described above take advantage of the operation (4) that can be executed using the index of the third embodiment. That is, in step (6), it is checked whether the number of area nests whose m-prefix area is area [b, m] is k or smaller. If it is k or smaller, it is checked whether the coordinates of those area nests are the results of, or candidates for, the search.

In this case, the coordinates of area nests whose m-prefix area is area [b, m], that is, the coordinates of area nests having the same super area [b, m+1], are likely to be the results of, or candidates for, the search. In step (6-3) of the range search means and in steps (6-2) and (6-3) of the nearest data search means in the first embodiment, [b, m+1] is added to the area queue or the area stack. And, later, it is taken out and, in step (5), multiple subdivided areas are generated.

On the other hand, in this embodiment, if there are not so many pairs of coordinates of search results or search candidates which will be included in area [b, m], whether or not the coordinates are included in the area is determined immediately provided that k is appropriately set up, thus preventing area [b, m] from queuing or stacking, and from further subdivision.

The above search means perform the same operation (determination of inclusion, calculation of the distance, etc.,) for areas and super areas during the search operation as for the coordinates. Thus, as there are fewer coordinates, the search means does not subdivide the area containing the coordinates but make the final determination directly on the coordinates, minimizing the overhead involved in division.

[5-3. Application to the Second Embodiment]

This embodiment performs the operation described in (4) as described below even if the index is a binary search tree as in the second embodiment.

That is, in a binary search tree with nodes each having a partial interval length field, the "code string processing system and method using intervals" is used to set and manage partial interval length fields with the length of the interval corresponding to each node being set to "1".

In this case, both ends (they are the same ordinal number) of an interval corresponding to each node represent the lexicographic area code order of the node (area code) within the index corresponding to the area nest stored in the node. Thus, using this order for the addresses used in the above procedure allows the range search means and the nearest data search means in this embodiment to be applied to an index such as that used in the second embodiment.

The "code string processing system and method using intervals" described above is omitted. It is detailed in the specification of that invention applied by the inventor of the present invention.

6. Fourth Embodiment

[6-1. Configuration of the Fourth Embodiment]

[6-1-1. Configuration of the Index]

The index of the fourth embodiment is configured as described below. For leading n terms of divisions of each area nest in the index, the conditions for divisions in the index of the first embodiment apply. That is, the condition that "when there are a plurality of area nests including the same m-prefix area, they include the same (m+1)-prefix super area and there are at least two different (m+1) areas in them" is satisfied. For the (n+1)th and the following terms, "1" is assumed as in the index in the second embodiment. It should be noted that n may differ from area nest to area nest.

As described in the second embodiment, there is no need to specify the term of 1 in the divisions. To generate the part of an area code at (n+1)th and the following positions, the number of bits equal to the sum of leading n terms are removed from the beginning of each coordinate, take out bits from each coordinate one bit at a time in a predetermined order of dimensions, and add that part to the first part of the area code generated according to the first n terms of divisions. For the coordinate of a dimension from which all bits have been removed, no more bits are taken out.

(T-115) in FIG. 54 shows an example of an index used in this embodiment. It contains 10 coordinates used in the description of the first embodiment.

This embodiment also provides index changing means as in the second embodiment, with the index implemented as a binary search tree for more efficient change operation. The code string processing system and method using intervals described in the third embodiment is used to order the area nests with the partial interval length field in each node. This makes it possible for the user to count the number of area nests with the same m-prefix area simply by counting the number of area codes each having the corresponding area code as the prefix.

Therefore, the procedure provided by the range search means and the nearest data search means is the same as that used in the first embodiment and the third embodiment. Also used in this embodiment is the index changing means which add coordinates to the index or delete area nests (coordinates) from the index.

The following described each procedure.

[Addition of Coordinates to the Index]

(1) To determine a position at which new coordinates are to be inserted, the index changing means binary-search the index. To compare area codes during the binary search, the index changing means sequentially generate, from the new coordinates to be added, the prefix of an area code using the divisions of an area nest in the index, and compare the generated prefix with the prefix of the area code generated from the coordinates of the area nest. The index changing means end the search upon detecting an area nest with the part of an area code corresponding to the n prefixes specified in the divisions which matches the generated prefix.

(2) If, as a result of (1), an area nest (coordinates) with an area nest with the part of an area code corresponding to the n prefixes specified in the divisions which matches the generated prefix is found, the index changing means continues the binary search. During the binary search, the key is an area code generated by setting all (n+1)th and the following terms in the divisions to "1". And, at a position determined as a result of binary search, an area nest composed of the new coordinates and the divisions consisting of the first n terms is inserted. When the sum of terms in the divisions for each dimension exceeds the number of bits of the coordinate, 0 is assumed for (n+1)th and following prefixes of the divisions.

(3) The index changing means finds the number of area nests whose n-prefix area is the n-prefix area of the area nest inserted in (2). If it is larger than "c", the index changing means adds (n+1)th term to the divisions of those area nests so that the number of area nests that will be generated based on the divisions does not exceed c.

When (n+1)th-prefix is added to the divisions of the area nests whose area code is the same as that generated based on the n prefixes of divisions(1 for all (n+2)th and following prefixes), the procedure for rearranging the area nests according to area codes is composed of steps (3) to (6) in the first embodiment.

(4) As a result of (1), for "k" which is smaller than n (the number of terms in the divisions), if an area nest with an area code whose first k terms match but whose (k+1)th term does not match is found (k can whenever be determined except in (2)), the index changing means adds an area nest, composed of the new coordinates and the divisions consisting of the first k prefixes of the divisions of the above-described area nest, at the position determined by the binary search.

Then, the index changing means compresses the part of the divisions of the area nests, including the added area nest, for the first k matching prefixes to the length of k and then adds the (k+1)th and the following terms of the divisions to the area nests according to the procedure used by the index generating means of the first embodiment.

At that time, the index changing means stops adding terms to the divisions when the number of area nests with an area code equal to the one generated according to the divisions being extended is equal to or smaller than c. That is, the same procedure as that in step (7-3) of the index generating means in the first embodiment is used under the condition $q-p+1 \leq c$ ($q-p<c$) instead of $p<q$.

[Deletion of Coordinates From the Index]

(1) To delete the specified coordinates, the node representing the corresponding area nest is deleted from the binary search tree of the index.

(2) After the node is deleted, if the number of area nests whose area code equals the one generated from the coordinates based on the divisions of the deleted area nest is smaller than a predetermined number of d, the index changing means delete the last term of the divisions of the area nests and sort them again according to the area codes assuming that the subsequent terms are all "1".

So, as long as step (2) of the addition procedure is executed or step (2) of the deletion procedure is not executed, nodes may simply be added to or deleted from the binary search tree. Therefore, the index may be updated very efficiently.

For the number of terms m smaller than the number of terms in the divisions, the condition that "when there are multiple area nests with the same m-prefix area, they have the same (m+1)-prefix super area and there are at least two (m+1) areas" is satisfied. Therefore, the search may be executed efficiently.

7. Fifth Embodiment

The fifth embodiment provides more efficient nearest data search means using the index used in the first embodiment.

The nearest data search means of the first embodiment uses stacks to memorize areas. Instead of stacks, the fifth embodiment uses a "heap" in which the distance from the specified coordinates is assigned to each area and the area with the shortest distance is the root.

The heap is described in detail in "The Design and Analysis of Computer Algorithms" by Aho, Hopcroft, Ullman, pp. 87–92 (Addison Wesley, 1974).

The nearest data search means using the "area heap", with the distance from the specified coordinates as the key ("label" of each node according to above book), comprises the following steps:

(1) Let data (for example, address 0) in the index be the nearest data candidate "p" and let the distance from the specified coordinates be "r".

(2) Initialize the empty area heap.

(3) Combine address 0 with the number of terms 0 to generate [0, 0] for processing.

When the super area [0, 1] can be calculated (one or more prefixes in divisions), add the super area [0, 1] to the area heap with the distance R from the specified coordinates as the key.

(4) If the area heap is empty, the procedure ends processing. If not, take out the root (top) element and the distance from the specified coordinates as [a, m] and R, respectively, and delete them from the area heap.

(5) If the distance R between the super area [a, m] and the specified coordinates is r or larger, the procedure ends processing. On the other hand, if the distance is smaller than r, perform step (6) shown below for each of four ($2^2$) areas generated by adding 0 or 1 to the end of the coordinates of the super area [a, m].

(6) Only when the index contains an area nest whose m-prefix area is the area, perform one of the following conditional steps with one of the addresses in which such an area nest is stored being b:

(6-1) When the super area [b, m+1] cannot be calculated (m prefixes in the divisions), let b be a new nearest data candidate p and let the distance be r if the distance between the coordinate data of address b and the specified coordinates is smaller than r. If r=0, the procedure ends processing.

(6-2) When the super area [b, m+1] is included in the range which is within (smaller than) r from the specified coordinates, let b be a new nearest data candidate p and let the distance between the coordinate data of address b and the specified coordinates be r. Add the super area [b, m+1] to the area heap with the distance R from the specified coordinates as the key.

(6-3) If the super area [b, m+1] is not included in the range shorter than (within) r from the specified coordinates but the distance from the specified coordinates is smaller than r, add the super area [b, m+1] to the area heap with the distance R from the specified coordinates as the key.

(6-4) When the distance between the super area [b, m+1] and the specified coordinates is r or larger, there is no processing to be performed for the area.

(7) Go back to step (4).

The major difference between the nearest data search means of this embodiment and that of the first embodiment is in step (5).

That is, in the area stack used by the nearest data search means of the first embodiment, even if the top area taken out in steps (4) and (5) is at least r away from the specified coordinates, not all areas in the stack is at least r away from the specified coordinates. This requires all the remaining areas in the stack to be taken out for checking.

On the other hand, the nearest data search means of this embodiment guarantees that the area in the root of the heap is nearest to the specified coordinates among the areas in the heap. This means that, if the distance from the specified coordinates of this area is r or larger, the distance between the coordinates of any other area in the heap and the specified coordinates is also r or larger. Thus, once it is determined that the distance R between the super area [a, m] and the specified coordinates is r or larger in step (5), the nearest data search means may end the search immediately.

As compared with the nearest data search means of the first embodiment, the nearest data search means of this embodiment finds the nearest data more efficiently.

In stead of a heap used in this embodiment, any data structure may be used, as long as an area is stored with the distance between the area and the specified coordinates as the key and, in addition, an area with the shortest distance from the specified coordinates may be selected for deletion.

This set of function is called priority queue. Many data structures providing priority queue function are known.

Such data structures are described in detail in "An Empirical Comparison of Priority-Queue and Event-Set Implementations" by Jones, D. W., Commun. ACM 29, 4(April 1986), pp. 300–311.

In the nearest data search means of the third embodiment, an area heap may also be used instead of an area stack with the distance from the specified coordinates as the key. In such an area heap, the distance from the specified coordinates is added as a key when adding a super area, an area with the distance nearest to the specified coordinates is taken out from the heap in step (4) for processing, and, if it is determined in step (5) that the distance is r or larger, the search may be ended immediately.

The nearest data search means check areas, stored in a priority queue using the distance from the specified coordinates as a key, to see if those areas require processing. In case many of those areas do not require processing, the nearest data search means skip processing for them and therefore minimize the search time.

A possible variation of this embodiment is also using area heap but not storing the distance between each area and the specified coordinate in the node. Those distances can be calculated on the moment, we can save storage resource for heap by sacrificing time for distance calculation.

8. Sixth Embodiment

In the sixth embodiment, this invention is applied to coordinate data in the floating-point representation format.
[8-1. Configuration of the Index]

In the index of this embodiment, coordinate data represented in the 3-bits exponent and the 5-bits mantissa (unnormalized representation on when the exponent is "000")is sorted into lexicographic (ascending) order of exponent area codes and mantissa area codes which will be described later.

That is, for coordinate data represented in the 3-bits exponent and 5-bits mantissa, the divisions and the exponent area codes of the numeric (bit) strings of the exponents are calculated and then the divisions and the mantissa area codes are calculated, as shown in (T-116) of FIG. 55.

Coordinate data is sorted with the exponent code as the first key and with the mantissa area code as the second key. Only when the relation of two area codes is not decided by the first key, their second keys are compared. The index contains coordinate data sorted in this order.

Coordinate data (T-116) in FIG. 55 is the coordinate data (T-109) in FIG. 50 with coordinate data a to j represented in 8 bits (high-order 3-bits exponent and the low-order 5-bits mantissa).

In this embodiment, each term of divisions of the exponent and the mantissa is "1", and the area code is generated based on such divisions. The number of terms in the divisions is also omitted. In the index shown in (T-116), the number of terms in the divisions is shown as a parenthesized number for reference. There are multiple exponent coordinates with the same value. In that case, the exponent code is generated by using all coordinate data bits with the number of terms in the divisions equal to the number of coordinate digits.

The following details the index shown in (T-116) of FIG. 55.

The x-coordinate of coordinate data a shown in (T-109) of FIG. 50 is "000000010001", and the y-coordinate is "000001100000". When this coordinate data is represented as 8-bit floating-point data (3 high-order bits and 5 low-order bits), the exponent and mantissa of the x-coordinate are "000" and "10001" and those of the y-coordinate are "010" and "11000", respectively. Because each prefix of the divisions is "1" in this embodiment, the exponent area code is generated by taking bits alternately from the x-coordinate exponent and the y-coordinate exponent, one bit at a time, and by concatenating them. The resulting exponent area code is therefore "000100". The mantissa area code is generated by taking bits alternately from the x-coordinate mantissa and the y-coordinate mantissa, one bit at a time, and by concatenating them. The resulting mantissa area code is therefore "1101000010".

The exponent area codes and the mantissa area codes of coordinate data b to j shown in (T-109) of FIG. 50 may also be generated as shown in (T-116) of FIG. 55.

In this case, the exponent area codes, the first key, for coordinate data a to c are all "000100". Therefore, the mantissa area codes, the second sort key, are compared to sort the coordinate data into order of a→b→c.

The exponent area codes, the first key, for coordinate data d to f are all "000110". Therefore, the mantissa area codes, the second sort key, are compared to sort the coordinate data into order of d→e→f.

The exponent area codes, the first key, for coordinate data g to i are all "100100". Therefore, the mantissa area codes, the second sort key, are compared to sort the coordinate data into order of g→h→i.

However, the exponent area code of coordinate data j is "100000", which is smaller than the exponent area code of "100100" of coordinate data g to i. Therefore, coordinate data j is placed before coordinate data g to i.

The number of terms, provided for reference in (T-116) of FIG. 55, indicate the number of terms in the divisions referenced for sorting coordinate data in the floating-point representation format into lexicographic order.

For example, the exponent area codes of coordinate data a to c are equal and therefore the number of terms in the divisions is "3" which is the number of digits of each coordinate. When comparing the mantissa area codes (second key) of coordinate data a with that of coordinate data b, the number of terms in the divisions is "4" because coincidence of prefix is broken at the seventh digit. Therefore, the sum of the numbers of terms in the divisions that are referenced is "7" for coordinate data a and coordinate data b.

For coordinate data c, the number of terms in each exponent division is "3" which is equal to that of coordinate data a and coordinate data b. When comparing the mantissa area code of coordinate data b with that of coordinate data c, the number of terms in each division is "2" because coincidence of prefix is broken at the third digit. Therefore, the sum of the numbers of terms in the division that are referenced is "5" for coordinate data c.

For coordinate data j, the exponent area code is different from that of other coordinate data. When it is compared with that of coordinate data g to i, coincidence of prefix is broken at the fourth digit. Therefore, the number of terms in the divisions is "2". Because there is no need for coordinate data j to compare the mantissa area code with that of other coordinate data, the sum of the number of terms in the division that are referenced is "2".

The index of this embodiment thus uses fewer terms in the divisions than those in the divisions shown in (T-109) of FIG. 50, thus reducing the number of digits of the area code (exponent area code+mantissa area code). This allows the user to generate or search an index more efficiently.

The area code used in the index in (T-116) of FIG. 55 is different from that used in the index in (T-109) of FIG. 50, because they are different in coordinate code representation. This difference sometimes affects the order in which the same coordinate data a to j is ordered. However, this difference does not affect the index generation procedure or search procedure at all. The following describes this more in detail.

[8-2. Coordinate Data in Floating-point Data Representation and its Range]

Coordinate data in floating-point representation corresponds to the following areas (ranges) according to the value of the exponent n:

n=000 Equal to or larger than 0 and smaller than $2^5$ n=000 Equal to or larger than $2 \times 2^5$ and smaller than $2^{n+1} \times 2^5$ That is, regardless of the value of the mantissa, the coordinate value is in the area corresponding to n given above.

Figure 56:
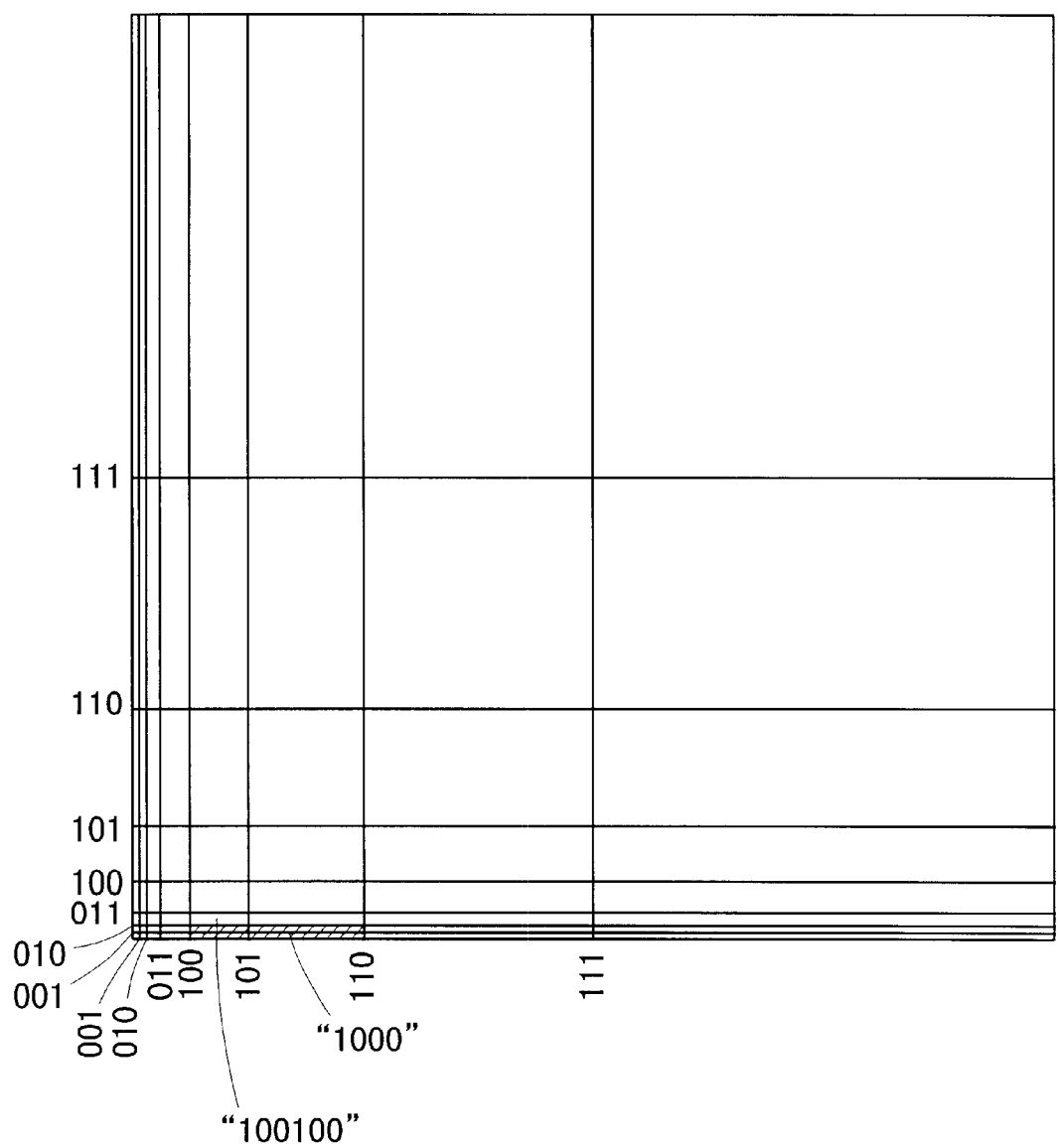
FIG. 56 is a diagram showing a range corresponding to the exponent area code in the index of a sixth embodiment.
Figure 57:
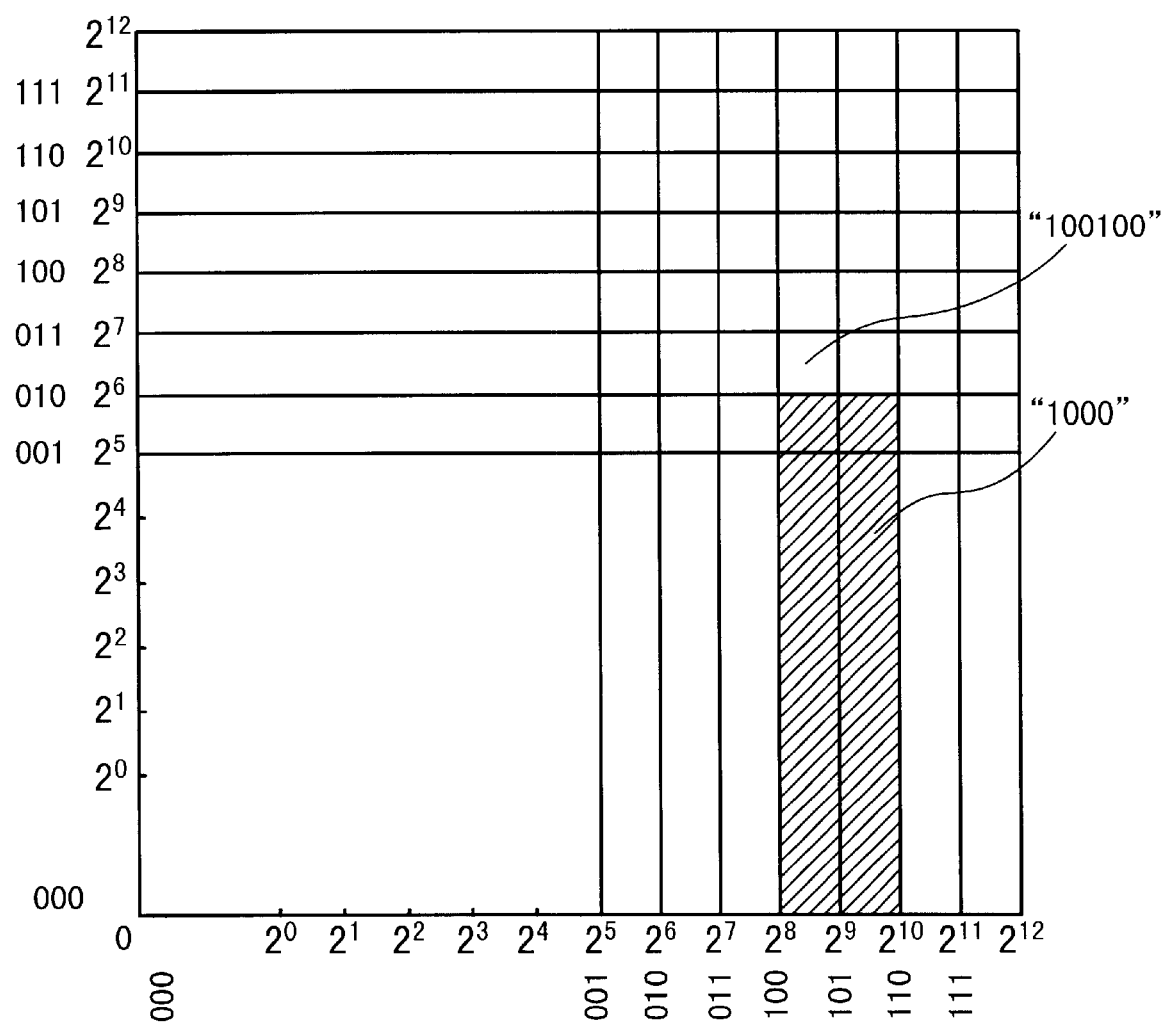
FIG. 57 is a diagram showing a range corresponding to the exponent area code in the index of the sixth embodiment.

Therefore, when the number of terms in the divisions is "3", the exponent area code corresponds to one of the grids (cells) shown in FIG. 56 or FIG. 57. For example, the exponent area code "100100" of coordinate data g in the index shown in (T-116) of FIG. 55 corresponds to the grid "100100" in FIG. 56 or FIG. 57, because the x-coordinate is "100" and the y-coordinate is "010". Also, the exponent area code "1000" corresponds to the area consisting of four shaded matrixes in FIG. 56 and FIG. 57, because the x-coordinate is "10" and the y-coordinate is "00".

As mentioned, when only exponents are used as the (high-order digits of) coordinates, the only difference is that the logarithmic scale is used as the coordinate axes. The exception is the exponent n=000 in which un-normalized representation is allowed. Therefore, coordinate data used in the first to fifth embodiments described above may also be applied to the exponents of coordinate data.

Figure 58:
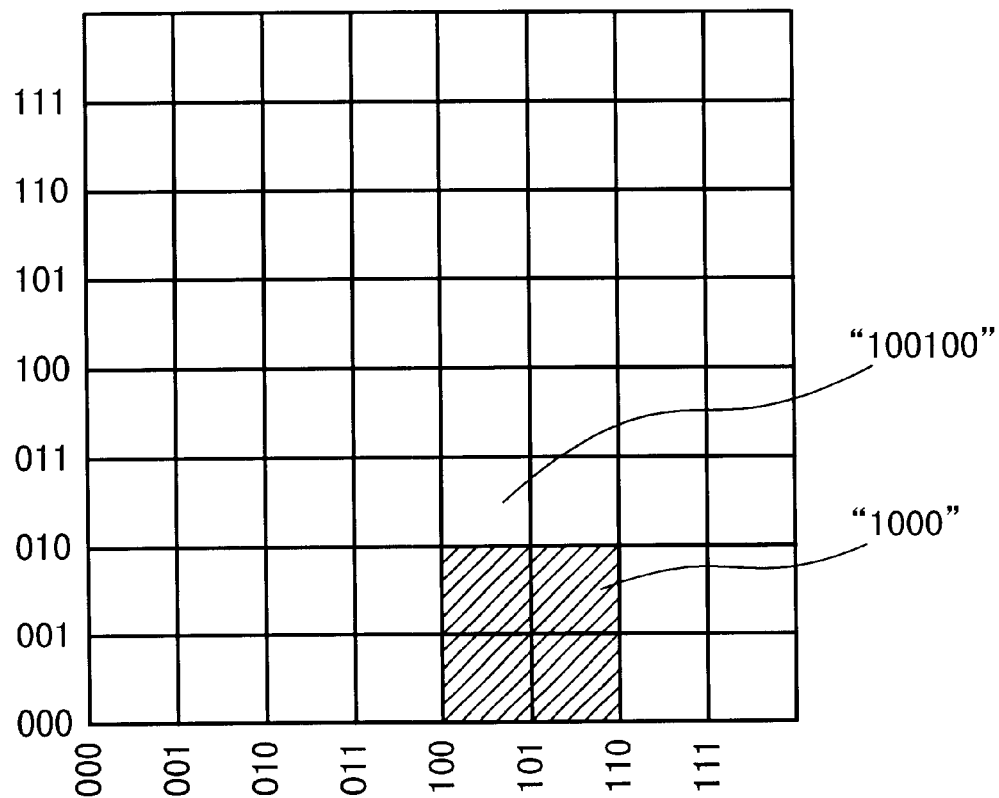
FIG. 58 is a diagram showing the range shown in FIG. 56 and FIG. 57 represented in 3-digit fixed-point binary integer format.

As described above; the area corresponding to the exponent area code "1000" consists of four shaded areas in FIG. 56 and FIG. 57. It should be noted that the order of area codes and the arrangement of areas are similar to those shown in FIG. 58 in which the same coordinate codes are interpreted as binary integers in the 3-digit (bit) fixed point representation format. The only exception is the coordinate axis scale.

In addition, the mantissa represents the beginning (leftmost end) of 32 ($2^5$) areas generated by equally dividing the area represented by the exponent. Thus, when each coordinate code is an 8-digit (bit) code with the exponent of the coordinate as the high-order digits and with the mantissa as the low-order digits and when the area code is the exponent area code to which the mantissa area code, if any, is concatenated, the order of area codes and the arrangement of areas corresponding to the area codes are exactly the same as those of coordinate codes represented in 8-digit (bit) fixed-point integers.

Therefore, as with the second embodiment, the index generating means, range search means, and nearest data search means may be used in this embodiment in which this invention is applied to the coordinates in the floating-point representation format. The only difference between the second embodiment and this embodiment is the procedure used by the nearest data search means for calculating the distance from coordinate codes. However, this does not affect the configuration of the nearest data search means at all (step (1) to (7) in [3-1-4] of the first embodiment). Of course, steps (1) to (7) of the fifth embodiment may also be used in the nearest data search means.

[8-3. Effects of Coordinate Codes in the Floating-point Representation Format]

In general, the advantage of floating-point representation is that a wide range of values may be represented with fewer digits. In fact, each coordinate, represented in the 12-bit fixed-point format in other embodiments, is represented in 8 bits in this embodiment.

This embodiment reduces not only the number of digits of coordinate data but also the number of digits of an area code (exponent area code+mantissa area code). This increases the efficiency of index generation and search. In fact, the lengths of all area codes (number of terms in the division) of coordinate data a to j, used in the description of the embodiment, are reduced.

9. Other Embodiments

This invention may be applied not only to floating-point coordinate codes but also to any coordinate codes satisfying the following condition. The required condition is that the lexicographic order of coordinate codes matches the sort order (order of values on the coordinate scales) of values represented by coordinate codes. Coordinate codes in the fixed-point representation format used in the first to the fifth embodiments and coordinate codes in the floating-point representation format used in the sixth embodiment are examples of coordinate codes satisfying this condition.

Therefore, for floating-point coordinate codes in the sixth embodiment, the exponent or the part of the mantissa except the leading "1", represented in the floating-point representation format, may also be used. In this case, note that the procedure for calculating the distance from coordinate (area) codes must be changed accordingly as described in the sixth embodiment.

This invention may also be applied to negative numbers. To do so, the definition of lexicographic order of, or the comparison procedure for, coordinate codes must be modified for use with the representation of negative numbers. Or, the index must be generated using coordinate codes that have been converted to positive numbers.

As long as the above conditions are satisfied, each set of values represented by the coordinate system need not be that in the orthogonal (Cartesian) coordinate system. For example, the index generating means, range search means, and nearest data search means described in the above embodiments may be used for the polar coordinate system provided (1) the procedure for checking if an area is included in, or overlaps with, a specified range and (2) the procedure for calculating the distance from a coordinate code or an area code are changed.

As described above, this invention provides a data management system and a data management method which reduce the data area size and, at the same time, substantially increase the speed of the range search and nearest data search.

While a preferred embodiment has been described, variations thereto will occur those skilled in the art of the scope of the present inventive concepts which are delineated by the following claims.

What is claimed is:

1. A data management system comprising:

a storage part configured to store an index comprising n-dimensional coordinate data, the coordinate data being sorted into lexicographic order of area codes, each area code being associated with one of the n-dimensional coordinate data and generated by concatenating numeric substrings taken in a predetermined order from each coordinate of the associated one n-dimensional coordinate data, a length of each numeric substring being determined by a set of prefixes of division, one set for each of the n dimensions;

a search part configured to search the index for specified coordinate data using the area codes; and an index changing part configured to perform one of adding a set of coordinates to said index and deleting a set of coordinates from said index, wherein the index changing part searches the index using said area code according to a binary search method and adds a new set of coordinates at a position consistent with the sort order, thereby adding the coordinate set to the index.

2. A data management system according to claim 1, further comprising:

an index generating part configured to generate said index, wherein said index generating part (1) arranges the coordinate data in said index so that sets of coordinates including a set of matching prefixes appear consecutively, (2) finds lengths of further matching prefixes of the coordinate sets, (3) generates an area code based on a value of (the length of each further matching prefix+1), and (4) sorts the coordinate data into lexicographic order of the area codes to generate an index.

3. A data management system according to claim 1, wherein said search part is a range search part configured to search for sets of coordinates included in a specified range.

4. A data management system according to claim 3, wherein, since all the sets of coordinates, including a set of prefixes of a coordinate set in the index, are included in the specified range, said range search part determines that the coordinate sets including the prefix set in the index are all together included in the specified range.

5. A data management system according to claim 3, wherein, since some sets of coordinates, including a set of prefixes of a coordinate set in the index, may be included in the specified range, if a number of sets of coordinates including the prefix set in the index is equal to or smaller than a predetermined number, said range search part checks, for every set of coordinates, whether the set of coordinates is included in the specified range.

6. A data management system according to claim 1, wherein said search part is a nearest data search part configured to search for a set of coordinates nearest to a specified set of coordinates.

7. A data management system according to claim 6, wherein, since all the sets of coordinates including a set of prefixes of a coordinate set in the index are not farther from the specified coordinate set than a nearest data candidate, said nearest data search part assigns one of the sets of coordinates to a new nearest data candidate.

8. A data management system according to claim 6, wherein, since some sets of coordinates, including a set of prefixes of a coordinate set in the index, may be not farther from the specified coordinate set than a nearest data candidate, if a number of sets of coordinates including the prefix set in the index is equal to or smaller than a predetermined number, said nearest data search part checks, for every set of coordinates, whether the set of coordinates may become a nearest data candidate, and if the check determines that there are coordinate sets nearer to the specified coordinate set, said nearest data search part assigns the nearest one of the coordinate sets to a new nearest data candidate.

9. A data management system according to claim 6, wherein, said nearest data search part holds sets of prefixes of sets of coordinates in the index as a representation of areas in which a nearest data candidate is to be searched for, and if all the sets of coordinates including a prefix set taken out from the sets of prefixes cannot be nearer to the specified coordinate set than the nearest data candidate, said nearest data search part does not search the coordinate sets including the prefix set.

10. A data management system according to claim 6, wherein said nearest data search part holds sets of prefixes corresponding to respective sets of coordinates in the index as a representation of areas in which a nearest data candidate is to be searched for, said sets of prefixes being compared with a distance between the specified coordinate set and a set of coordinates that is one of the coordinate sets in the set of prefixes and nearest to the specified coordinate set among the sets of coordinates, said nearest data search part selects one of the prefix sets, which is compared with a smallest distance, and if the distance is equal to or larger than a distance between the specified data and the nearest data candidate, said nearest data search part ends the search.

11. A data management system according to claim 1, wherein, when a set of prefixes are specified for the dimensions and the index contains sets of coordinates including the specified prefix set, said index has a function determining at least one from the coordinate sets.

12. A data management system according to claim 1, wherein, when a set of prefixes are specified for the dimensions and the index contains sets of coordinates including the specified prefix set, said index has a function enumerating all of the coordinate sets.

13. A data management system according to claim 1, wherein, when a set of prefixes are specified for the dimensions and the index contains sets of coordinates including the specified prefix set, said index has a function counting the coordinate sets.

14. A data management system according to claim 1, wherein one of (1) the coordinate data, and (2) the area codes are stored with the set of prefixes of division into said index, said set of prefixes of division being used for one of generating the area codes from the coordinate data and restoring the coordinate data from the area codes.

15. The data management system of claim 1, wherein a number of substrings taken from each coordinate differs by at most one from each other.

16. A data management method, comprising:

sorting n-dimensional coordinate data stored in an index into lexicographic order of area codes, each area code being associated with one of the n-dimensional coordinate data and generated by concatenating numeric substrings taken in a predetermined order from each coordinate of the associated one n-dimensional coordinate data, a length of each numeric substring being determined by a set of prefixes of division, one set for each of the n dimensions;

searching the index for specified coordinate data using the area codes; and performing one of adding a set of coordinates to said index and deleting a set of coordinates from said index, wherein the index is searched using said area code according to a binary search method and a new set of coordinates are added at a position consistent with the sort order, thereby adding the coordinate set to the index.

17. A data management method according to claim 16, further comprising:

generating said index, wherein the coordinate data is arranged in said index so that sets of coordinates including a set of matching prefixes appear consecutively, lengths of further matching prefixes of the coordinate sets are found, an area code is generated based on a value of (the length of each further matching prefix+1), and the coordinate data is sorted into lexicographic order of area codes to generate an index.

18. A data management method according to claim 16, wherein said search step is a range search step for searching for sets of coordinates included in a specified range.

19. A data management method according to claim 18, wherein, since all the sets of coordinates including a set of prefixes of a coordinate set in the index are included in the specified range, said range search step determines that the coordinate sets including the prefix set in the index are all together included in the specified range.

20. A data management method according to claim 18, wherein, since some sets of coordinates including a set of prefixes of a coordinate set in the index may be included in the specified range, if the number of sets of coordinates including the prefix set in the index is equal to or smaller than a predetermined number, said range search step checks, for every set of coordinates, whether the set of coordinates is included in the specified range.

21. A data management method according to claim 16, wherein said search step is a nearest data search step for searching for a set of coordinates nearest to a specified set of coordinates.

22. A data management method according to claim 21, wherein, based on the fact that all the sets of coordinates including a set of prefixes of a coordinate set in the index are not farther from the specified coordinate set than a nearest data candidate, said nearest data search step assigns one of them to a new nearest data candidate.

23. A data management method according to claim 21, wherein, since some sets of coordinates, including a set of prefixes of a coordinate set in the index, may be not farther from the specified coordinate set than a nearest data candidate, if a number of sets of coordinates including the prefix set in the index is equal to or smaller than a predetermined number, said nearest data search step checks, for every set of coordinates, whether the set of coordinates may become a nearest data candidate, and if the check determines that there are coordinate sets nearer to the specified coordinate set, said nearest data search step assigns the nearest one of the coordinate sets to a new nearest data candidate.

24. A data management method according to claim 21, wherein, said nearest data search step holds sets of prefixes of sets of coordinates in the index as a representation of areas in which a nearest data candidate is to be searched for, and if all the sets of coordinates including a prefix set taken out from the sets of prefixes cannot be nearer to the specified coordinate set than the nearest data candidate, said nearest data search step does not search the coordinate sets including the prefix set.

25. A data management method according to claim 21, wherein said nearest data search step holds sets of prefixes of sets of coordinates in the index as a representation of areas in which a nearest data candidate is to be searched for, said prefix set being compared with a distance between the specified coordinate set and a set of coordinates that is one of the coordinate sets including the prefix set and nearest to the specified coordinate among them, said nearest data search step selects one of all prefix sets, which is compared with a smallest distance, and if the distance is equal to or larger than a distance between the specified data and the nearest data candidate, said nearest data search step ends the search.

26. A data management method according to claim 16, wherein, when a set of prefixes are specified for the dimensions and the index contains sets of coordinates including the specified prefix set, said index has a function determining at least one from the coordinate sets.

27. A data management method according to claim 16, wherein, when a set of prefixes are specified for the dimensions and the index contains sets of coordinates including the specified prefix set, said index has a function enumerating all of the coordinate sets.

28. A data management method according to claim 16, wherein, when a set of prefixes are specified for the dimensions and the index contains sets of coordinates including the specified prefix set, said index has a function counting the coordinate sets.

29. A data management method according to claim 16, wherein one of (1) the coordinate data, and (2) the area codes with the set of prefixes of division, are stored into said index, said set of prefixes of division being used for generating the area codes from the coordinate data and restoring the coordinate data from the area codes.

30. A computer-readable medium having stored therein a data management program, the program comprising:

a means for causing a computer to sort n-dimensional coordinate data stored in an index into lexicographic order of area codes, each area code being associated with one of the n-dimensional coordinate data and generated by concatenating numeric substrings taken in a predetermined order from each coordinate of the associated one n-dimensional coordinate data, a length of each numeric substring being determined by a set of prefixes of division, one set for each of the n dimensions;

a means for causing a computer to search the index for specified coordinate data using the area codes; and a means for causing a computer to perform one of adding the coordinates to said index and deleting the coordinates from said index, wherein the index is searched using said area code according to a binary search method and a new set of coordinates are added at a position consistent with the sort order, thereby adding the coordinate set to the index.

31. A computer-readable medium having stored therein the data management program according to claim 30, said program further comprising:

a means for causing a computer to generate said index, wherein the coordinate data is arranged in said index so that sets of coordinates including a set of matching prefixes appear consecutively, lengths of further matching prefixes of the coordinate sets are found, an area code is generated based on a value of (the length of each further matching prefix+1), and the coordinate data is sorted into lexicographic order of area codes to generate an index.

32. A computer-readable medium having stored therein the data management program according to claim 30, wherein said means causes a computer to search for sets of coordinates included in a specified range.

33. A computer-readable medium having stored therein the data management program according to claim 30, wherein said means causes a computer to search for a set of coordinates nearest to a specified set of coordinates.

* * * * *